(12) United States Patent
Campanella-Pineda et al.

(10) Patent No.: US 12,273,680 B2
(45) Date of Patent: *Apr. 8, 2025

(54) CO-LOCATED MICROELECTROMECHANICAL SYSTEM MICROPHONE AND SENSOR WITH MINIMAL ACOUSTIC COUPLING

(71) Applicant: SKYWORKS SOLUTIONS, INC., Irvine, CA (US)

(72) Inventors: Humberto Campanella-Pineda, Singapore (SG); Michael Jon Wurtz, Lake Oswego, OR (US); You Qian, Singapore (SG); Guofeng Chen, Fremont, CA (US); Rakesh Kumar, Singapore (SG)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/045,888

(22) Filed: Oct. 12, 2022

(65) Prior Publication Data

US 2023/0328426 A1    Oct. 12, 2023

Related U.S. Application Data

(60) Provisional application No. 63/319,830, filed on Mar. 15, 2022.

(51) Int. Cl.
*H04R 1/24*  (2006.01)
*G01H 3/12*  (2006.01)
(Continued)

(52) U.S. Cl.
CPC .............. *H04R 1/245* (2013.01); *G01H 3/12* (2013.01); *H04R 1/04* (2013.01); *H04R 19/04* (2013.01);
(Continued)

(58) Field of Classification Search
CPC .......... H04R 1/245; H04R 1/04; H04R 19/04; H04R 31/006; H04R 2201/003;
(Continued)

(56) References Cited

U.S. PATENT DOCUMENTS 4,631,749 A   12/1986 Rapaich
8,204,252 B1   6/2012 Avendano
(Continued)

FOREIGN PATENT DOCUMENTS

CN    106921928 A    7/2017
GB      2582386 A    9/2020
WO   2015013698 A1   1/2015

*Primary Examiner* — Carolyn R Edwards
*Assistant Examiner* — Julie X Dang
(74) *Attorney, Agent, or Firm* — Lando & Anastasi, LLP

(57) ABSTRACT

An electronic device package comprises a primary microphone having a frequency response having a first resonance frequency, and a reference microphone having a frequency response including a second resonance frequency, the primary microphone and the reference microphone configured to substantially simultaneously receive a same acoustic signal to produce a transduced signal of the primary microphone and a transduced signal of the reference microphone, the second resonance frequency of the reference microphone being different than the first resonance frequency of the primary microphone, the package having dimensions that cause the primary microphone and reference microphone to be acoustically isolated from one another at the resonance frequency of the primary microphone, there being less than 3 dB of acoustic coupling between the primary microphone and reference microphone at the first resonance frequency.

25 Claims, 48 Drawing Sheets

(51) Int. Cl.
*H04R 1/04* (2006.01)
*H04R 19/04* (2006.01)
*H04R 31/00* (2006.01)

(52) U.S. Cl.
CPC ..... *H04R 31/006* (2013.01); *H04R 2201/003* (2013.01)

(58) Field of Classification Search
CPC ...... H04R 29/004; H04R 3/04; H04R 1/2838; H04R 17/02; H04R 19/005; H04R 3/005; H04R 3/00; G01H 3/12; H03G 5/165; B81B 7/02; B81B 2207/015; B81B 2203/04; B81B 2203/0127; B81B 2203/0315; B81B 2203/0307; B81B 2201/0257; B81B 2203/0118
See application file for complete search history.

(56) References Cited

U.S. PATENT DOCUMENTS

| | | | |
|---|---|---|---|
| 8,351,634 | B2 | 1/2013 | Khenkin |
| 8,618,619 | B1 | 12/2013 | Miks et al. |
| 9,813,833 | B1 | 11/2017 | Vesa |
| 2003/0133588 | A1 | 7/2003 | Pedersen |
| 2005/0254673 | A1 | 11/2005 | Hsieh et al. |
| 2010/0128914 | A1 | 5/2010 | Khenkin |
| 2010/0254547 | A1 | 10/2010 | Grosh et al. |
| 2011/0243343 | A1 | 10/2011 | Gauger, Jr. et al. |
| 2011/0272769 | A1 | 11/2011 | Song et al. |
| 2012/0124743 | A1 | 5/2012 | Hensley et al. |
| 2012/0241937 | A1 | 9/2012 | Chan et al. |
| 2012/0250925 | A1 | 10/2012 | Lillelund |
| 2013/0051598 | A1 | 2/2013 | Reining |
| 2014/0037115 | A1 | 2/2014 | Vos et al. |
| 2014/0044297 | A1 | 2/2014 | Loeppert et al. |
| 2014/0233756 | A1 | 8/2014 | Inoda |
| 2015/0289045 | A1 | 10/2015 | Khenkin et al. |
| 2016/0043664 | A1 | 2/2016 | Theuss et al. |
| 2016/0165358 | A1 | 6/2016 | Ho et al. |
| 2016/0178372 | A1 | 6/2016 | Pun et al. |
| 2017/0048623 | A1 | 2/2017 | Qutub et al. |
| 2017/0320726 | A1 | 11/2017 | Leitgeb et al. |
| 2018/0167742 | A1 | 6/2018 | Brioschi et al. |
| 2018/0234751 | A1 | 8/2018 | Lee |
| 2018/0244516 | A1 | 8/2018 | Piechocinski |
| 2018/0317021 | A1 | 11/2018 | Dehe et al. |
| 2019/0017893 | A1 | 1/2019 | Tumpold |
| 2020/0007992 | A1 | 1/2020 | Koymen et al. |
| 2020/0017351 | A1 | 1/2020 | Schultz et al. |
| 2020/0304923 | A1 | 9/2020 | Brioschi et al. |
| 2020/0404407 | A1 | 12/2020 | Hrudey et al. |
| 2021/0329378 | A1 | 10/2021 | Zhang et al. |
| 2021/0400366 | A1 | 12/2021 | LoPresti et al. |
| 2022/0276149 | A1 | 9/2022 | Kuyken et al. |
| 2023/0061686 | A1 | 3/2023 | Wolfl |
| 2023/0121053 | A1 | 4/2023 | Campanella-Pineda et al. |
| 2023/0269524 | A1* | 8/2023 | Chen .................. H04R 1/245 381/103 |
| 2023/0269525 | A1 | 8/2023 | Chen et al. |
| 2023/0283963 | A1 | 9/2023 | Chen et al. |
| 2023/0328426 | A1* | 10/2023 | Campanella-Pineda .................. H04R 1/04 381/360 |

* cited by examiner

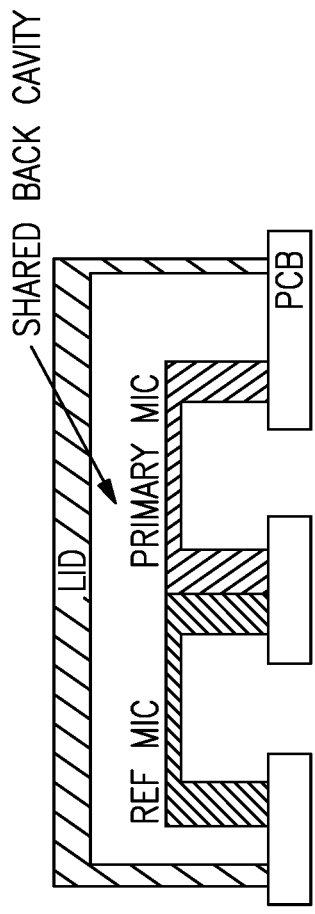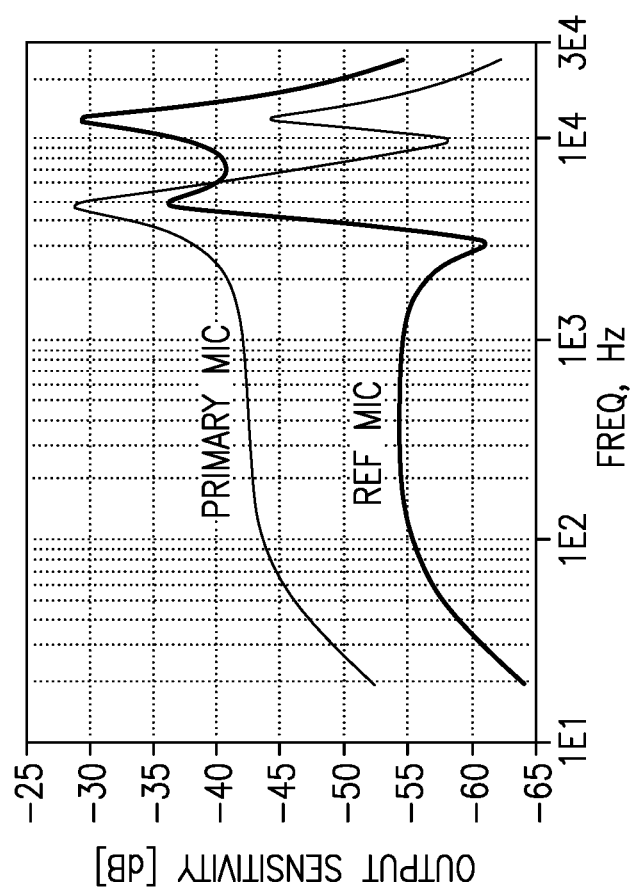
FIG. 5B
FR FOR TWO MICS SHARING THE SAME BACK CAVITY

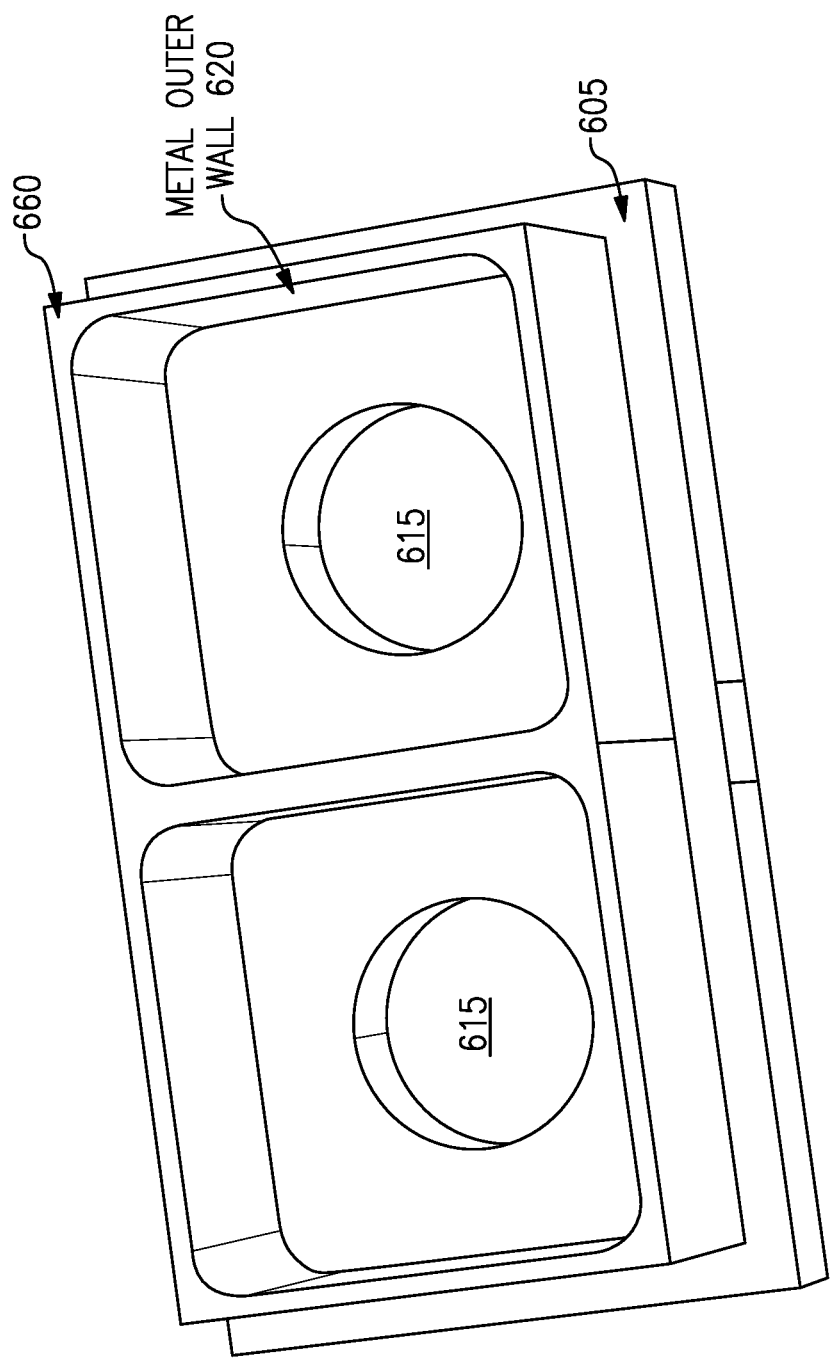

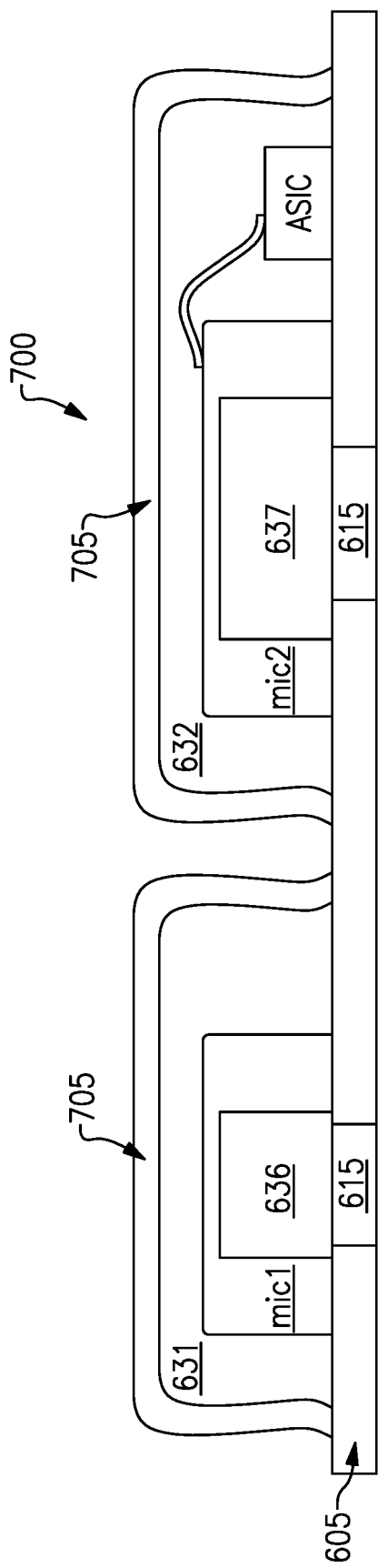
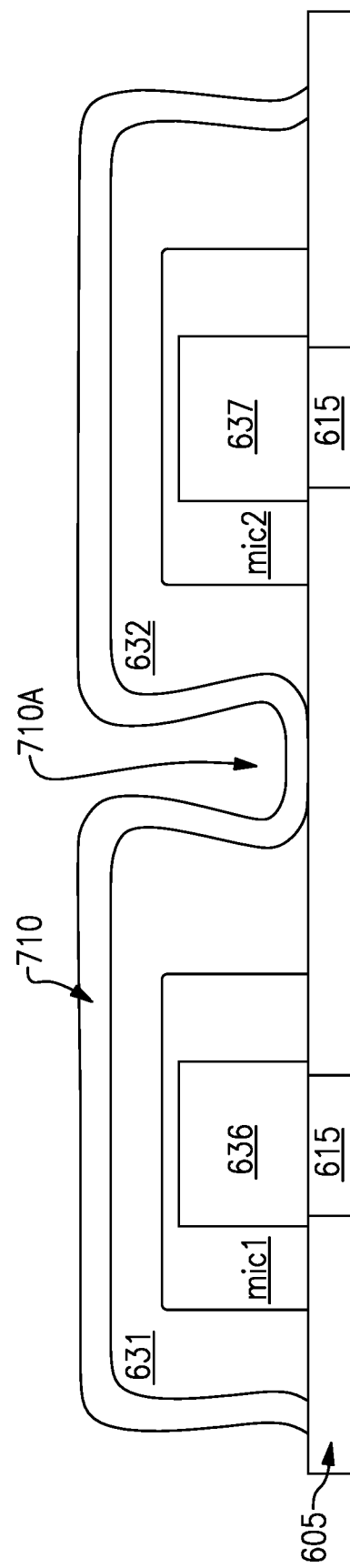
FIG.7A
FIG.7B

A MEMS DIE WITH 2 MICROPHONES

A DIE FROM CAP WAFER WITH 1 BACK CAVITY

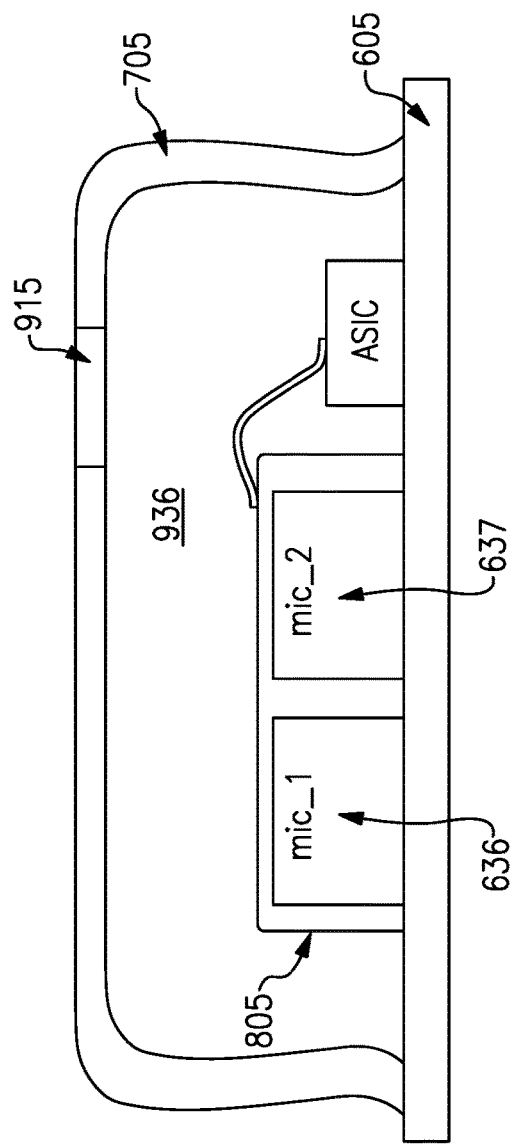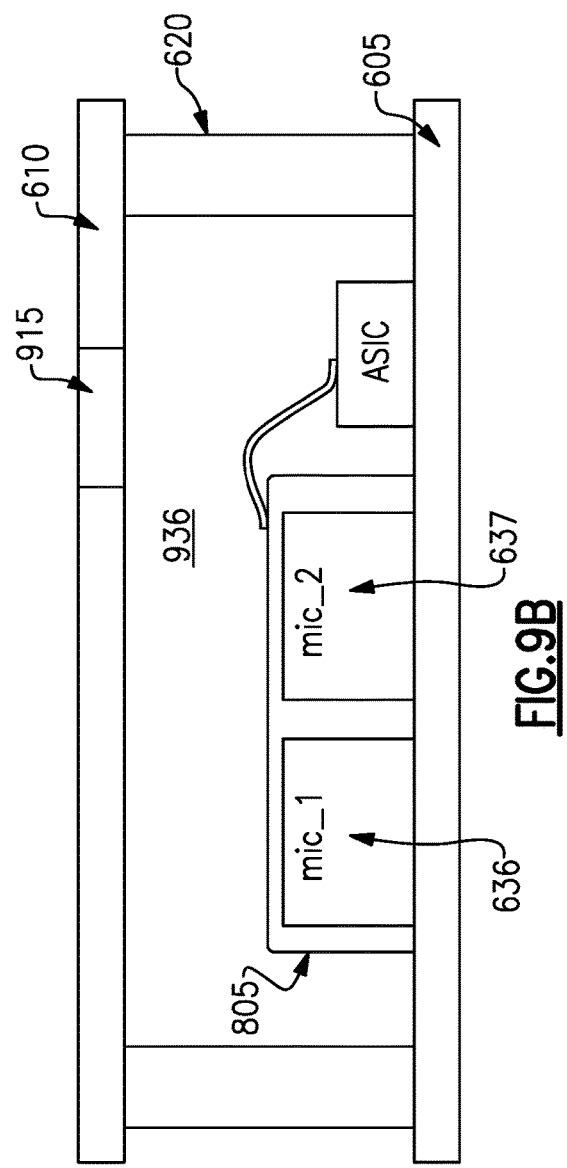

TOP VIEW:

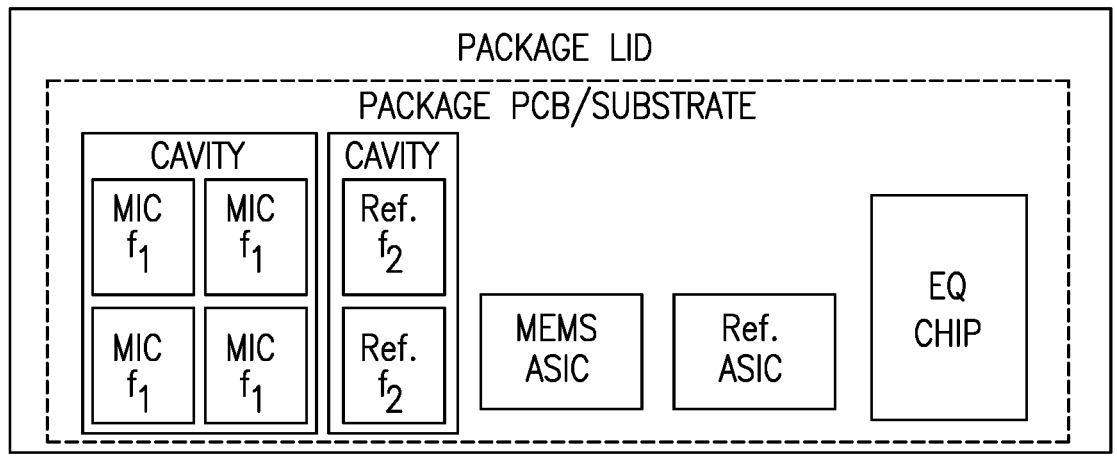
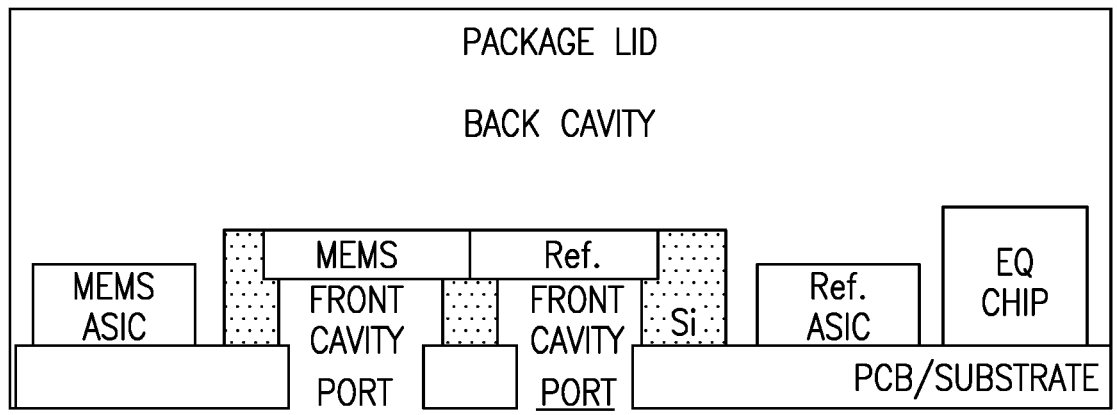
FIG.25

CO-LOCATED MICROELECTROMECHANICAL SYSTEM MICROPHONE AND SENSOR WITH MINIMAL ACOUSTIC COUPLING

CROSS-REFERENCE TO RELATED APPLICATIONS

This application claims priority under 35 U.S.C. § 119(e) to U.S. Provisional Patent Application Ser. No. 63/319,830, titled "CO-LOCATED MICROELECTROMECHANICAL SYSTEM MICROPHONE AND SENSOR WITH MINIMAL ACOUSTIC COUPLING," filed Mar. 15, 2022, the entire contents of which is incorporated herein by reference.

BACKGROUND

Field

Aspects and embodiments disclosed herein relate to microelectromechanical systems (MEMS). More particularly, at least some embodiments are directed to frequency response equalization of MEMS transducers, such as microphones.

Description of the Related Technology

The frequency response of a transducer, such as a microphone is the frequency-specific output sensitivity of the transducer. Resonance occurs when a physical object or electronic circuit absorbs energy from an initial displacement or source, and then maintains the resultant mechanical or electrical vibrations without an additional force or energy acting on it. The frequency at which this vibration occurs is known as the resonance frequency or resonant frequency. The resonance frequency of a transducer is potentially troublesome when it is in the audio band as it may cause damage to the listener's ears and/or an inaccurate reproduction of the sound being sensed. Eliminating this resonance is important for successful transducer performance.

A MEMS microphone is a micro-machined electromechanical device used to convert sound pressure (e.g., voice sound) to an electrical signal (e.g., voltage). MEMS microphones are widely used in wireless devices, mobile devices, headsets, earpieces, speakers and other voice-interface devices or systems. Conventional capacitive MEMS microphones suffer from high power consumption (e.g., large bias voltage) and reliability, for example when used in a harsh environment (e.g., when exposed to dust and/or water).

Piezoelectric MEMS microphones have been used to address the deficiencies of capacitive MEMS microphones. Piezoelectric MEMS microphones offer a constant listening capability while consuming almost no power (e.g., no bias voltage is needed), and are robust and immune to water and dust contamination. Both conventional capacitive and piezoelectric MEMS microphones suffer from the problem of resonance in the audio band.

Prior attempts of eliminating or at least reducing resonance in MEMS microphones have included several different approaches. Some solutions add specific features in the structure of the microphone to remove the resonance peak from the audio band. Other solutions include multiband processing to address the band around the resonance and to compensate for extra peaks in the frequency response. Another solution is to tailor the microphone's packaging to modify the resonance frequency, thereby pushing the resonance frequency out of the human perceivable audio band. The microphone could also be calibrated at the factory, using pink noise, for example, to add a fixed frequency notch at the resonance frequency to compensate for the peak. However, none of these prior solutions offer a way to satisfactorily remove the resonance frequency from the audio band for a specific microphone once it has left the factory and is in the presence of unpredictable real-world noise.

In other approaches, the resonance frequency of a MEMS microphone may be provided in the audio band, but the audio response of the MEMS microphone may be equalized to reduce or minimize the effect of the resonance frequency. Equalizing the in-band resonance frequency of a MEMS microphone may thus provide for better performance of the microphone. However, technological, environmental, and logistic issues with one-time equalization may lead to impractical, irregular, unstable, and/or ineffective outcomes. Eliminating these issues may enable successful microphone equalization performance.

One issue with one-time equalization is the typically complex testing setup for resonance frequency measurement at the assembly and test facility that results in engineering costs, tooling costs, test time, and assembly costs. Measurement, calibration, application specific integrated circuit (ASIC) programming and actual equalization (EQ) adds extra production time resulting in throughput reduction and product cost increase. The measured resonance frequency of a MEMS microphone at the packaging level may change in the final product implementation. This results in high uncertainty in knowing what the actual resonance frequency will be after integration and inferior product performance if the actual resonance frequency after integration is different from the resonant frequency measured at the packaging level and for which compensation was provided. The occurrence and extent of resonance frequency variations due to environmental conditions cannot be predicted a priori. Therefore, results of one-time EQ will be inconsistent with time or conditions, for example, due to thermal drift due to heating/cooling of the product due to operation or environment or unintended damping due to clogging, wearing, etc.

These above-listed issues are due to the inability to sense the environmental and operational conditions that surround the microphone during actual use. This could be mitigated by a reliable reference sensor; however, existing solutions do not use in situ sensors for this purpose due to added costs, e.g., footprint, or technological incompatibilities that have made this solution non-viable to date. Not co-locating the microphone and a reference sensor also makes any sensing/measurement non-optimal as the acoustic excitation conditions will generally be different for the microphone and reference sensor.

One prior approach to compensating for the effect of an in-band resonance frequency in a MEMS microphone includes performing a one-time calibration of the microphone at the factory to add a fixed frequency notch at the resonance frequency to compensate the peak. This approach is non-optimal because there is no provision for tracking resonance frequency changes due to, for example, environmental effects. In another approach co-packaged microphones and vibration/presence sensors are provided to activate noise cancelling or user-voice detection circuits. In this approach, however, the microphone and vibration/presence sensors are typically not co-located/co-planar due to different flow/technology, cost, and/or footprint for the microphones and vibration/presence sensors. Mechanically adjustable microphone packages may be utilized to push the resonance frequency of the microphone out of the audio band, however, such packages are typically unsuitable for low-power consumer products. The utilization of one-time energy measurement control circuits to measure the energy of the transfer function at different bands, to catch the resonance peak and attenuate the microphone response at this peak is, again, non-optimal because there is no provision for tracking resonance frequency changes due to, for example, environmental effects.

SUMMARY

In accordance with one aspect, there is provided an electronic device package. The electronic device package comprises a primary microphone having a frequency response having a first resonance frequency, and a reference microphone having a frequency response including a second resonance frequency, the primary microphone and the reference microphone configured to substantially simultaneously receive a same acoustic signal to produce a transduced signal of the primary microphone and a transduced signal of the reference microphone, the second resonance frequency of the reference microphone being different than the first resonance frequency of the primary microphone, the package having dimensions that cause the primary microphone and reference microphone to be acoustically isolated from one another at the resonance frequency of the primary microphone, there being less than 3 dB of acoustic coupling between the primary microphone and reference microphone at the first resonance frequency.

In some embodiments, the primary microphone and reference microphone share an enclosure having a volume, the package having an acoustic port with a diameter and a depth, the volume, depth, and diameter optimized to provide the less than 3 dB of acoustic coupling between the primary microphone and reference microphone at the first resonance frequency.

In some embodiments, the primary microphone and reference microphone share an enclosure having a first volume, the package including an acoustic port with a diameter and a depth, and a front cavity having a second volume, the second volume, first resonance frequency, and second resonance frequency optimized to provide the less than 3 dB of acoustic coupling between the primary microphone and reference microphone at the first resonance frequency.

In some embodiments, each of the primary microphone and the reference microphone is a micro-electromechanical system (MEMS) microphone.

In some embodiments, the first resonance frequency of the primary microphone is below 20 kHz.

In some embodiments, the second resonance frequency of the reference microphone is above 20 kHz.

In some embodiments, the package is configured as a system-in-package module.

In some embodiments, the package is configured as a system-on-chip module.

In some embodiments, the primary microphone and reference microphone are formed on a same die.

In some embodiments, the primary microphone and reference microphone share a same acoustic port.

In some embodiments, the primary microphone and reference microphone share a same front cavity.

In some embodiments, the primary microphone and reference microphone share a same back cavity.

In some embodiments, the primary microphone and reference microphone have different respective acoustic ports but share a same back cavity.

In some embodiments, the primary microphone and reference microphone are disposed in a same plane and separated laterally from one another.

In some embodiments, the primary microphone and reference microphone are formed on a same substrate by a same manufacturing process.

In some embodiments, the package further comprises a plurality of cascaded primary microphones.

In some embodiments, the package further comprises a plurality of cascaded reference microphones.

In some embodiments, the plurality of cascaded primary microphones and the plurality of cascaded reference microphones share a same acoustic port.

In some embodiments, the plurality of cascaded primary microphones and the plurality of cascaded reference microphones share a same front cavity.

In some embodiments, the plurality of cascaded primary microphones and the plurality of cascaded reference microphones share a same back cavity.

In some embodiments, the plurality of cascaded primary microphones and the plurality of cascaded reference microphones have different respective acoustic ports but share a same back cavity.

In some embodiments, the plurality of cascaded primary microphones and the plurality of cascaded reference microphones are disposed in an arrangement having at least two axes of symmetry.

In some embodiments, the plurality of cascaded primary microphones and the plurality of cascaded reference microphones are disposed in a concentric arrangement.

In some embodiments, the plurality of cascaded primary microphones and the plurality of cascaded reference microphones are circumferentially arranged.

In some embodiments, the plurality of cascaded primary microphones are shaped differently from the plurality of cascaded reference microphones.

In accordance with another aspect, there is provided a method of fabricating a package including a primary microphone and a reference sensor. The method comprises defining a first resonance frequency of the primary microphone and a second resonance frequency of the reference sensor, defining a volume of a front cavity of the package, defining a decoupling criterion, initializing a thickness and a diameter of an acoustic port of the package, initializing a volume of a back cavity of the package, determining an amount of acoustic coupling between the primary microphone and the reference sensor at the first resonance frequency, and responsive to the acoustic coupling being greater than the decoupling criteria, adjusting one or more of the thickness of the acoustic port, diameter of the acoustic port, or the volume of the back cavity and iterating the adjusting until the acoustic coupling is less than the decoupling criteria.

In accordance with another aspect, there is provided a method of fabricating a package including a primary microphone and a reference sensor. The method comprises defining a thickness and a diameter of an acoustic port of the package, defining a volume of a back cavity of the package, defining a decoupling criterion, initializing a first resonance frequency of the primary microphone and a second resonance frequency of the reference sensor, initializing a volume of a front cavity of the package, determining an amount of acoustic coupling between the primary microphone and the reference sensor at the first resonance frequency, and responsive to the acoustic coupling being greater than the decoupling criteria, adjusting one or more of the first resonance frequency, the second resonance frequency, or the volume of the front cavity and iterating the adjusting until the acoustic coupling is less than the decoupling criteria.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 5B illustrates the frequency response of two microphones sharing the same back cavity;

FIG. 6H illustrates an example in which the metal walls of the package of FIG. 6E may be formed from a single metal plate with apertures defining the inner sides of the metal walls;

FIG. 7A is a cross-sectional view of an example of a lid-on-laminate package for multiple microphones having separate back cavities for each microphone;

FIG. 7B illustrates an alternative configuration for the package of FIG. 7A;

FIG. 9A is a cross-sectional view of a lid-on-laminate package for piezoelectric microelectromechanical systems microphones including a top acoustic port;

FIG. 9B is a cross-sectional view of a laminate-on-laminate package for piezoelectric microelectromechanical systems microphones including a top acoustic port;

FIG. 25 illustrates a plan view and cross-sectional view of another example of a co-packaged MEMS microphone and reference sensor SoC module including cascaded MEMS microphones and reference sensors;

DETAILED DESCRIPTION

Figure 1:
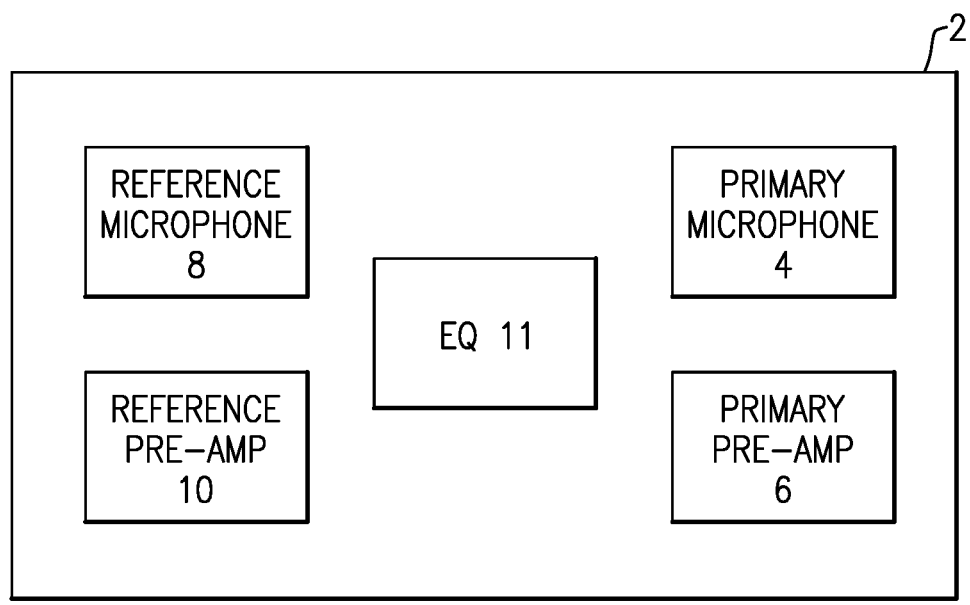
FIG. 1 is a block diagram of a microphone according to one embodiment.

Aspects and embodiments described herein are directed to frequency response equalization in MEMS transducers, such as microphones. Some of the technical issues in having microphone resonances in the audio band are high energy peaks/consumption causing damage to ears and/or electronics, unsolvable design tradeoffs of performance (e.g., sensitivity) versus resonance frequency to remove the resonance peaks from the audio band, increased group delay at resonance (e.g., delay distortion of voice and/or audio signals), and manufacturing, packaging, and other variations causing resonance frequency to be different from part to part.

To solve these technical issues, embodiments provided herein include equalization methods and electronic acoustic devices for equalizing the frequency response of a MEMS microphone including a primary MEMS microphone and a reference MEMS microphone, a packaging that encloses the primary and secondary microphones, as well as signal processing hardware (e.g., ASICs) in which the primary and secondary microphones are acoustically decoupled from one another. To gain the benefits of embodiments disclosed herein, each of the primary and reference microphones are of the same type (although in some embodiments, the primary and reference microphones may be of different types), each has a different resonance frequency, and both microphones receive a signal to be transduced at substantially the same time. In an example, by the "same type," it is understood that both the primary and reference microphones are made of the same materials and in accordance with the same processes, and have the same operating principle. The transduced signal of the reference microphone is used to equalize the transduced signal of the primary microphone, and more particularly, to equalize the resonance frequency of the primary microphone. Examples include both microphones being MEMS microphones. However, it should be appreciated that embodiments disclosed herein are not limited to sound transducers (e.g., microphones), but may be adapted to other types of transducers, such as MEMS accelerometers or pressure transducers. An equalization method is provided that includes exciting both the primary and secondary microphones with the same/common signal, carrying out spectral estimations of the transduced signals, and finding best polynomial fittings of the transfer function of the primary microphone to generate an equalization function to remove the resonance peak of the primary microphone.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

All microphones have a resonance with most microphones having a very high Q factor (i.e., the ratio of a center frequency of a resonator to its bandwidth when subject to an oscillating driving force), which can be a peak of ten times over the mid band sensitivity. Many microphones are condenser-type microphones and prior solutions of dealing with the resonance peak/spike is to push the spike beyond 20 kHz where it is nearly or entirely imperceptible to human hearing. However, when the resonance peak is pushed outside the audio band, the sensitivity of the microphone may be negatively impacted by as much as 20 dB or more.

Prior solutions of improving the frequency response of microphones include adding structures to the microphone or its packaging to move the resonance peak out of the audible range, as well as calibrating the microphone at the factory. However, such solutions are not well-suited for improving the frequency response of the microphone as the frequency response changes over time due to a variety of factors including aging components and effects from the environment. For example, the resonance frequency of a microphone can change as the physical structure of the microphone changes over time due to fluctuations in temperature, humidity, etc. When the resonance frequency changes, any previous calibration will no longer be optimal and structures added to the microphone or its packaging may not eliminate the peak resonance as they had done initially.

The ideal measurement from a microphone only includes the incoming audio signal without any distortion or noise. Any noise or signal that is picked up by the microphone that is not the audio signal will corrupt the microphone's estimate of the audio signal. Embodiments herein have the benefit of improving the microphone's (or other suitable transducer or sensor) estimate of the audio signal in the presence of any incoming energy (including noise).

The disclosed embodiments overcome current limitations in the prior art by providing MEMS microphones with high sensitivity and signal-to-noise ratio (SNR) figures without tradeoffs in the frequency response (i.e., no peaks). Equalization methods use statistical signal processing, which is agnostic of primary and reference microphones, faster, and suitable for operation in noisy environments. System-on-Chip (SoC) embodiments of MEMS microphones secure accurate acoustic excitation conditions and simpler, cheaper packaging due to shared ports and front and back cavities with less sensitivity to intrinsic MEMS manufacturing process variations. Embodiments also include System-in-Package (SiP) implementations where each microphone is made in a separate process.

FIG. 1 is a block diagram of an electronic acoustic device 2 including a primary microphone 4, a primary pre-amplifier 6, a reference microphone 8, a reference pre-amplifier 10, and an equalization module 11. In certain embodiments the equalization module 11 is a digital signal processor (DSP) or DSP controller. In other embodiments, the equalization module 11 is one of a microcontroller, an ASIC controller, or a general purpose central processing unit (CPU). The electronic acoustic device 2 includes packaging (not shown in FIG. 1) that contains each of the primary microphone 4, the primary pre-amplifier 6, the reference microphone 8, the reference pre-amplifier 10, and the equalization module 11. Examples include the electronic acoustic device 2 being implemented as a SoC or a SiP.

The primary pre-amplifier 6 is electronically coupled to the primary microphone 4 and is configured to amplify the transduced signal output by the primary microphone 4. Likewise, the reference pre-amplifier 10 is electronically coupled to the reference microphone 8 and is configured to amplify the transduced signal output by the reference microphone 8. The equalization module 11 is electronically coupled to the primary pre-amplifier 6 and the reference pre-amplifier 10 and is configured to receive and process the transduced signals from the primary microphone 4 and the reference microphone 8.

To carry out the equalization methods and techniques disclosed herein, each of the primary microphone 4 and the reference microphone 8 has a different resonance frequency and is configured to receive the same acoustic signal. In one embodiment, the resonance frequency of the reference microphone 8 is higher than the resonance frequency of the primary microphone 4. In other embodiments, the resonance frequency of the reference microphone 8 may be lower than the resonance frequency of the primary microphone 4. It is understood that the equalization methods and techniques disclosed herein are applicable to both embodiments where the reference microphone 8 has a higher resonance frequency and embodiments where the reference microphone 8 has a lower resonance frequency than the primary microphone 4.

In certain examples, the primary microphone 4 has a lower resonance frequency than the reference microphone 8, and also has a higher sensitivity than the reference microphone 8. In this case, the resonance in the primary microphone can negatively impact the usability of the primary microphone's bandwidth. The frequency responses of the primary microphone 4 and the reference microphone 8 after their respective first resonance peaks can be more complex than before their respective first resonance peaks, with steep drops and raises in sensitivity and higher-order resonance peaks. In this scenario, any measurement of the acoustic and environmental conditions attempted with a lower-frequency reference microphone would be done in a region of its frequency response with many features and a non-flat sensitivity response, which makes the reference microphone less suitable for serving as a 'clean' reference when compared to a reference microphone with a lower resonance frequency response. Accordingly, in certain examples, a reference microphone having a first resonance peak that is higher in its frequency response than a primary microphone is more desirable.

Figure 2A:
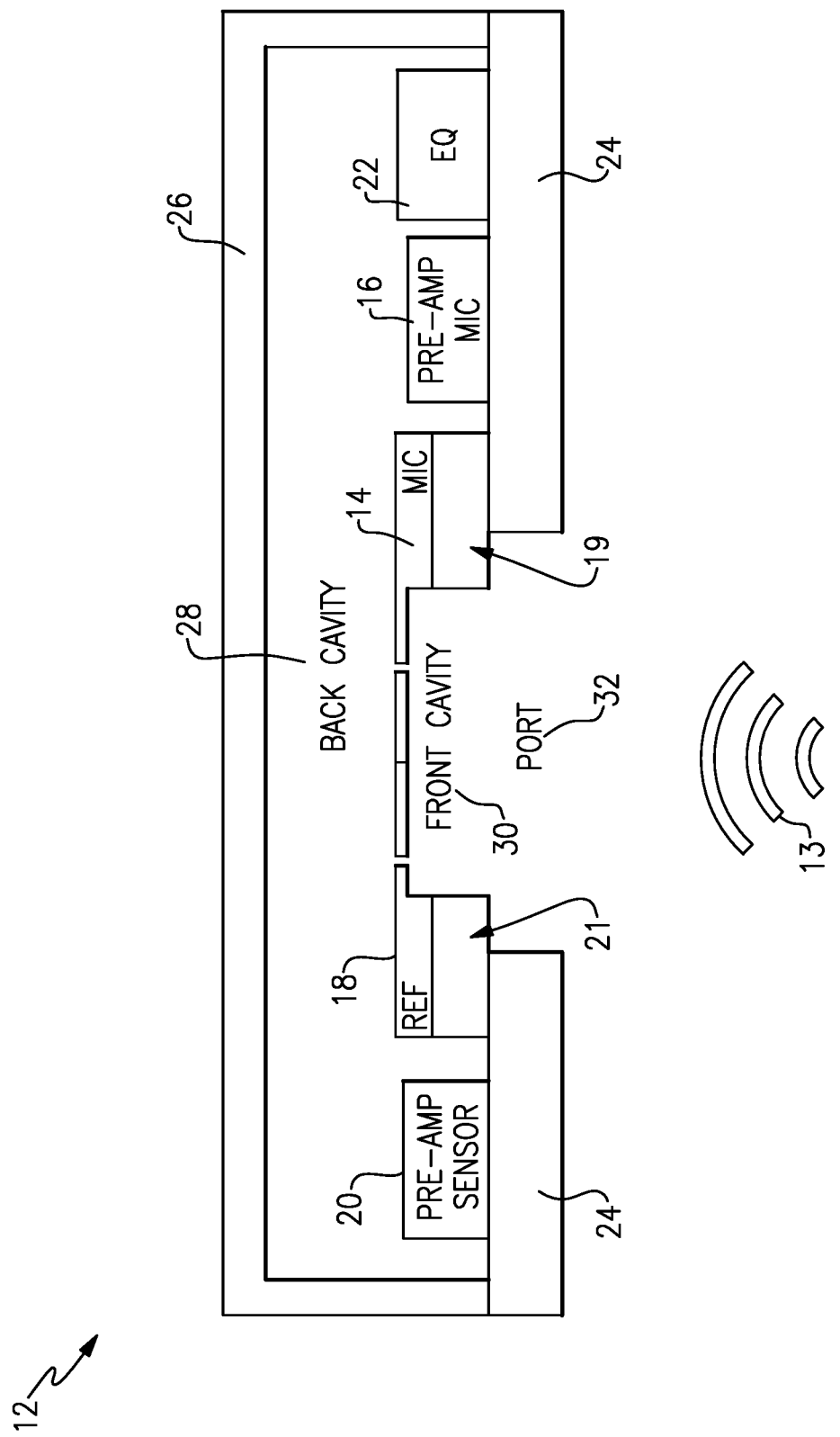
FIG. 2A is a cross-section of a microphone according to another embodiment.

FIG. 2A is a cross-section of an electronic acoustic device 12 including a primary MEMS microphone 14, a primary microphone pre-amplifier 16, a reference MEMS microphone 18, a reference pre-amplifier 20, an equalization module 22, a substrate 24, packaging 26, a back cavity 28, a front cavity 30, and a port 32. In certain embodiments, the substrate 24 is made of silicon. In other embodiments, the substrate 24 is a printed circuit board (PCB). The primary microphone 14 is supported by a support 19, which is, in some examples, made of silicon and coupled to the substrate 24, which is also made of silicon. Similarly, the reference microphone 18 is supported by a support 21, which is, in some examples, made of silicon and coupled to the substrate 24, which is also made of silicon. In an example, the primary microphone 14 and the reference microphone 18 are built on a silicon die singulated from a silicon wafer. In other examples, all of the primary MEMS microphone 14, the primary microphone pre-amplifier 16, the reference MEMS microphone 18, the reference pre-amplifier 20, and the equalization module 22 are produced as chips that are mounted on the substrate 24.

The back cavity 28 is defined by a volume contained within the packaging 26 and between the substrate 24 and the rest of the interior components. For purposes of brevity, relevant discussion of similar components (e.g., the pre-amplifier 16 and the pre-amplifier 6) from FIG. 1 is applicable to FIG. 2A and subsequently described embodiments and will not be repeated.

The electronic acoustic device 12 is configured to receive an acoustic signal 13 at the port 32, which is then channeled into the front cavity 30, and then channeled into the back cavity 28 such that the acoustic signal reflects onto both the reference microphone 18 and the primary microphone 14 substantially simultaneously. As used herein, the phrase "substantially simultaneously" is understood to mean ideally at the same time. In practical terms, it is near impossible for an acoustic wave to reach two co-located and co-planar sensors at exactly the same time (i.e., simultaneously). Hence, the electronic acoustic device 12 is designed to channel the incoming acoustic signal onto both microphones at as near the exact same time as possible, or substantially simultaneously. By ensuring that both microphones encounter and transduce the incoming signal at substantially the same time, the transduced signal from the reference microphone 18 can be used to remove the resonance peak of the primary microphone 14.

The back cavity 28 supports the operation and performance of the primary microphone 14 and the reference microphone 18 in several ways. First, the back cavity 28 finalizes the frequency response—the size of the back cavity 28 ultimately defines the resonance frequency of the primary microphone 14 and the reference microphone 18. Second and consequently, the back cavity 28 also determines other key performance parameters such as the sensitivity and the noise/SNR of each microphone.

Each of the components depicted in FIG. 2A is built within the same SoC manufacturing process where both microphones 14, 18 use the same process layers while having different sensitivities and frequencies. The electronic acoustic device 12 can contain one or more ASICs for amplification, signal conditioning, and the equalization module 22.

As shown in FIG. 2A, the electronic acoustic device 12 includes two SoC devices: the reference microphone 18 and the primary microphone 14. However, the electronic acoustic device can include more than two SoC devices (not shown). For example, in addition to the reference microphone 18 and the primary microphone 14, an additional microphone may be provided.

Figure 2B:
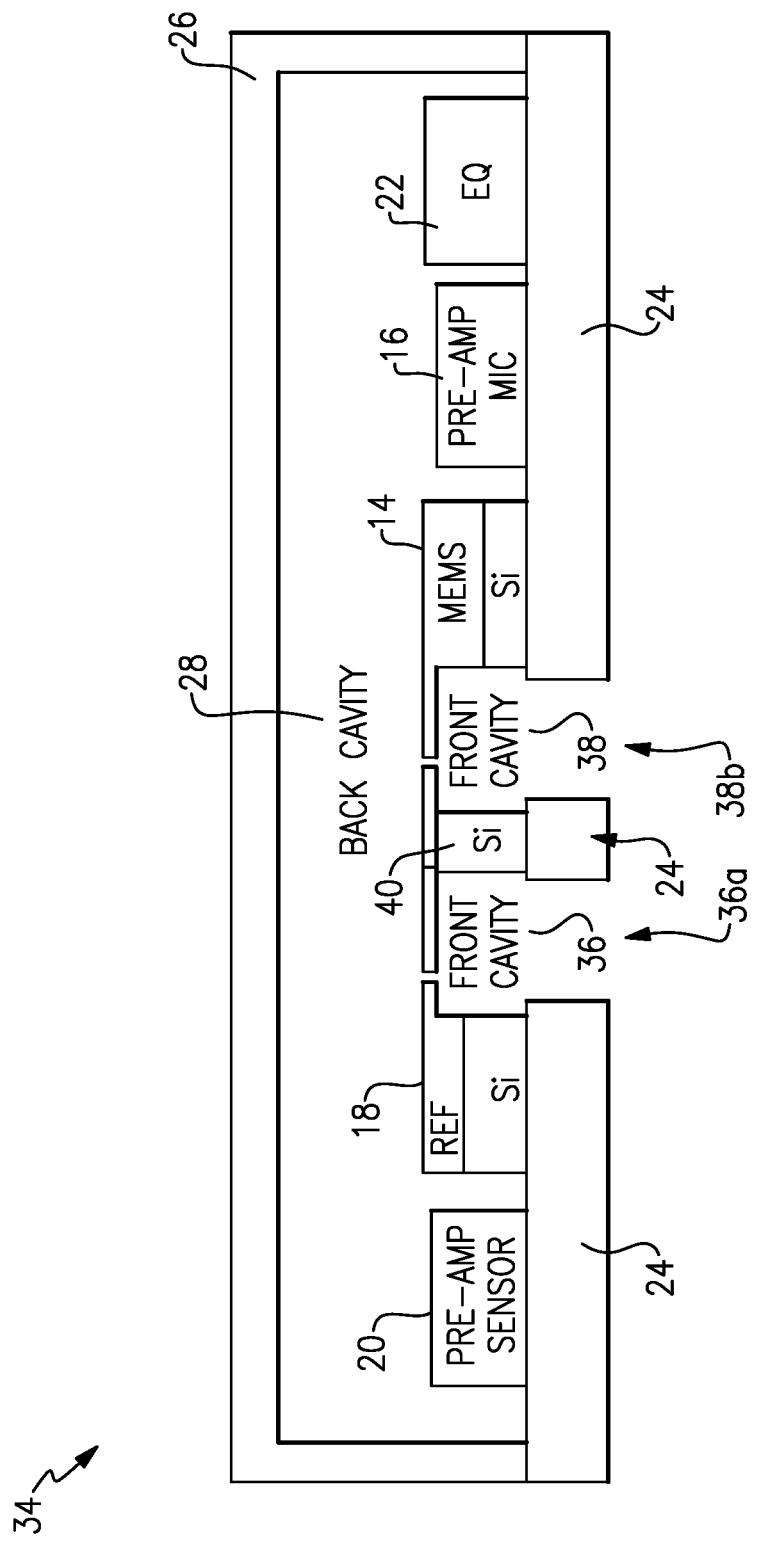
FIG. 2B is a cross-section of a microphone according to another embodiment.

FIG. 2B is a cross-section of an electronic acoustic device 34 that has a first front cavity 36 and a second front cavity 38. A first port 36a is provided near the first front cavity 36 to channel acoustic energy into the first front cavity 36. A second port 38b is provided near the second front cavity 38 to channel the acoustic energy into the second front cavity 38. Description of identically numbered elements in common with FIG. 2A will be omitted for brevity. In some examples, each of the primary microphone 14 and reference microphone 18 is constructed from a piezoelectric material formed atop a silicon substrate. As shown in FIG. 2B, the electronic acoustic device 34 includes silicon material forming layers that couple the microphones 14, 18 to the base substrate 24 which may be a silicon substrate or a printed circuit board (PCB) substrate. In an example, 'coupled' means connected, touching, and/or supporting. A silicon divider 40 is also utilized to separate the first cavity 36 from the second cavity 38. Providing a separate front cavity for each microphone assists in acoustically isolating the primary microphone 14 from the reference microphone 18.

Figure 3A:
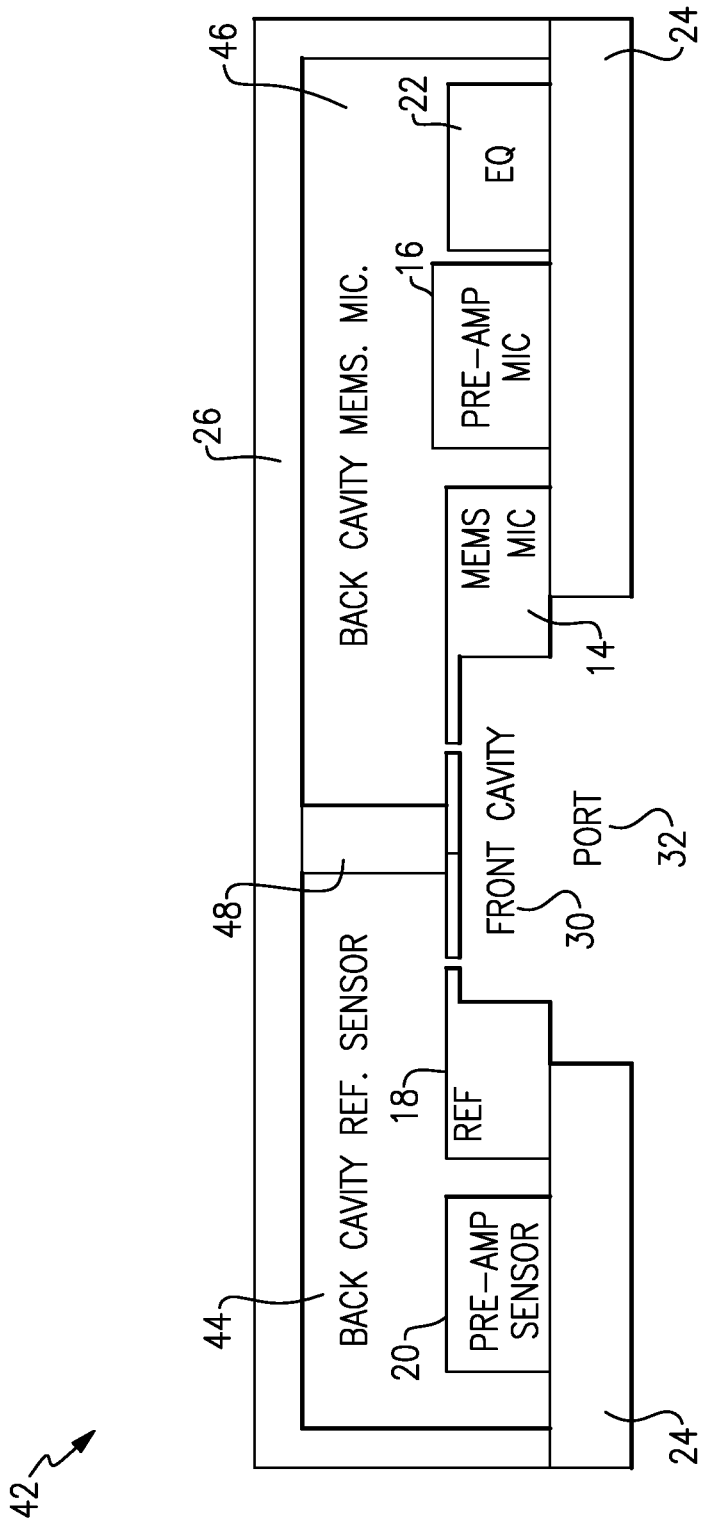
FIG. 3A is a cross-section of a microphone according to another embodiment.

FIG. 3A is a cross-section of an electronic acoustic device 42 that has a first back cavity 44 and a second back cavity 46 separated by a divider 48. In some examples the divider 48 is made of silicon. In other examples the divider is made of the same material as the packaging and is part of the packaging 26. Description of identically numbered elements in common with FIGS. 2A and 2B will be omitted for brevity. Providing a separate back cavity for each microphone assists in acoustically isolating the primary microphone 14 from the reference microphone 18.

Figure 3B:
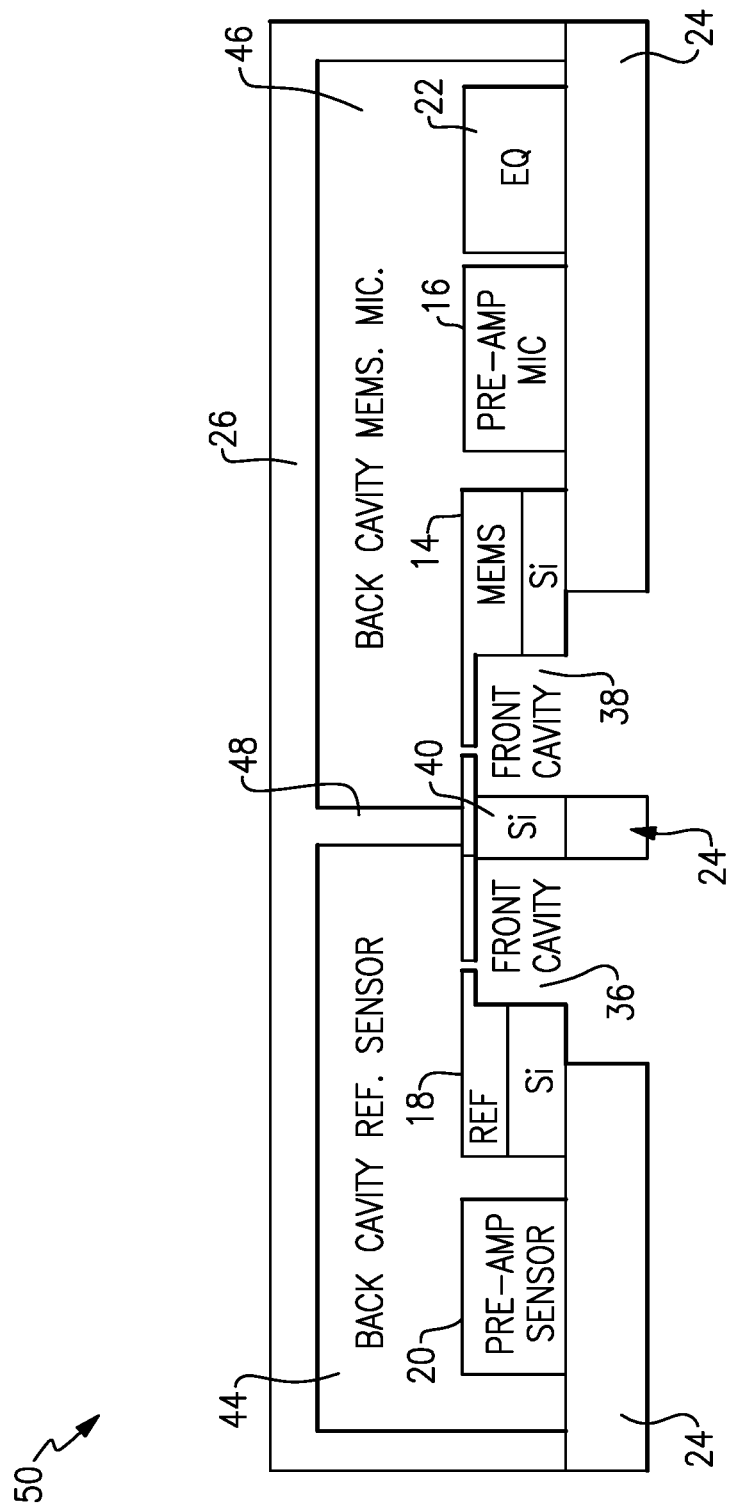
FIG. 3B is a cross-section of a microphone according to another embodiment.

FIG. 3B is a cross-section of an electronic acoustic device 50 that has the first back cavity 44 and the second back cavity 46 separated by the divider 48 as well as the first front cavity 36 and the second front cavity 38 separated by the divider 40. Providing both separate back cavities for each microphone as well as separate front cavities further assists in acoustically isolating the primary microphone 14 from the reference microphone 18.

Figure 4:
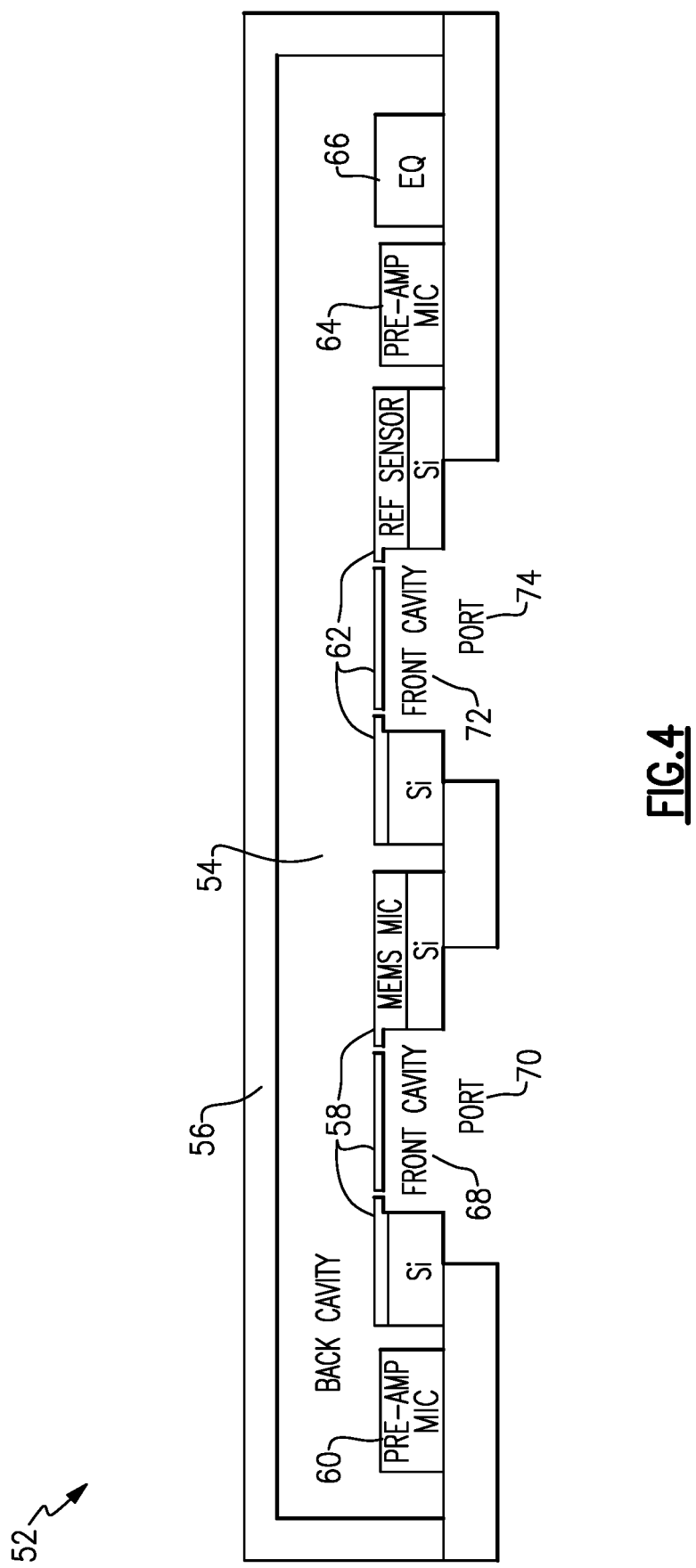
FIG. 4 is a cross-section of a microphone according to another embodiment.

FIG. 4 is a cross-section of an electronic acoustic device 52 with a single back cavity 54 that is surrounded by packaging 56. The electronic acoustic device 52 includes a primary MEMS microphone 58 and primary pre-amplifier 60, a reference microphone 62 and reference pre-amplifier 64, and an equalization module 66. While FIG. 4 depicts the primary MEMS microphone 58 and the reference microphone 62 as being diaphragm type piezoelectric microphones, in other embodiments, the electronic acoustic device can alternatively include cantilevered piezoelectric microphones. Further, the type of microphones utilized in the electronic acoustic device 52 is not limited to diaphragm and cantilever type piezoelectric microphones. Each microphone in the electronic acoustic device 52 is provided with a separate front cavity and port. The primary microphone 58 is provided with a front cavity 68 and a port 70. Similar to embodiments described above, the port 70 is configured to channel an incoming acoustic wave into the front cavity 68 to interact with the primary microphone 58. Likewise, the reference microphone 62 is provided with a front cavity 72 and a port 74, where the port 74 is configured to direct the same incoming acoustic wave into the front cavity 72 to interact with the reference microphone 62.

In certain embodiments, each of the primary microphone 58 and the reference microphone 62 may be built within a different manufacturing process and can be provided in two different chips, respectively, that are integrated at the packaging level. In one embodiment, this integration is part of constructing the electronic acoustic device 52 as a SiP. In an example of the electronic acoustic device 52, two or more ASICs are included for amplification—at least one for the primary microphone 58 and a second ASIC for the reference microphone 62, signal conditioning, and the equalization module 66. The packaging structure can be similar for both microphones, although in certain embodiments, modifications may be needed to accommodate their respective ASIC chips and design particularities.

Figure 5A:
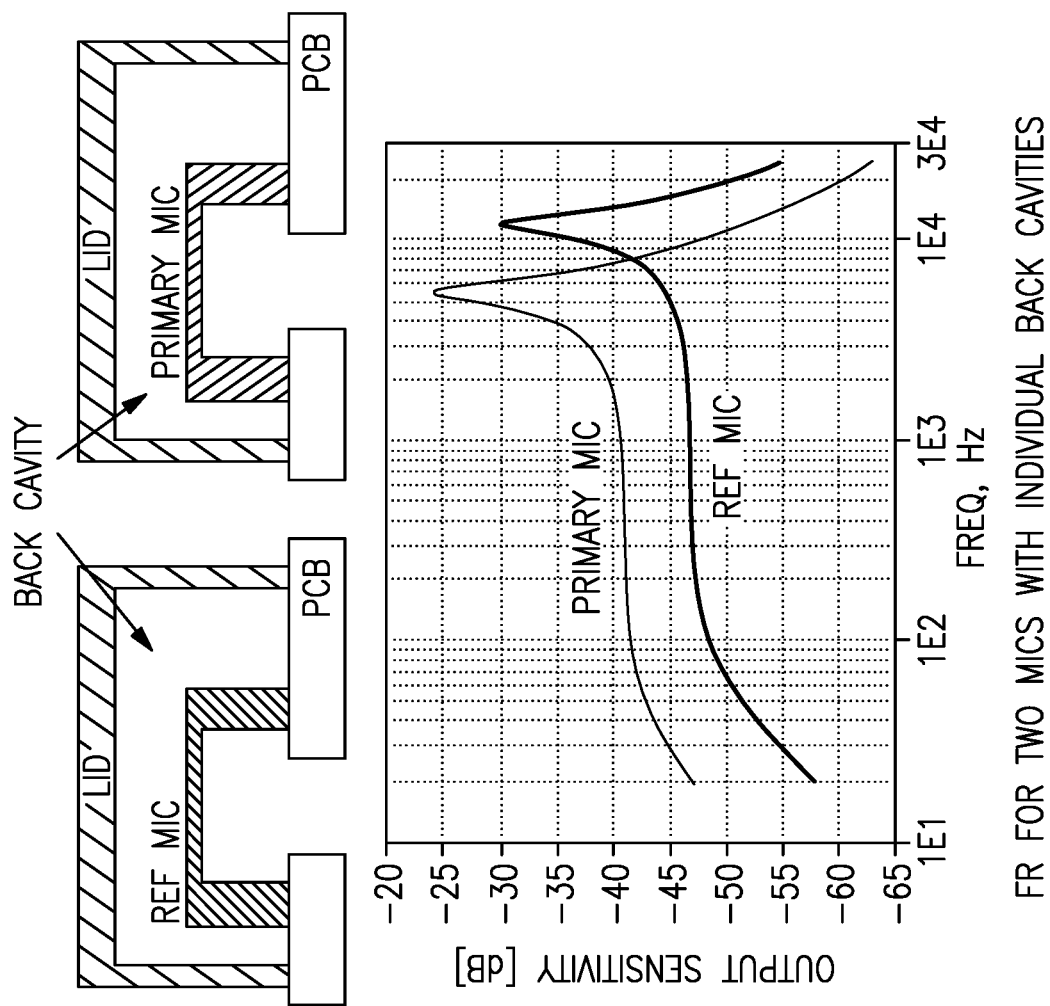
FIG. 5A illustrates the frequency response of two microphones having separate back cavities.

In some instances, providing both the primary microphone 58 and the reference microphone 62 in a package in which they share the same back cavity may result in acoustic coupling between the microphones. The coupling may create distortion in the frequency response (FR) and sensitivity loss of the microphones, rendering the performance of the microphones suboptimal and may render the reference microphone 62 less able or unable to provide an accurate reference signal. FIG. 5A schematically illustrates the frequency response of a primary microphone and a reference microphone provided in packages with separate back cavities. FIG. 5B illustrates the distortion in the frequency responses of the microphones if provided in a package in which they share a back cavity. Accordingly, in at least some embodiments, providing a package for a primary microphone and a reference microphone in which the back cavities of the two microphones are separate, for example, as illustrated in FIGS. 3A and 3B may be more desirable than proving a package for the two microphones in which they share the same back cavity, for example, as illustrated in FIG. 4. The two-cavity implementation, however, may pose many challenges in terms of costs, footprint—the module may be bigger, and technical approach to guarantee a reliable performance of the package. The following figures and description illustrate alternative packaging methods for packaging a primary microphone and a reference microphone together in which the two microphones have separate back cavities, for example, back cavities that are acoustically isolated from one another.

Figure 6A:
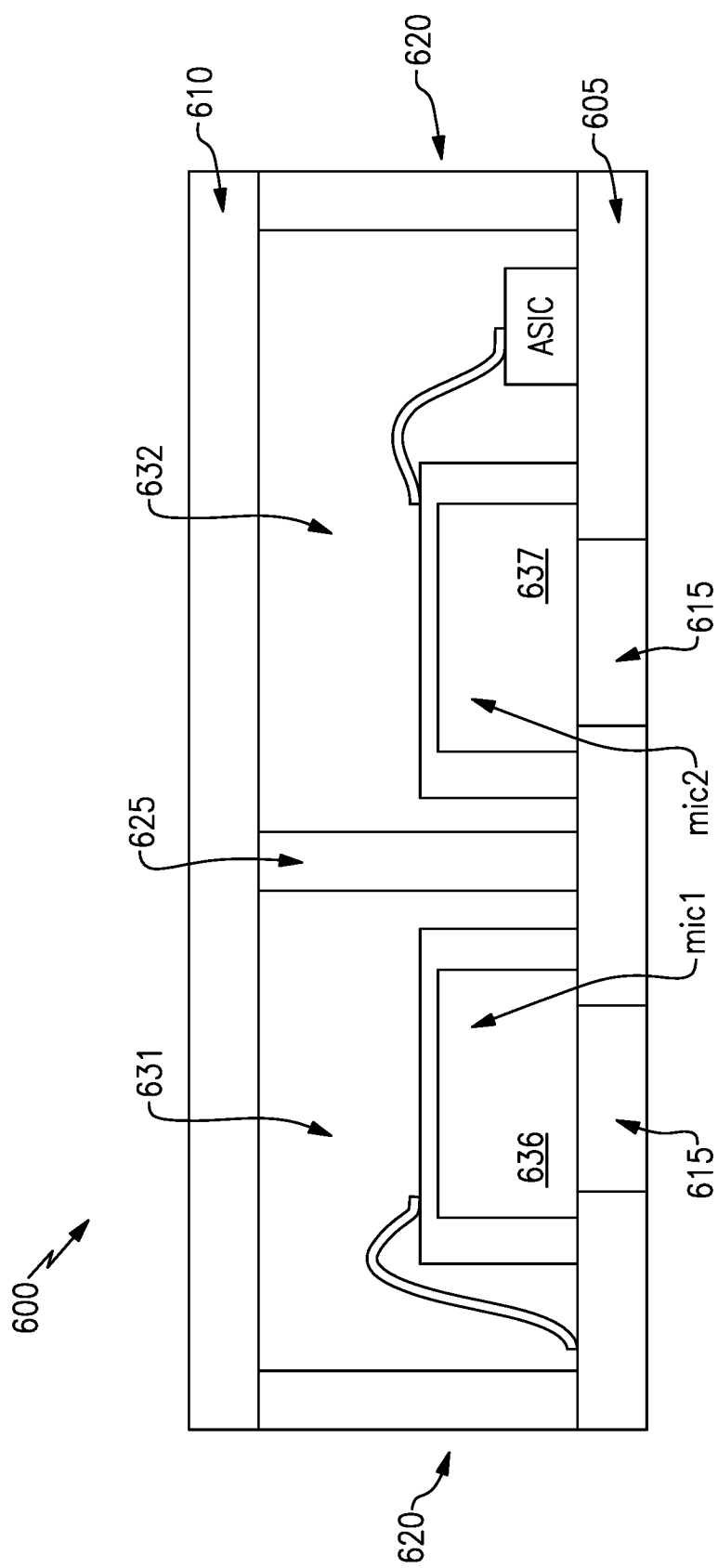
FIG. 6A is a cross-sectional diagram of an example of a laminate-on-laminate package for multiple microphones having separate back cavities for each microphone.

FIG. 6A is a cross-sectional illustration of a laminate-to-laminate type package 600 for two microphones as described herein, one of which being the primary microphone and the other being the reference microphone. The microphones in this figure as well as the other following figures of microphone packages are labelled mic1 and mic2, either of which may be the primary microphone and the other of which may be the reference microphone. The package 600 may include a base or bottom 605 formed of a laminate material, for example, a printed circuit board (PCB) and a ceiling or top 610 also formed of a laminate material, for example, a PCB. Acoustic ports 615 for the microphones are defined in the base 605. The base 605 and ceiling 610 are joined by outer walls 620 also formed of a laminate material, for example, a PCB. An interposer or central wall 625 also formed of a laminate material, for example, a PCB, together with the base 605, ceiling 610, and outer walls 620 define separate sealed back cavities 631, 632 for the two microphones. The interposer or central wall 625, the base 605, ceiling 610, and outer walls 620 may, in some embodiments all be formed of the same material. The back cavities 631, 632 in this package, as well as the back cavities in the other packages discussed below, are considered sealed even though apertures or slits in the membranes of the microphones may allow some passage of air between the back cavities and the front cavities 636, 637 of the microphones and the acoustic ports. An ASIC chip in electrical communication with one or both of the microphones may be placed in one of the back cavities or outside of the package.

Figure 6B:
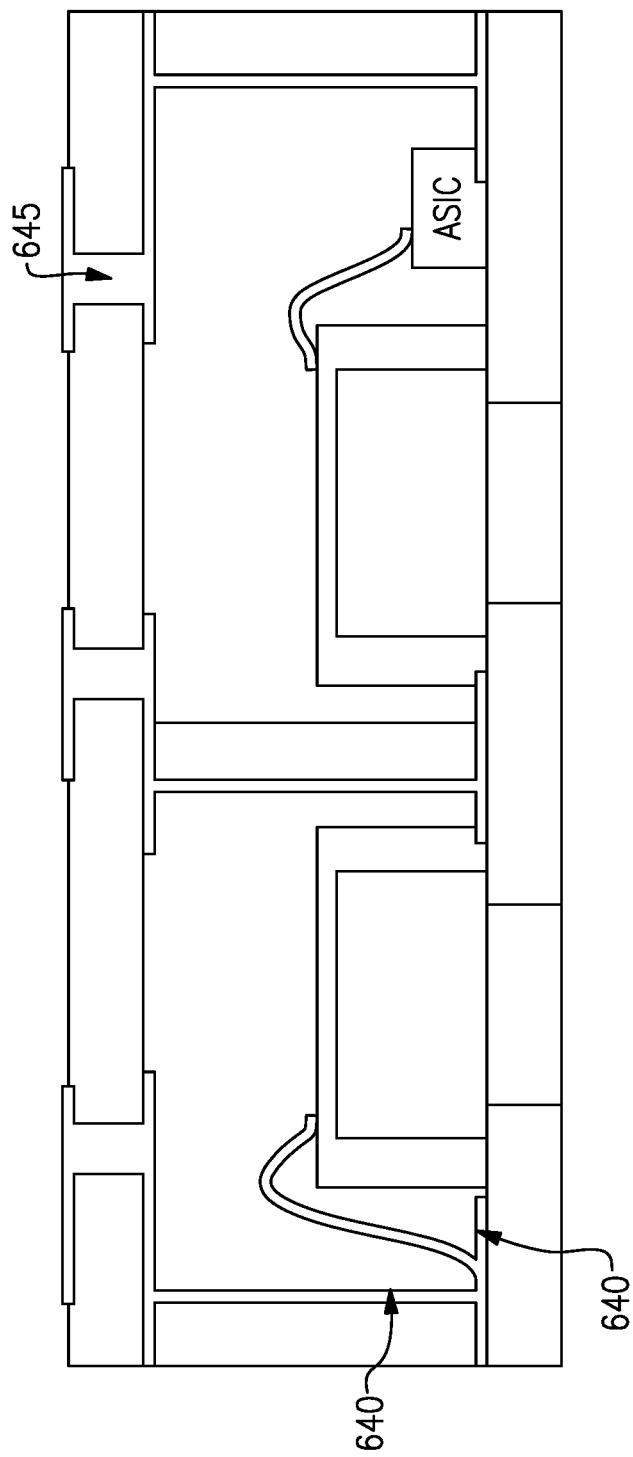
FIG. 6B illustrates a modification to the package of FIG. 6A including coatings of conductive material and a an electrical via.

FIG. 6B illustrates a modification to the package of FIG. 6A in which only the features that are different from the package 600 of FIG. 6A are labelled. The package of FIG. 6B includes coatings 640 of a conductive material, for example, copper or another metal on internal portions of the base 605, ceiling 610, and outer walls 620, and PCB vias 645. By coating the walls with conductive material, electrical routing can also be implemented with this package to provide electrical signal paths from bottom PCB to the top PCB. The electrical routing of the MEMS microphones and ASIC can be done by wire-bonding from the MEMS microphone die and ASIC die to the bottom PCB or to the top PCB. Other methods of mounting the MEMS microphone die to the package, for example, flip-chip mounting, are also possible. The coating 640 of conductive material can also be used to provide shielding against electromagnetic interference (EMI) and radio frequency interference (RFI) to reduce electronic malfunction susceptibility by blocking unwanted external electromagnetic waves or preventing internal electromagnetic waves from emitting from the package and interfering with other circuits or devices. To provide this functionality the coating 640 of conductive material may additionally or alternatively be disposed on outside surfaces of the base 605, ceiling 610, and outer walls 620 of the package, as illustrated in FIG. 6C.

Figure 6C:
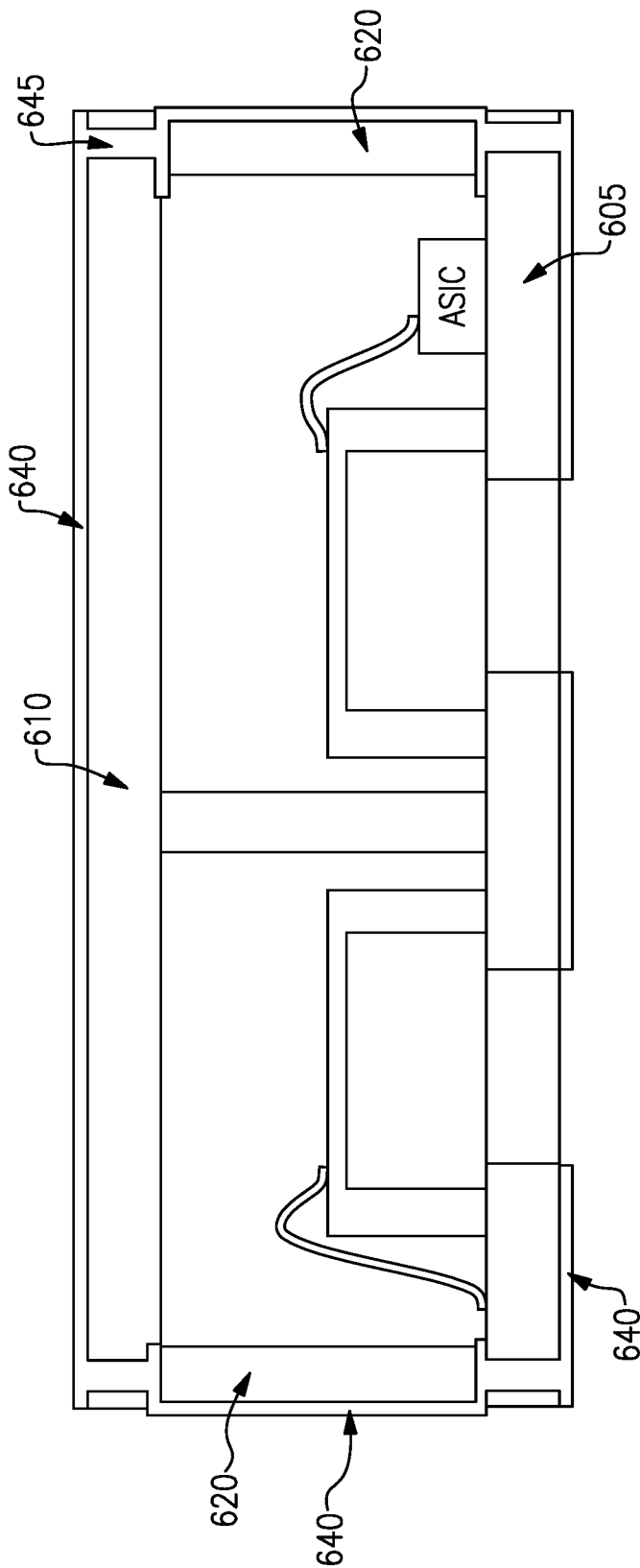
FIG. 6C illustrates a modification to the package of FIG. 6A including an outer coating of conductive material.
Figure 6D:
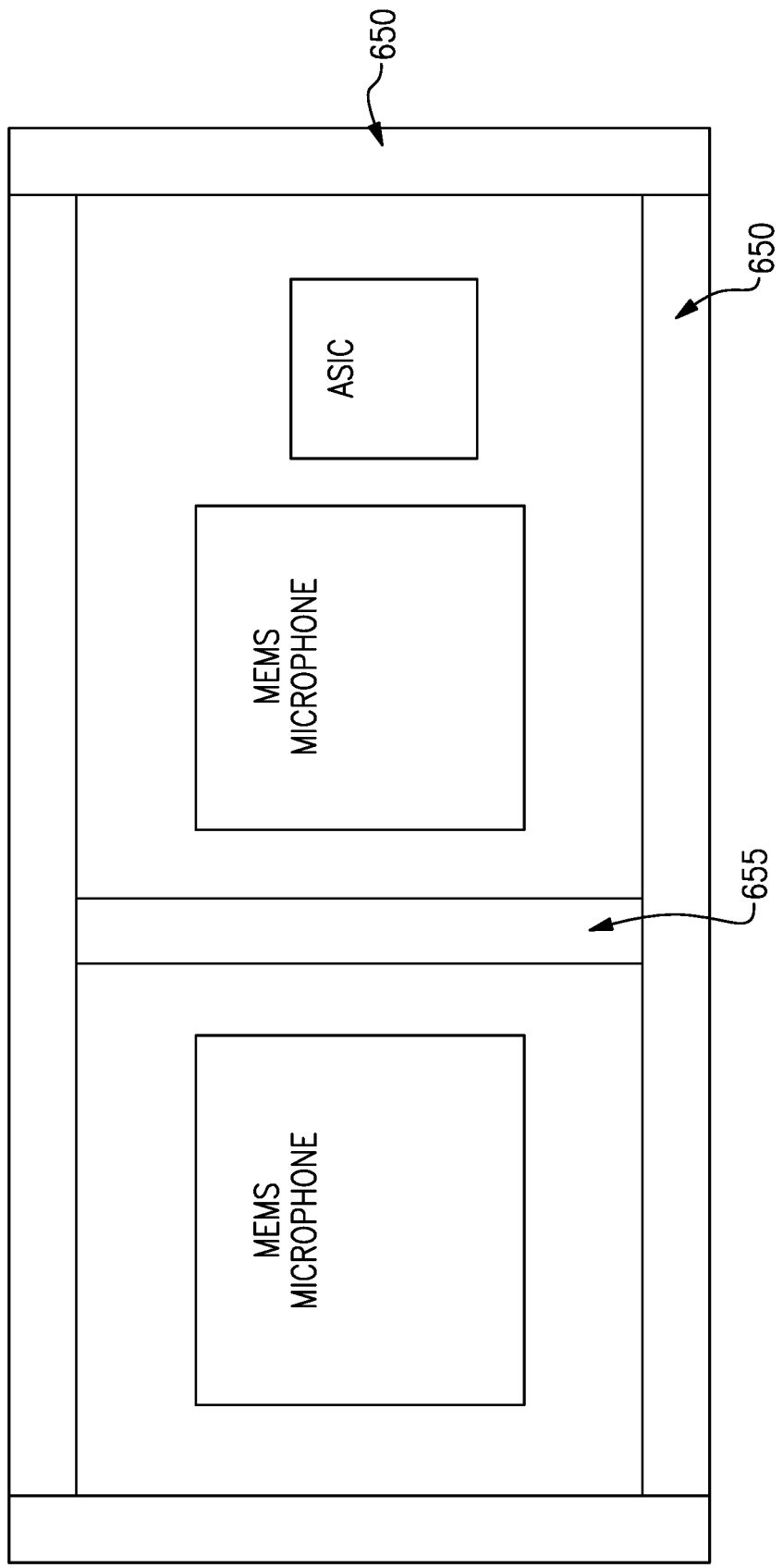
FIG. 6D is a plan view of the bottom laminate board of the package of FIG. 6A.

A top view of the bottom PCB 605 of the packages of any of FIGS. 6A-6C is shown in FIG. 6D. The edge of the bottom PCB 605 has certain areas 650 reserved for the bonding of the outer walls 620. Inside the bottom PCB 605 within the area defined by the edges of the bottom PCB 605, extra area(s) 655 are reserved for the bonding of interposer or central wall(s) 625 to separate the microphones. In the examples of FIGS. 6A-6D, two microphones are placed within their individual back cavities, eliminating or reducing the acoustic coupling between them. More than two microphones can also be provided in packages in accordance with this method. As noted above, an ASIC (Application-Specific Integrated Circuit) chip in electrical communication with one or both of the microphones can be placed in one of the back cavities or outside of the package.

Figure 6E:
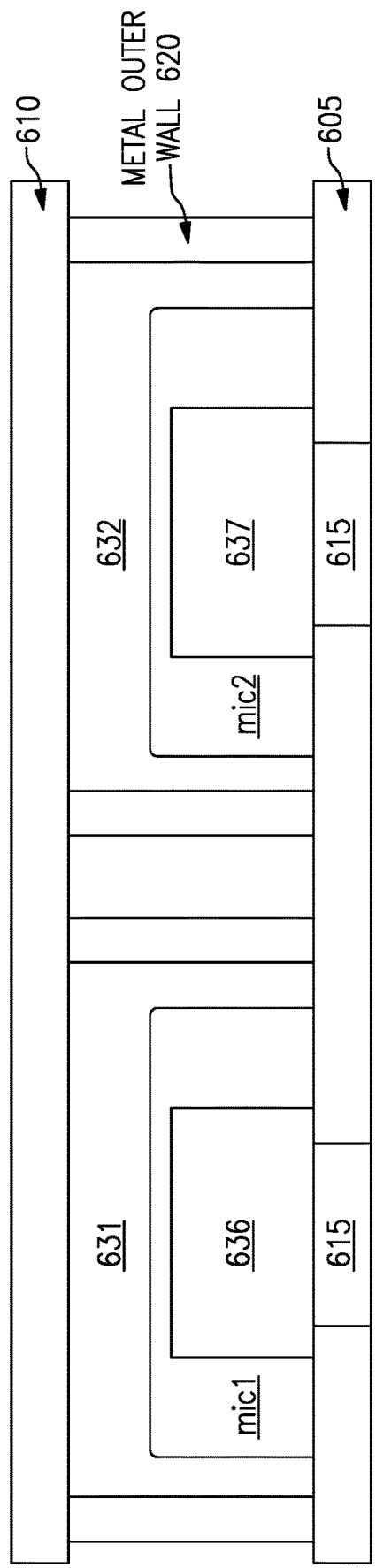
FIG. 6E illustrates a modification to the package of FIG. 6A including metal outer walls around each microphone.
Figure 6F:
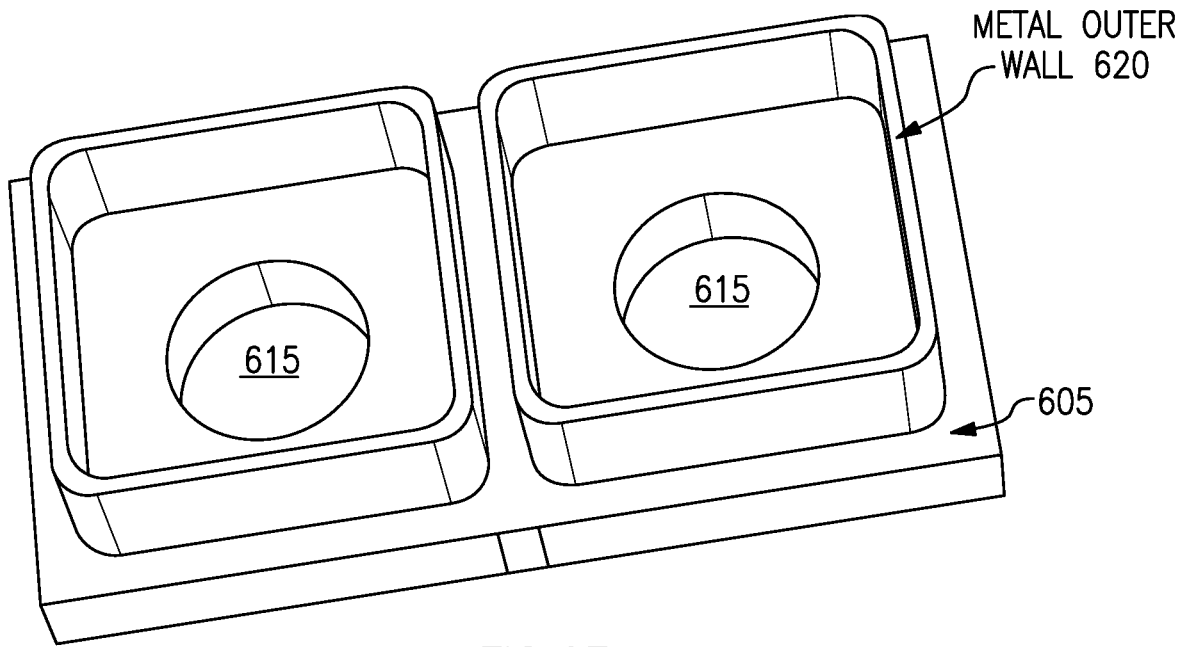
FIG. 6F illustrates an example of an arrangement of the metal walls of the package of FIG. 6E.
Figure 6G:
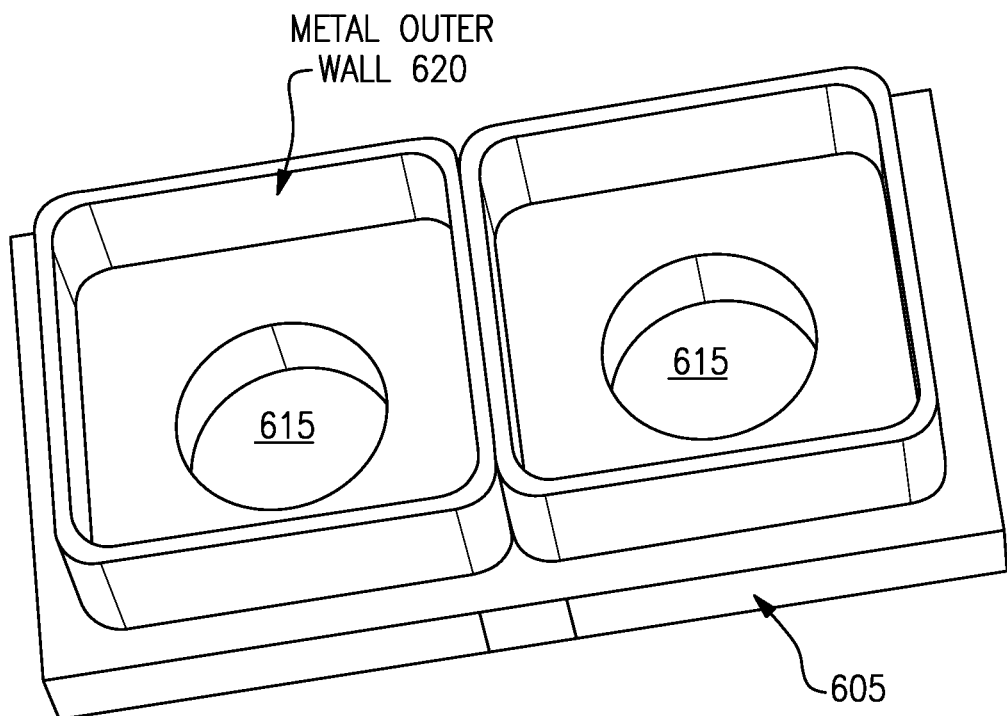
FIG. 6G illustrates another example of an arrangement of the metal walls of the package of FIG. 6E.

In another variation of the package 600 of FIG. 6A, the outer walls 620 may be formed of metal, for example, copper, aluminum, or another suitable metal. The metal outer walls 620 may extend from the upper surface of the bottom PCB 605 to the lower surface of the top PCB 610 and surround each of the microphones. The metal outer walls may help provide shielding for the microphones and any other circuitry within the metal outer walls against electromagnetic interference. An example of this variation is shown in FIG. 6E in cross-sectional view. As illustrated in FIGS. 6F and 6G in isometric views showing only the bottom PCB 605 and metal outer walls 620, the metal outer walls may be spaced apart from one another (FIG. 6F) or may abut one another (FIG. 6G). In a further variation illustrated in FIG. 6H the outer walls may be defined by apertures cut in a single metal block or plate 660.

Another form of packaging for defining separate back cavities for a primary microphone and a reference microphone in the same package is referred to herein as lid-on-laminate packaging. In one example of a lid-on-laminate package, indicated generally at 700 in FIG. 7A, two lids 705 may be disposed over the microphones, one lid for each microphone, on the same laminate or PCB base or bottom 605. The metal lids 705 seal the back cavities 631, 632 of each of the microphones mic1, mic2.

Figure 7C:
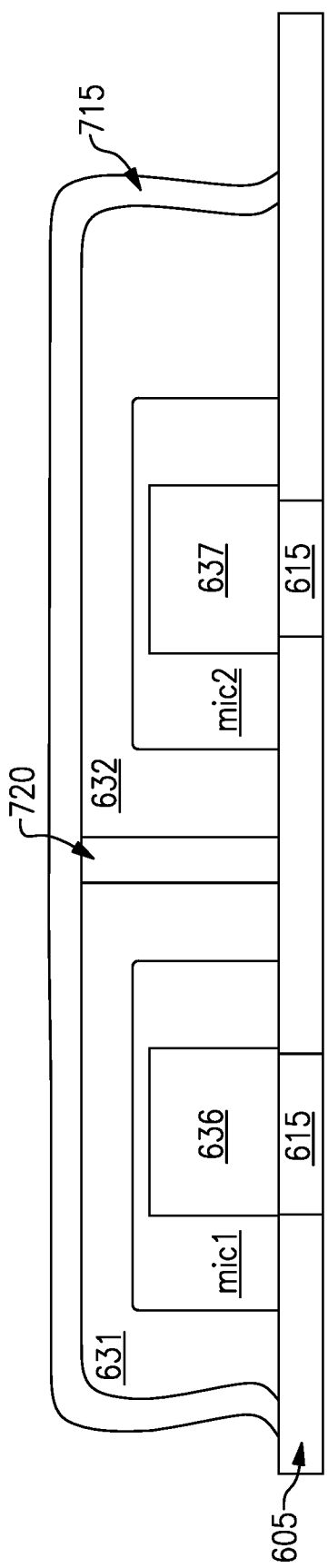
FIG. 7C illustrates another alternative configuration for the package of FIG. 7A.

Instead of using two separate metal lids 705 to define the back cavities for the microphones, as in the embodiment of FIG. 7A, one may utilize a single metal lid structure 710 in which a region 710A of the lid structure 710 is pressed downward into contact with the laminate or PCB base or bottom 605 to separate the back cavities 631, 632 from one another so pressure applied to one of the back cavities does not propagate to the other. An example of this type of package is illustrated in cross-section in FIG. 7B. Alternatively, one may utilize a single metal lid 715 in addition to a wall 720 extending downward from the lower surface of the metal lid 715 to the upper surface of the laminate or PCB base or bottom 605 to define and acoustically separate the back cavities 631, 632, as illustrated in cross-section in FIG. 7C.

Figure 7D:
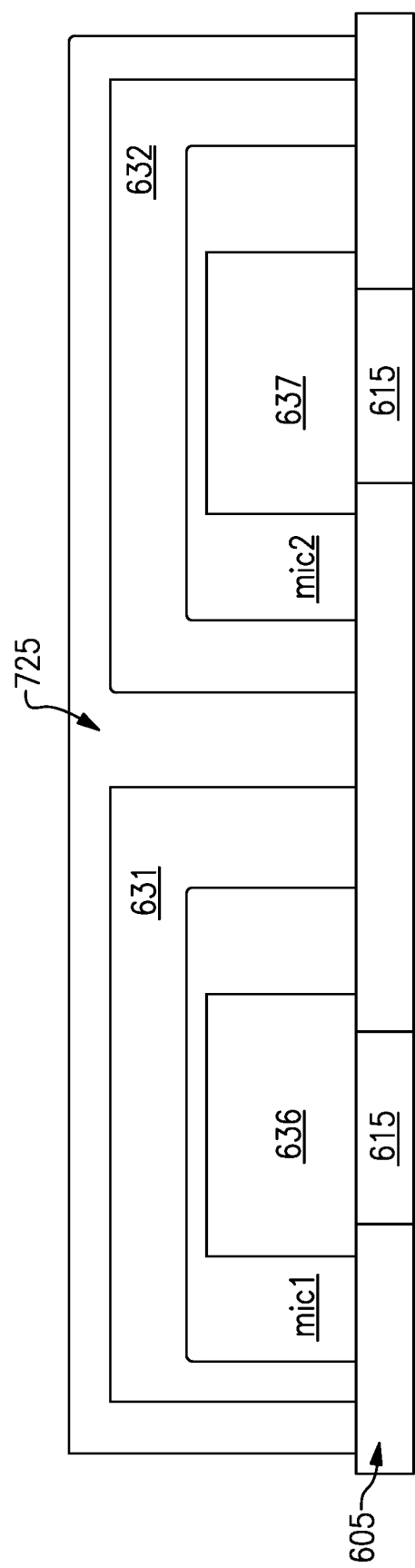
FIG. 7D is a cross-sectional view illustrating that the lid of the package of FIG. 7A may be formed from a metal block including a pair of recesses.
Figure 7E:
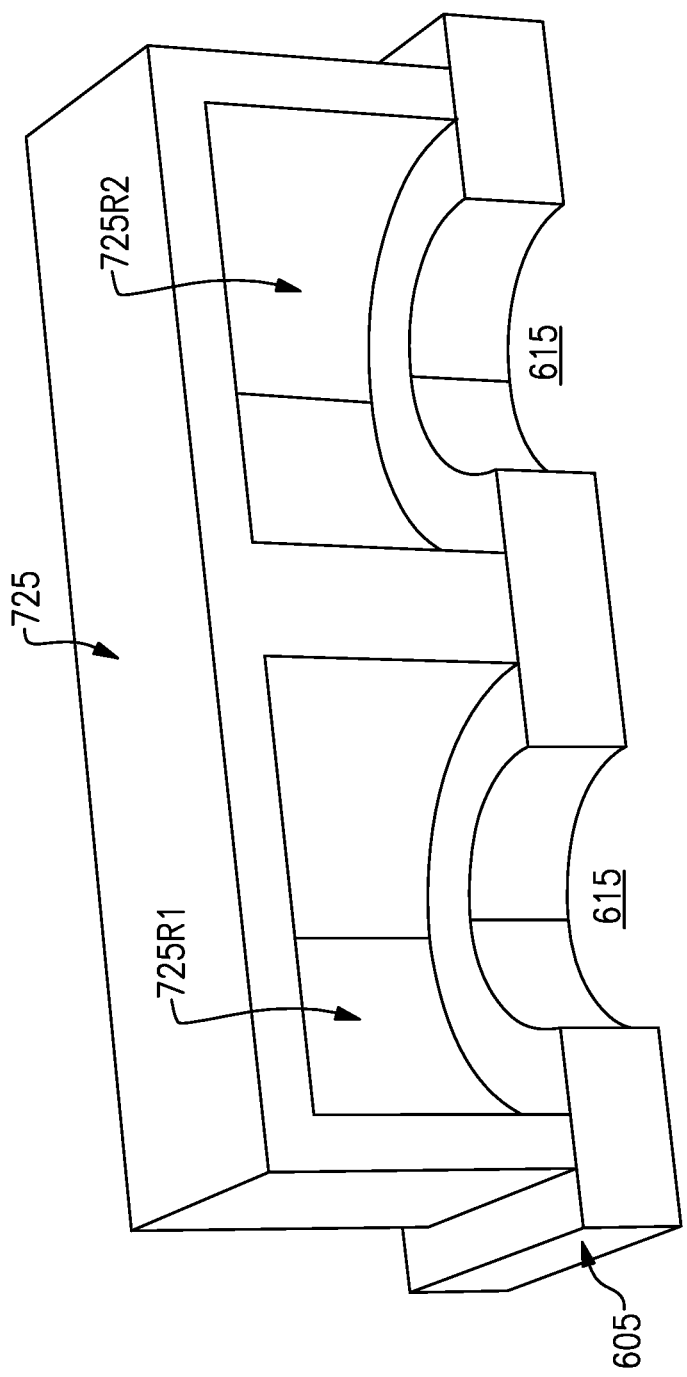
FIG. 7E is a partial cut away isometric view of a portion of a package having the lid formed of the metal block of FIG. 7D.

In a further embodiment of a lid-on-laminate package, illustrated in cross-section in FIG. 7D and in a cut away isometric view in FIG. 7E, the metal lid may be formed from a single metal block 725 with recesses 725R1, 725R2 defined in the metal block to define the outer walls of the cavities 631, 632.

Figure 8A:
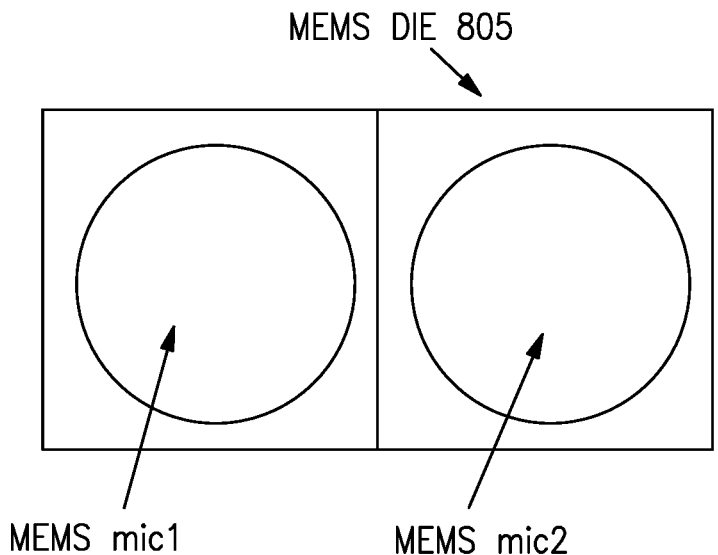
FIG. 8A is a plan view of a die including two piezoelectric microelectromechanical systems microphones.
Figure 8B:
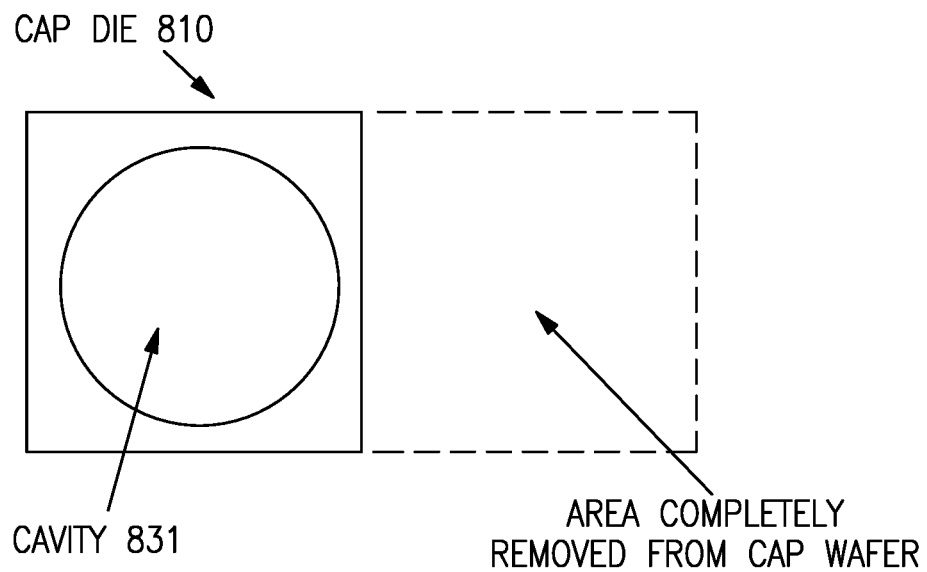
FIG. 8B is a plan view of a cap die including a cavity for one microphone.
Figure 8C:
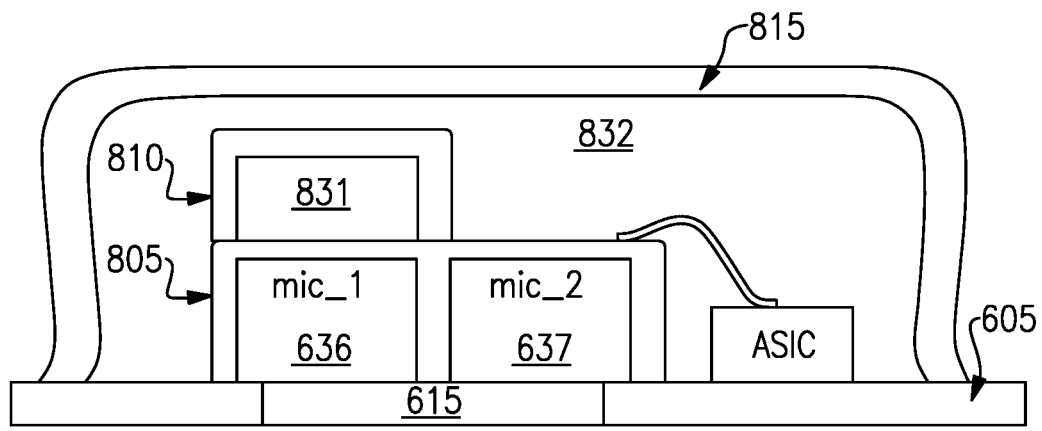
FIG. 8C is a cross-sectional view of a lid-on-laminate package including the die of FIG. 8A and cap die of FIG. 8B.

In accordance with another aspect, packaging for MEMS microphones as disclosed herein may be accomplished through wafer level packaging. A single MEMS die 805 may include two or more microphones (See FIG. 8A) and may be mounted on a laminate or PCB base or bottom 605. Each of the microphones may have its own acoustic port 615 or, alternatively, two or more of the microphones may share an acoustic port 615. A cap die 810 from a cap wafer with a small cavity 831 (See FIG. 8B) may be bonded on top of the MEMS die 805 to form an individual cavity or cavities for one or more of the microphones. A lid 815 formed of, for example, metal may be disposed on the laminate or PCB base or bottom 605 over the MEMS die 805 and cap die 810 to define the back cavity 832 for the microphone or microphones not having a back cavity 831 defined by the cap die 810. One example of such a packaging structure 800 is illustrated in FIG. 8C.

In a MEMS microphone wafer level package as disclosed herein the thickness of cap wafer may be a few hundred μm or thicker than 1000 μm. The cap wafer may be etched from one side to form cavities on certain areas. Larger cap wafer thickness may provide for the formation of larger cavities. The remaining material in the cap wafer over the cavities forms a membrane that could be a few hundred nm thick or up to a few hundred μm thick. The membranes of the cap wafer should be much thicker than the MEMS microphone membranes or cantilevers which are usually a few hundred nm thick so that the cap wafer membrane will have a resonance frequency much higher than the resonance frequency of MEMS microphones. This can be seen for mic in the example of FIG. 8C. As illustrated in FIG. 8B, the cap wafer will be completely etched through on certain areas to remove the material in these areas. Therefore, after wafer bonding, MEMS microphones in these areas will be directly exposed to the large back cavity 832 formed by the metal lid 815. This can be seen for mic2 in the example of FIG. 8C.

Figure 8D:
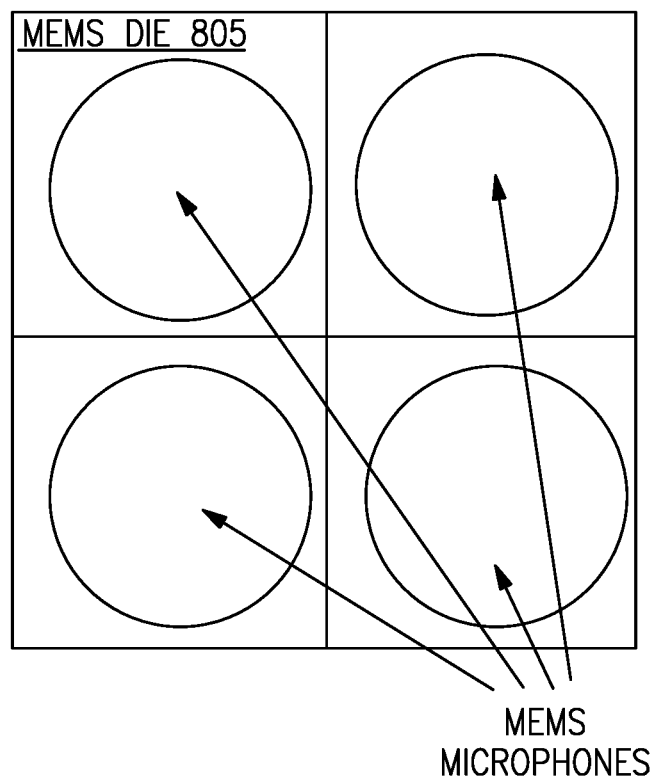
FIG. 8D is a plan view of a die including four piezoelectric microelectromechanical systems microphones.
Figure 8E:
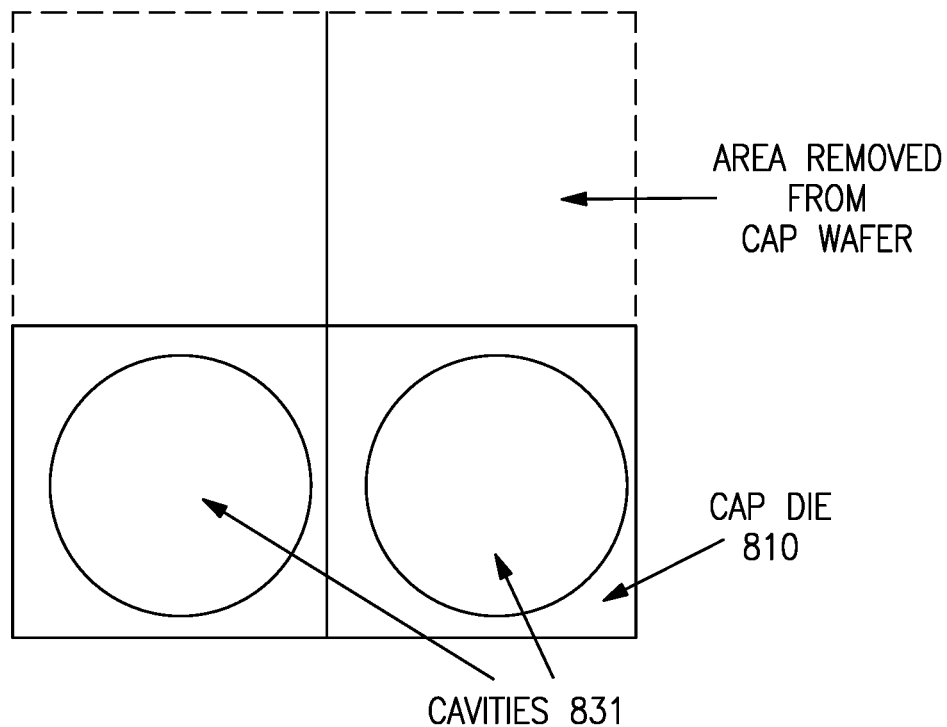
FIG. 8E is a plan view of a cap die having cavities for two microphones.

Another example of forming two back cavities with a cap wafer is shown in FIGS. 8D and 8E. This example has a MEMS die 805 including four microphones with two of the microphones having back cavities 831 defined by a cap die 810 formed from a cap wafer. The other two microphones do not have cap wafer on top, therefore, the back cavity for these microphones will be the cavity 832 in the lid 815 as illustrated in the embodiment of FIG. 8C.

Figure 8F:
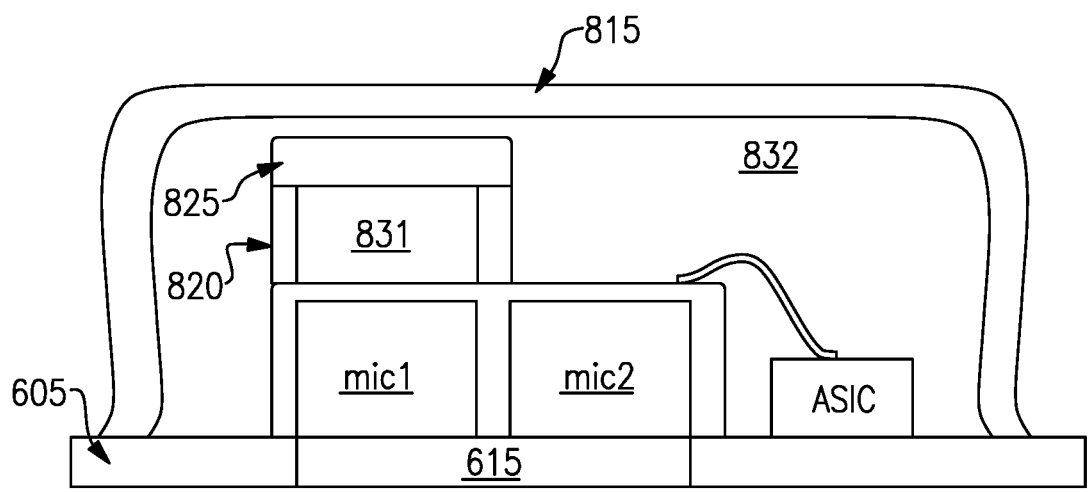
FIG. 8F illustrates a lid-on-laminate package including a back cavity for a microphone having polymeric walls.

Another example of forming two back cavities for two different MEMS microphones as disclosed herein with a polymer-walled cavity is shown in FIG. 8F. The sidewalls 820 of the cavity 831 are polymer walls produced by standard lithographic photoresin patterning. The cavity 831 is completed by a lid 825 formed of, for example, silicon attached on top of the polymer sidewalls 820. A second cavity 832 is defined by a metal lid 815 disposed on the laminate or PCB base or bottom 605 over the microphones and polymer cavity structure.

Multi-cavity packages for MEMS microphones as disclosed herein may be formed including a top port rather than acoustic ports in the laminate or PCB base or bottom 605 as disclosed in the above referenced examples. Top-port MEMS microphone packages with multiple cavities are shown in FIGS. 9A and 9B. In some embodiments an acoustic port 915 is opened at the top of the package, for example, in the lid 705 for a lid-on-laminate package (FIG. 9A), or the top PCB 610 for a laminate-to-laminate package (FIG. 9B). The cavities at the back of MEMS die 805 are used as the back cavities 636, 637 for the MEMS microphones. The microphones share a front cavity 936 defined by the laminate or PCB base or bottom 605 and lid 705 (FIG. 9A) or the laminate or PCB base or bottom 605, top PCB 610, and sidewalls 620 (FIG. 9B).

Figure 10:
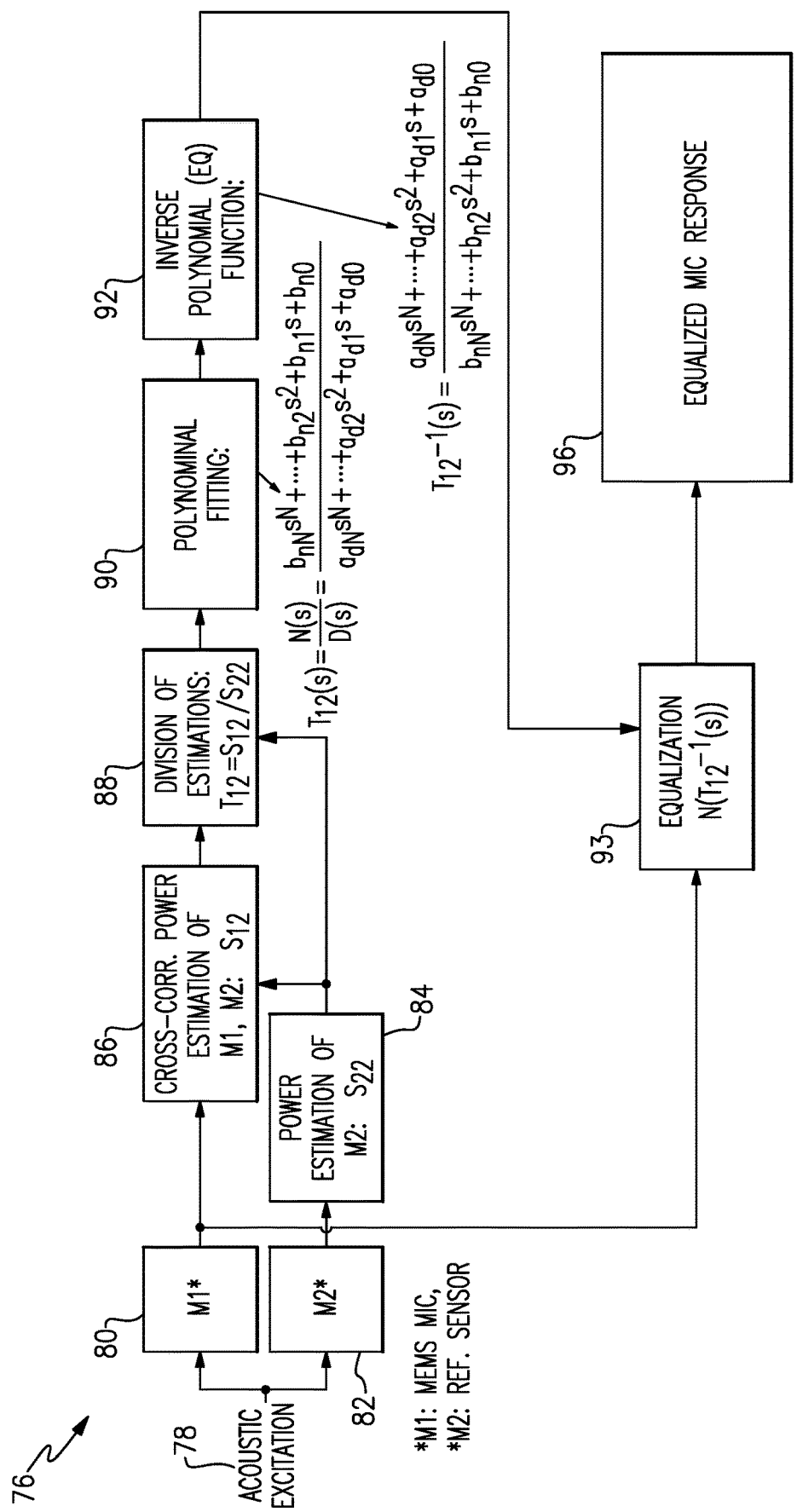
FIG. 10 is a functional block diagram of an equalization method according to another embodiment.

Each of the electronic acoustic devices disclosed herein, including the electronic acoustic devices 2, 12, 34, 42, 50, and 52 utilizes an equalization method for removing the resonance peak in the frequency response of a MEMS microphone. FIG. 10 illustrates such an acoustic equalization method 76.

The equalization method 76 begins with an acoustic wave or excitation 78. The acoustic excitation is passed to at least two MEMS microphones as a common acoustic excitation. As an example and shown in FIG. 10, the at least two microphones include a primary MEMS microphone 80 and a reference MEMS microphone 82 (although the described equalization method is applicable to each of the electronic acoustic devices described herein).

In an act 84 of the method 76, the transduced signal from the reference microphone 82, which in this example has a higher resonance frequency than the primary microphone 80, is processed to estimate the power spectrum of the transduced signal. In at least one embodiment, the power spectrum is obtained by calculating the Fast Fourier Transform (FFT) of the transduced signal to produce a spectrum estimate $S_{22}$. It is understood that other techniques may be applied to estimate a power spectrum of a transduced signal. For example, Welch estimation, or other techniques that do not use the FFT, such as the Goertzel filter algorithm, may be applied to estimate the power spectrum of the transduced signal. In other examples, Kalman filters may utilized in place of the FFT to extract a transfer function estimate of the microphone(s).

In an act 86 of the method 76, the cross-correlation $R_{12}$ of time-domain samples produced from the transduced signals of the primary microphone 80 and the reference microphone 82 is obtained. Subsequently, the frequency-domain power spectrum estimate $S_{12}$ of the cross-correlation $R_{12}$ is calculated.

In an act 88, the power spectrum estimate $S_{12}$ of the cross-correlation $R_{12}$ is divided by the power spectrum estimate $S_{22}$ of the reference sensor to produce a transfer function estimate $T_{12}$ of the primary microphone 80.

In an act 90, a polynomial of order N is fit to the quotient of the transfer function estimate $T_{12}$, where N≥2.

Once the polynomial is obtained, the method 76 proceeds to an act 92, where the inverse of the polynomial $T_{12}^{-1}$ is calculated as an equalization function for the primary microphone 80. Certain embodiments utilize a least-squares fit of coefficients to the frequency points of the transfer function estimate $T_{12}$ in the act 92. In an example, the order N is 3 and at least four frequency points are used in order for there to be a sufficient rank to solve for the curve.

In an act 93, the frequency response of the primary microphone 80 is filtered with the inverse polynomial $T_{12}^{-1}$ to produce an equalized frequency response in the primary microphone 80 at 96. In the act 93, the coefficients obtained by act 92 are passed to act 93, and act 93 includes a fetch procedure to fetch the coefficients and re-program/update the filter function N with such coefficients. Act 93 therefore provides an adaptive filter that is reconfigurable using the coefficients of the equalization function N. The adaptive filter may then continuously process and filter the transduced signal produced by the primary microphone.

As a consequence of performing the equalization method 76, the impact of noise on the estimation of the transfer function of the primary microphone 80 may be reduced. In certain examples, the power spectrum estimation algorithms used in the equalization method 76 use accumulation and averaging of the FFT of the signal samples, which is equivalent to improving the immunity to noise—as noise variance is reduced with averaging, and therefore allows extraction of a 'cleaner' transfer function.

Figure 11:
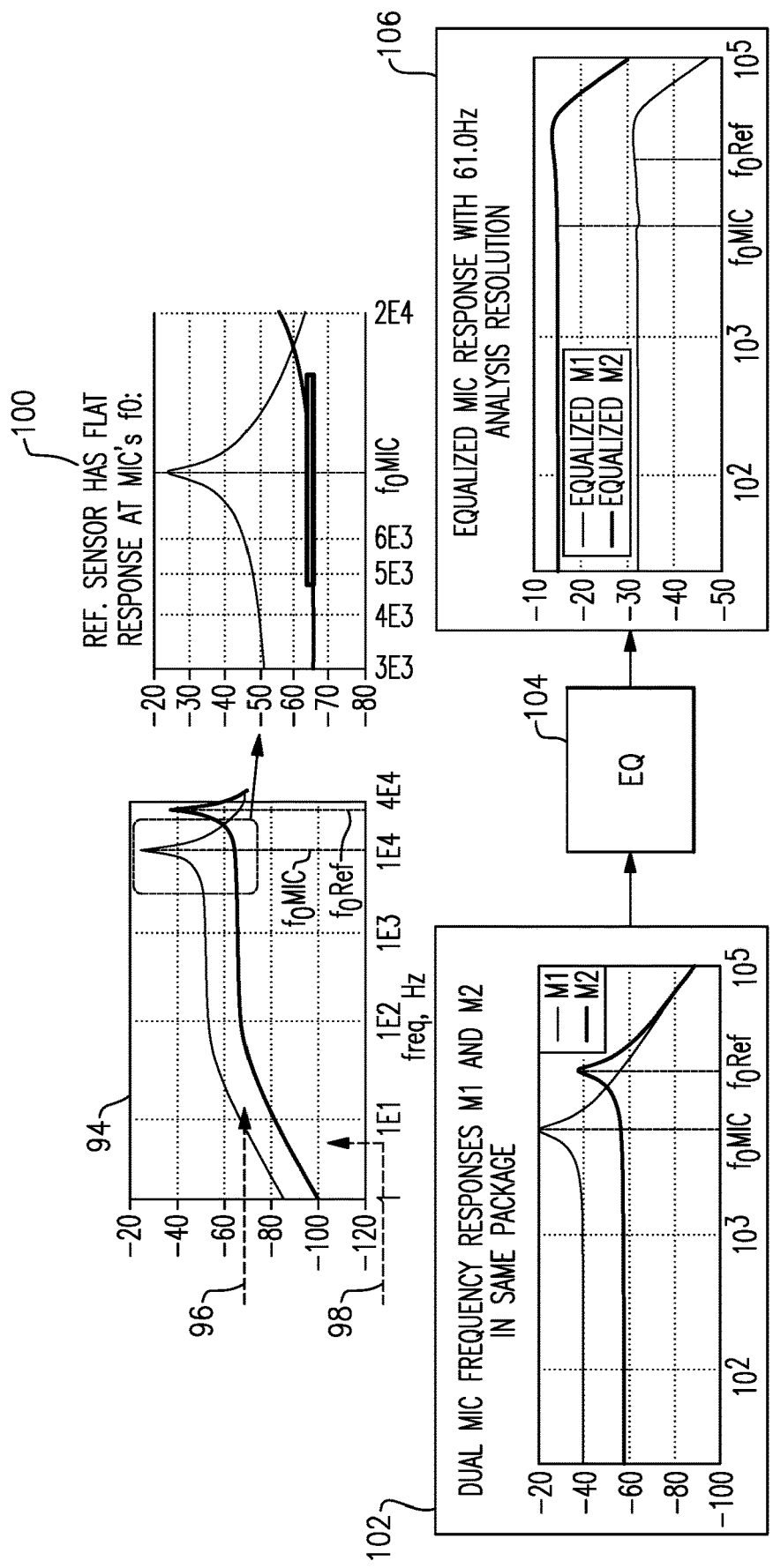
FIG. 11 is a set of frequency response graphs and a functional block diagram according to another embodiment.

FIG. 11 shows a set of frequency response graphs 94, 100, 102, 106 and a functional block diagram 104. Before equalization (e.g., applying the method 76), a frequency response 96 of a primary microphone and a frequency response 98 of a reference microphone are presented in a first frequency response graph 94. The lowest resonant frequency or fundamental frequency $f_0$ is represented by a peak in each frequency response in the graph 94. Of note, as shown in the graph 100, the reference microphone has a substantially flat frequency response at the fundamental frequency of the primary microphone. The graph 94 and the graph 100 represent frequency responses without equalization. The graph 100 is a zoomed-in view of the first frequency response graph 94. A condition for the frequency response of the reference microphone therefore, may be that the frequency response is monotonic around the reference microphone's resonance (i.e., no ups and downs in the vicinity of the resonance of the primary microphone, but with the possibility of a sloped (increasing or decreasing) sensitivity.

The graph 102 is equivalent to the first frequency response graph 94 and the graph 100. The graph 102 represents the frequency responses of two microphones (e.g., the primary microphone 80 and the reference microphone 82) in the same package, which are then processed by an equalization module 104 (e.g., having the same or similar functionality as the equalization module 11 in FIG. 1) to produce an equalized frequency response shown in the graph 106, where both frequency responses are roughly flat at the primary microphone's fundamental frequency.

Figure 12A:
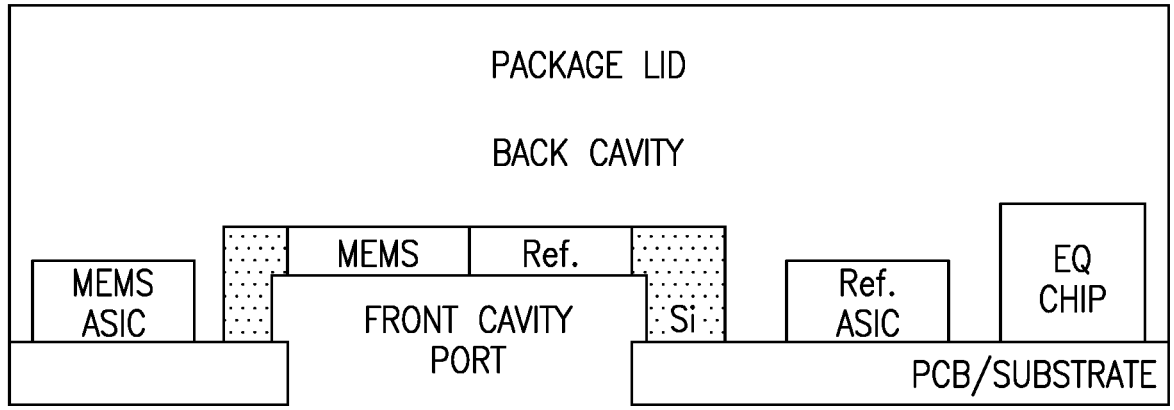
FIG. 12A is a cross-sectional view of a module including a co-packaged MEMS microphone and reference sensor that share an acoustic port.
Figure 12B:
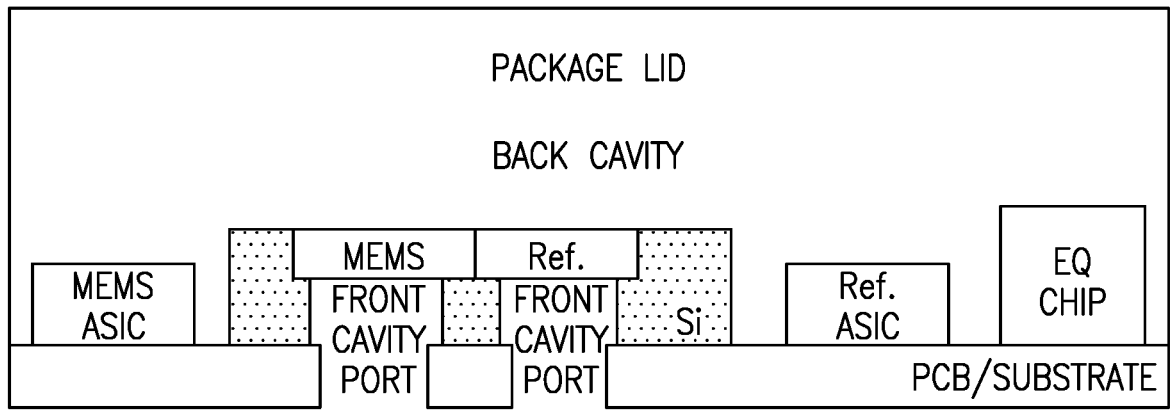
FIG. 12B is a cross-sectional view of a module including a co-packaged MEMS microphone and reference sensor that have separate acoustic ports.
Figure 12C:
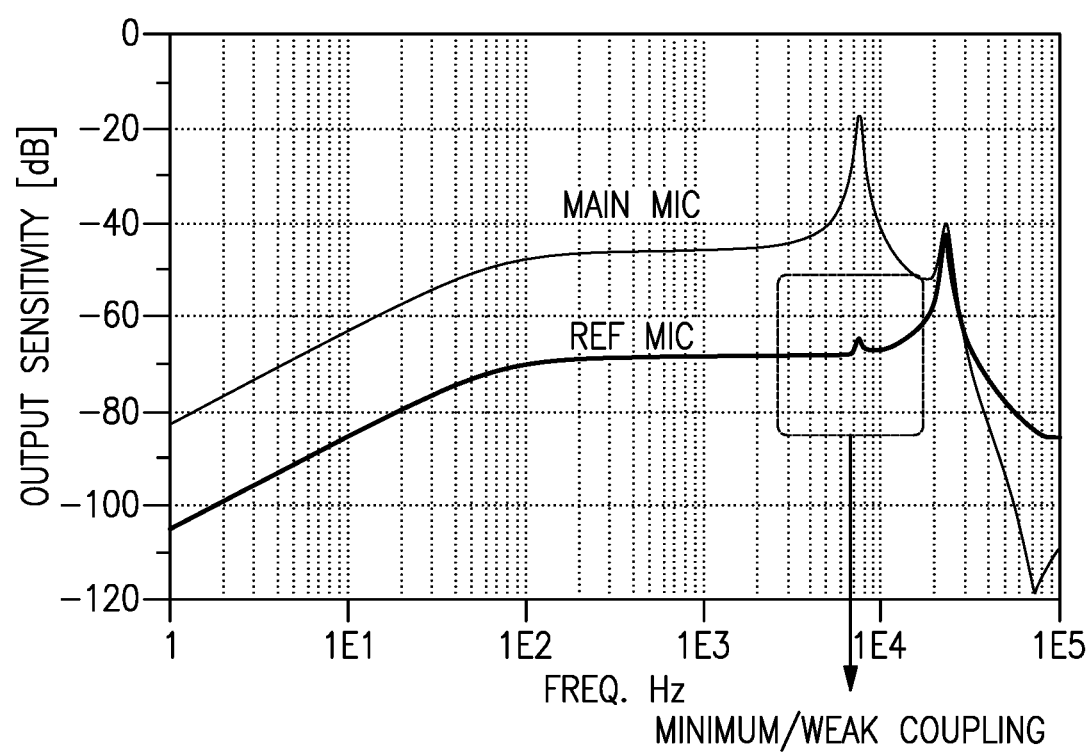
FIG. 12C illustrates frequency response curves for a co-packaged MEMS microphone and reference sensor that are acoustically decoupled.

In accordance with another aspect, there is provided embodiments of co-packaged MEMS microphones and reference sensors and methods of minimizing acoustic coupling between the two to minimize or eliminate the effects that may result in a poor frequency response curve for the microphone, for example, as illustrated in FIG. 5B above. A MEMS microphone and reference sensor may be provided in a package such as illustrated in FIG. 12A or 12B and still provide frequency response curves for the microphone and reference sensor as illustrated in FIG. 12C that are suitable for equalization, for example, utilizing embodiments of the method disclosed above. It should be noted that the frequency response curves for the microphone and reference sensor illustrated in FIG. 12C are from a co-packaged MEMS microphone and reference sensor formed on the same substrate by the same manufacturing process. In the comparative example of FIG. 5B the frequency response curves for the microphone and reference sensor are from a co-packaged MEMS microphone and reference sensor formed by the same manufacturing process but not necessarily on the same substrate, and co-packaged in a package as illustrated in FIG. 5B.

Figure 13:
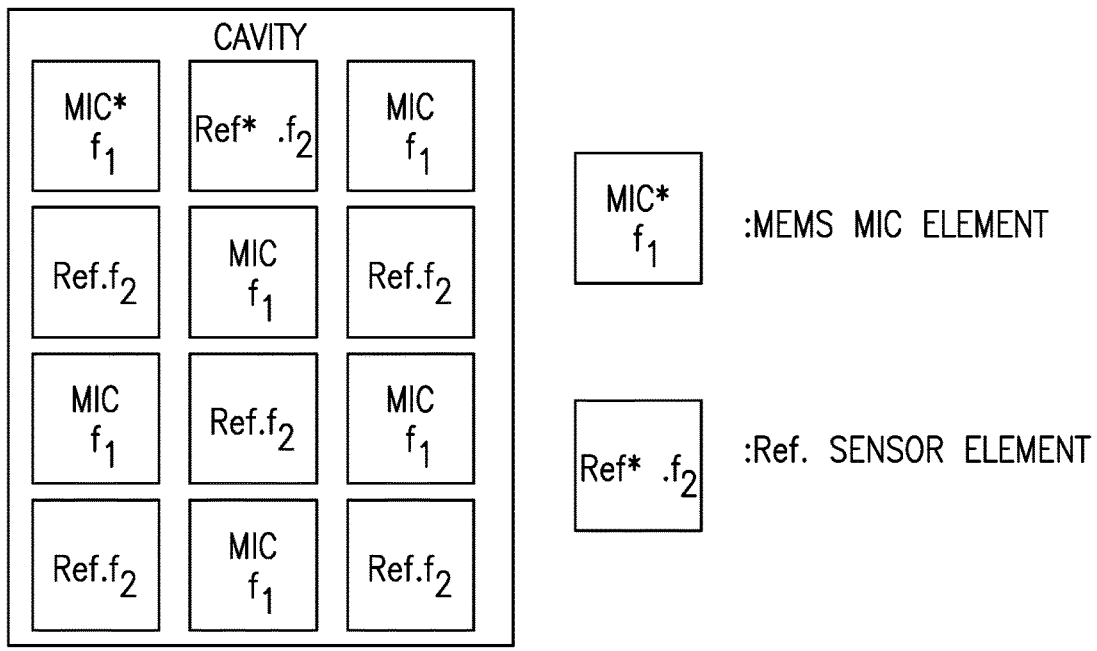
FIG. 13 illustrates an array of MEMS microphones and reference sensors that may be included in a device as disclosed herein.

In accordance with one aspect, there is provided a co-located MEMS microphone and reference sensor system including a MEMS microphone that has an in-band resonance frequency lower than 20 kHz, for example, within a range of 7-13 kHz, and a reference sensor that has an out-of-band resonance frequency higher than 20 kHz, for example, within a range of 20-24 kHz. The MEMS microphone and reference sensor are provided in a manner that they are spatially co-located and in a plane normal to the direction of incidence of acoustic excitation so they are exposed to the same magnitude and phase of acoustic pressure. Co-location of the MEMS microphone and the sensor is done by means of system-in-package or system-on-chip integration. The MEMS microphone and the reference sensor may be manufactured using the same process flow and the same photolithographic mask set, or they may be manufactured using different process flows and/or photolithographic masks. The MEMS microphone and the reference sensor may be singulated as separate chips or as a single chip with the two devices. The MEMS microphone and/or the reference sensor may be piezoelectric transducer devices. The MEMS microphone and the reference sensor may share an acoustic port, a front cavity, and a back cavity, the MEMS microphone and the reference sensor may have separate acoustic ports, front cavities, and back cavities, or any combination of shared or separate acoustic ports, front cavities, and/or back cavities. The MEMS microphone and the reference sensor may be packaged using the same packaging chip or different chips. The co-located MEMS microphone and reference sensor system may include an array of MEMS microphones and reference sensors, for example, as illustrated in schematic plan view in FIG. 13.

In some embodiments, the MEMS microphone design has a resonance frequency in the range of 10-13 kHz where an A-weight noise weighting function is used to evaluate the signal-to-noise ratio (SNR) of the microphone or the MEMS microphone design has a resonance frequency in the range of 7-9 kHz where ITU-R 468 weighting filter is used to evaluate the signal-to-noise ratio (SNR) of the microphone. A MEMS microphone system chip may include at least one MEMS microphone device, one reference sensor, one acoustic port, one front cavity, one back cavity, one signal processing ASIC chip, one substrate with electrical connections to connect the chips, and one lid to provide hermetic packaging to the chips, ports, cavities and substrate. The reference sensor aids the equalization process of the MEMS microphone by sensing the acoustic conditions common to the MEMS mic, and the sensed conditions provide information to equalize the MEMS microphone resonance. The transduced signal of the reference sensor is processed, equalized and blended with the equalized MEMS microphone signal to improve sensitivity and SNR.

The MEMS microphone and the reference sensor may be system-in-package integrated using separate singulated dice coming from different or the same manufacturing and packaging with dedicated ports, cavities, and cans in a module. The MEMS microphone and the reference sensor may alternatively be system-on-chip integrated using a single die singulated from the same wafer and same manufacturing process. In some examples, the MEMS microphone and the reference sensor may share an acoustic port, front-side cavity, and back-side cavity enclosed under the same can. In some examples, the MEMS microphone and the reference sensor may share an acoustic port and back-side cavity, but have dedicated front-side cavities under the same can. In some examples, the MEMS microphone and the reference sensor may share an acoustic port, but have dedicated front-side cavities, and dedicated back-side cavities under the same can. In some examples, the MEMS microphone and the reference sensor may have dedicated acoustic ports, dedicated front-side cavities, and combinations of dedicated/shared back cavities. The MEMS microphone and the reference sensor may be co-located in side-by-side or concentric geometry configurations.

Aspects of a method to decouple the acoustic response of co-located MEMS devices (e.g., a MEMS microphone and reference sensor sharing single back/front cavities) may include the following steps:
a) Define a MEMS microphone with a first resonance frequency $f_1$ and a reference sensor with a second resonance frequency $f_2$;
b) Define a front side cavity volume $V_F$ from the dimensions of the MEMS microphone and the reference sensor;
c) Define a decoupling criterion between the MEMS microphone and the reference sensor, in units of decibels (dB);
d) Initialize thickness H and diameter d dimensions of the acoustic port and define upper and lower boundaries for H and d;
e) Initialize the volume of the back side cavity $V_B$ and define upper and lower implementation boundaries for $V_B$;
f) Calculate the frequency response of the MEMS microphone sensitivity using a lumped parameter model circuit with the provided circuit values, including the resonance frequencies $f_1$ and $f_2$, and the volumes $V_F$ and $V_B$;
g) Measure the coupling between the MEMS microphone and the reference sensor at the resonance frequency of the microphone; and
h) Compare the measured coupling against the defined decoupling criterion and adjust the dimensions of the port and the volume of the back cavity until the decoupling criterion is met and the coupling is minimized.

Alternatively, the decoupling algorithm may start with a fixed back cavity volume and calculates the suitable frequencies that minimize coupling. Alternative cavity and port configurations may be utilized, including, for example:
a) Shared acoustic port, shared front-side cavity, and shared back-side cavity enclosed under the same can;
b) Shared acoustic port, dedicated front-side cavities, and shared back-side cavity under the same can;
c) Shared acoustic port, dedicated front-side cavities, and dedicated back-side cavities under the same can; or d) Dedicated acoustic ports, dedicated front-side cavities, and combinations of dedicated/common back cavities.

Alternative decoupling algorithms may be utilized according to the abovementioned cavity and port configurations.

The lumped parameter model circuit of the full system includes one acoustic signal source connected to the acoustic port provided by the package through a first signal node. The acoustic port connects to the front cavity through a second node. The first terminals of the mechanical part of the MEMS microphone and the reference sensor connect to the second node. The second terminals of the mechanical part of the MEMS microphone and the reference sensor connect to a third node. The back cavity connects to the third node and provides an acoustic termination to both the microphone and sensor. The front cavity, back cavity, and signal source shunt the microphone and sensor, connecting to a common node ("gnd"). The mechanical parts of the MEMS microphone and reference sensor connect to respective electromechanical transformers. The electrical parts of the MEMS microphone and reference sensor connect to the secondary of the electromechanical transformers. The electrical parts of the MEMS microphone and reference sensor are shunted between the transformer and common ("gnd"). The sensitivities of the MEMS microphone and reference sensor are calculated at the output node of the electrical part. The coupling criterion is a function that minimizes the acoustic coupling between the MEMS microphone and the reference sensor.

Figure 14A:
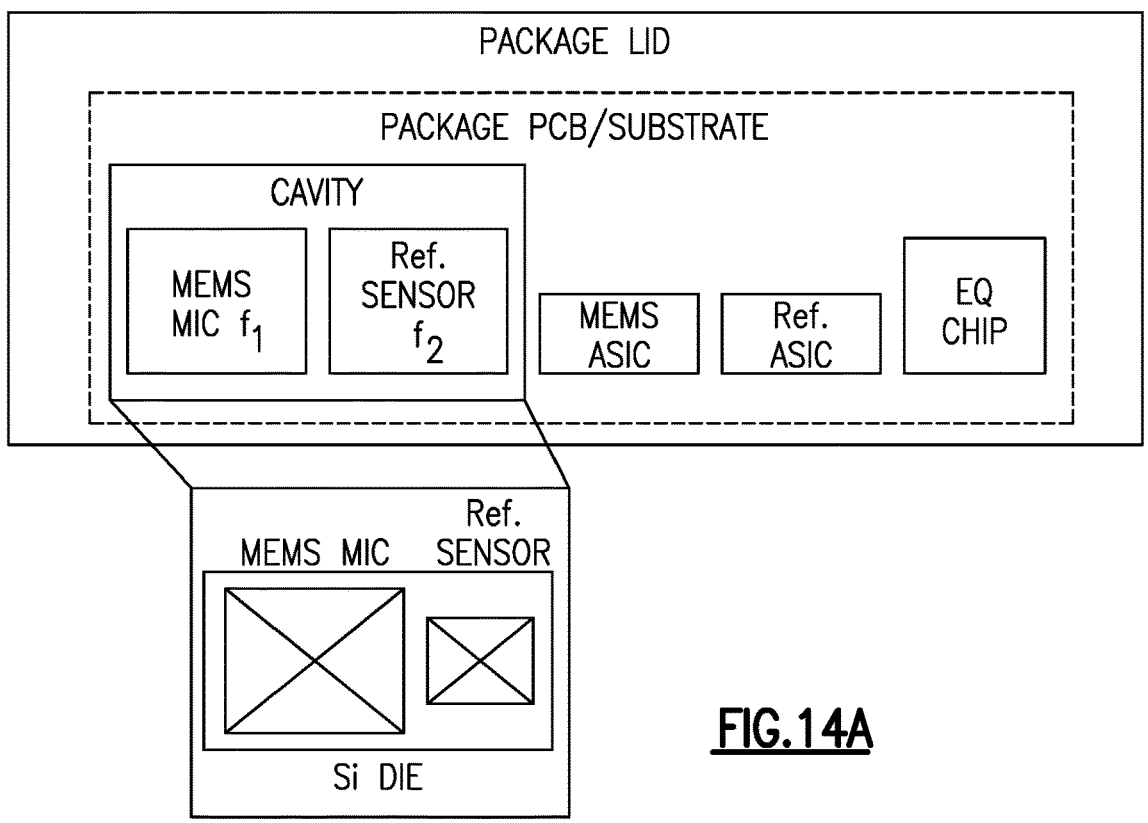
FIG. 14A is a plan view of an example of a system including a co-packaged MEMS microphone and reference sensor.
Figure 14B:
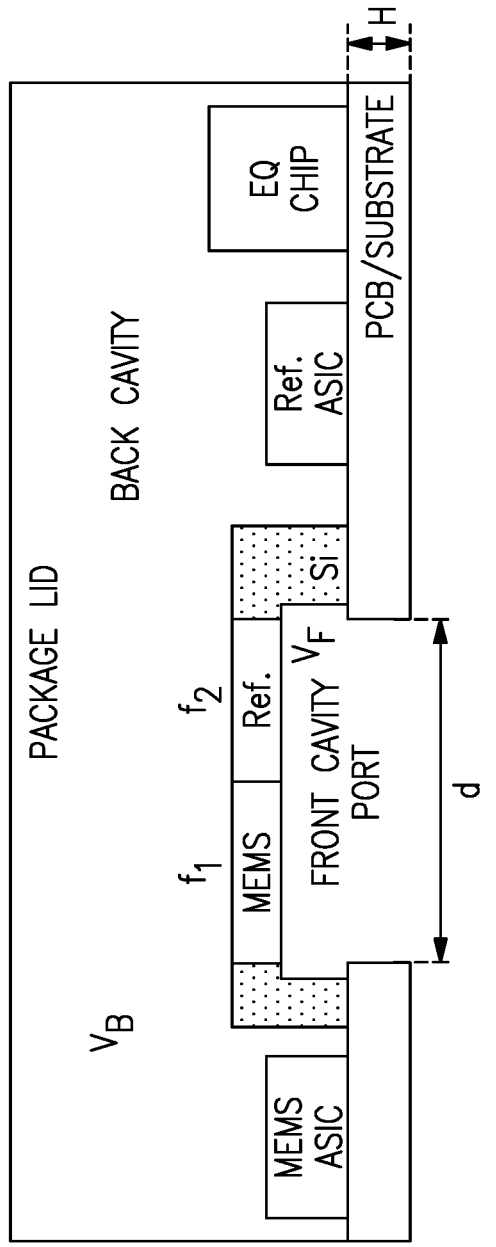
FIG. 14B is a cross-sectional diagram of the system of FIG. 14A.

One embodiment of a method for designing a MEMS microphone and reference sensor system with low acoustic coupling between the MEMS microphone and reference sensor will now be described with reference to a system as schematically illustrated in plan view in FIG. 14A and cross-sectional view in FIG. 14B. Variables for the different parameters of the system, including back cavity volume $V_B$, front cavity volume $V_F$, resonance frequencies $f_1$ and $f_2$ of the microphone and reference sensor, respectively, acoustic port diameter d, and substrate height H are illustrated in the cross-sectional view in FIG. 14B. This embodiment of the method starts with fixed frequencies $f_1/f_2$ and a fixed $V_F$, and determines suitable values of H, d, and $V_B$ to minimize acoustic coupling between the MEMS microphone and reference sensor. The method is illustrated in the flowchart of FIG. 15.

The method starts at act 15A. In act 15B the first resonance frequency $f_1$ of the MEMS microphone and the second resonance frequency $f_2$ for the reference sensor are defined. In act 15C the front side cavity volume $V_F$ is defined, for example, based on the dimensions of the MEMS microphone and the reference sensor. In act 15D a decoupling criterion between the MEMS microphone and the reference sensor is defined in units of decibels (dB). The decoupling criterion may describe a maximum desired amount of acoustic coupling between the MEMS microphone and the reference sensor. In act 15E the thickness H and diameter d dimensions of the acoustic port are initiated, for example, based on previous designs, and upper and lower boundaries for H and d are defined, for example, based on previous designs or space constraints in a device in which the MEMS microphone and reference sensor system may be used. In act 15F the volume of the back side cavity $V_B$ is initialized, for example, based on previous designs or space constraints in a device in which the MEMS microphone and reference sensor system may be used. Also in act 15F, the upper and lower implementation boundaries for $V_B$ are defined, for example, based on space constraints in a device in which the MEMS microphone and reference sensor system may be used. In act 15G the frequency response sensitivity of the MEMS microphone is calculated, for example, using a lumped parameter model circuit with the provided circuit values, including the resonance frequencies $f_1$ and $f_2$, and the volumes $V_F$ and $V_B$. In act 15H the sensitivities of the MEMS microphone and reference sensor in the vicinity of the resonance frequency $f_1$ of the MEMS microphone are calculated. In act 15I the coupling between the MEMS microphone and the reference sensor at the resonance frequency $f_1$ of the MEMS microphone is calculated, for example, by simulation. In act 15J a determination is made whether the decoupling criterion is met. If so, the current values of H, d, and $V_B$ are saved as part of the design of the MEMS microphone and reference sensor system. If the decoupling criterion is not met, the dimensions of the port and the volume of the back cavity are adjusted until the decoupling criterion is met and the coupling is minimized (acts 15M-15P).

Figure 16:
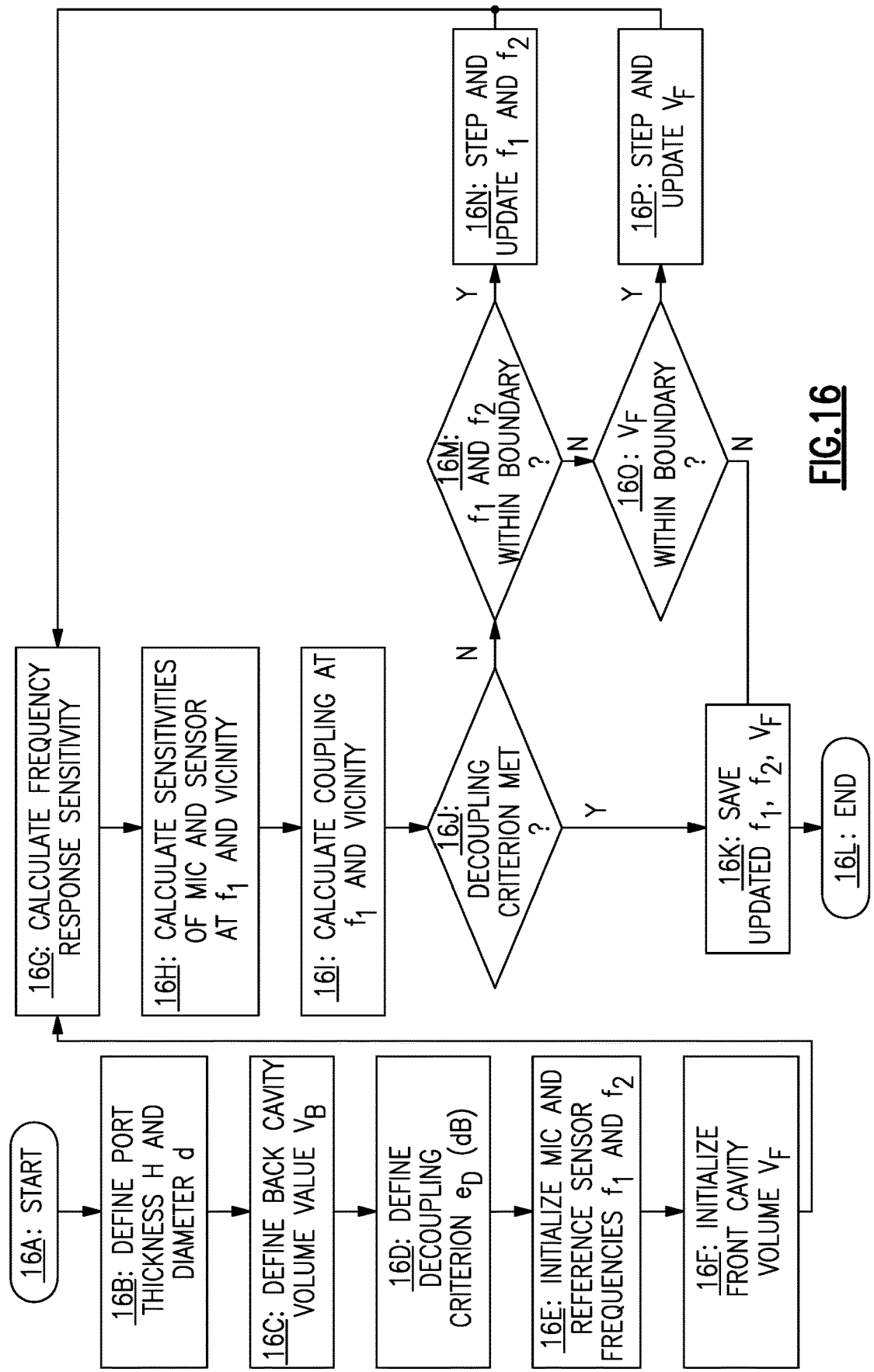
FIG. 16 is a flowchart of another method for designing a co-packaged MEMS microphone and reference sensor to minimize acoustic coupling between the MEMS microphone and reference sensor.

In another embodiment of the method, H, d, and $V_B$ are fixed and resonance frequencies $f_1$, $f_2$, and front cavity volume $V_F$ that result in an acceptable amount of acoustic coupling between the MEMS microphone and reference sensor are determined. The method is illustrated in the flowchart of FIG. 16. The method starts at act 16A. In act 16B the acoustic port thickness H and diameter d are defined. In act 16C the back side cavity volume $V_B$ is defined, for example, based on previous designs or space constraints in a device in which the MEMS microphone and reference sensor system may be used. In act 16D a decoupling criterion between the MEMS microphone and the reference sensor is defined in units of decibels (dB). The decoupling criterion may describe a maximum desired amount of acoustic coupling between the MEMS microphone and the reference sensor. In act 16E the resonance frequencies $f_1$, $f_2$ of the MEMS microphone and reference sensor, respectively, are initiated, for example, based on previous designs. In act 16F the volume of the front side cavity $V_F$ is initialized, for example, based on previous designs or space constraints in a device in which the MEMS microphone and reference sensor system may be used. In act 16G the frequency response sensitivity of the MEMS microphone is calculated, for example, using a lumped parameter model circuit with the provided circuit values, including the resonance frequencies $f_1$ and $f_2$, and the volumes $V_F$ and $V_B$. In act 16H the sensitivities of the MEMS microphone and reference sensor in the vicinity of the resonance frequency $f_1$ of the MEMS microphone are calculated. In act 16I the coupling between the MEMS microphone and the reference sensor at the resonance frequency $f_1$ of the microphone is calculated, for example, by simulation. In act 16J a determination is made whether the decoupling criterion is met. If so, the current values of $f_1$, $f_2$, and $V_F$ are saved as part of the design of the MEMS microphone and reference sensor system. If the decoupling criterion is not met, the resonance frequencies and the volume of the front cavity are adjusted until the decoupling criterion is met and the coupling is minimized (acts 16M-16P).

Figure 15:
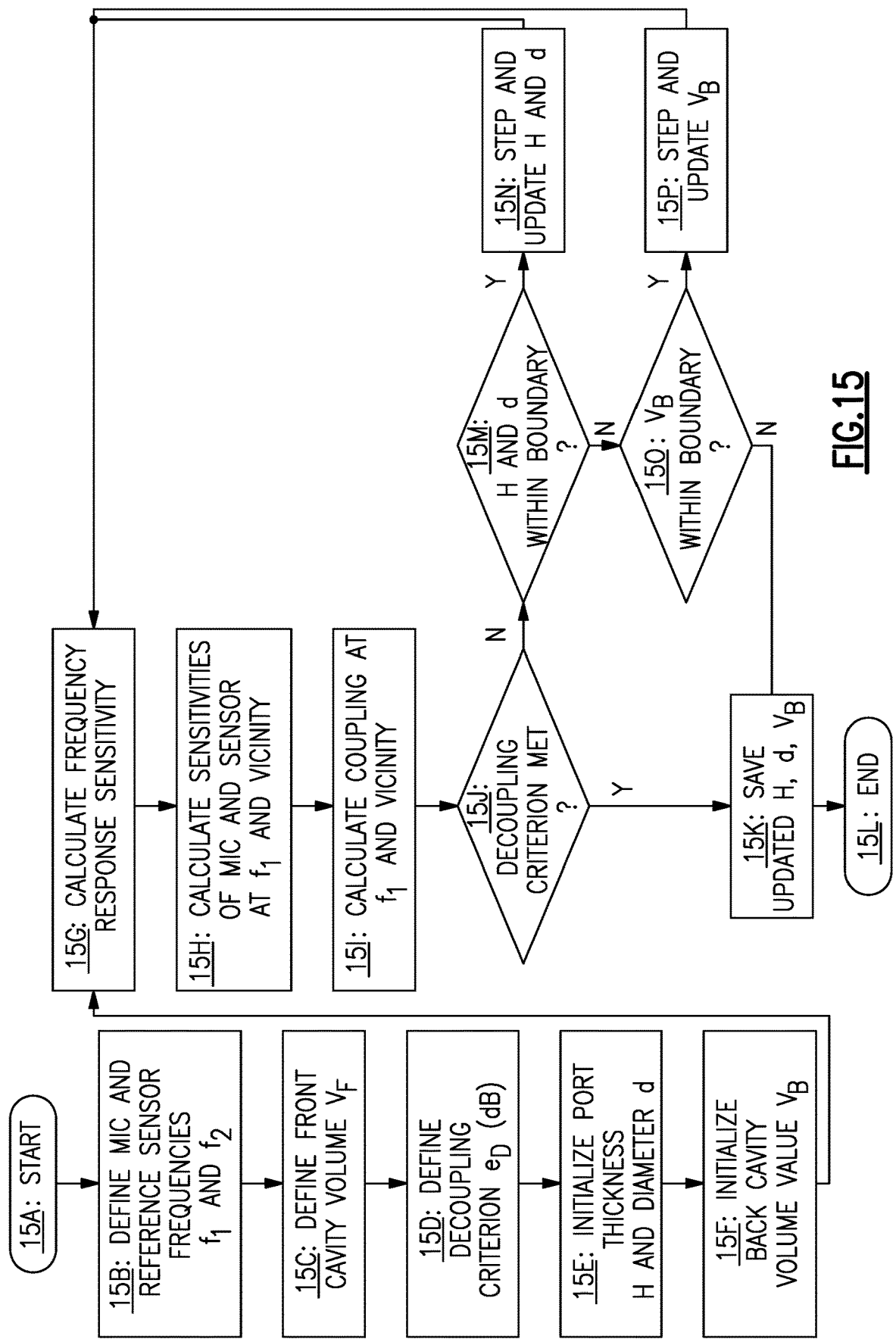
FIG. 15 is a flowchart of a method for designing a co-packaged MEMS microphone and reference sensor to minimize acoustic coupling between the MEMS microphone and reference sensor.

In some embodiments the decoupling criterion set in the method of either FIG. 15 or FIG. 16 may be that there is less than 3 dB of acoustic coupling between the co-packaged MEMS microphone and reference sensor. Following the method of either FIG. 15 or FIG. 16 may thus result in a co-packaged MEMS microphone and reference sensor disposed in a package such as illustrated in FIG. 14B wherein there is less than 3 dB of acoustic coupling between the co-packaged MEMS microphone and reference sensor. In one particular example, co-packaged MEMS microphone and reference sensor as illustrated in FIG. 14B with less than 3 dB of acoustic coupling between the MEMS microphone and reference sensor may have a MEMS microphone resonance frequency of 7.5 kHz, a reference microphone resonance frequency of 24 kHz, an acoustic port diameter of 290 μm, a substrate height of 500 μm, a front cavity volume of 0.75×0.75×0.41 mm$^3$, and a back cavity volume of 3.4×2.6× 1.1 mm$^3$.

Figure 17:
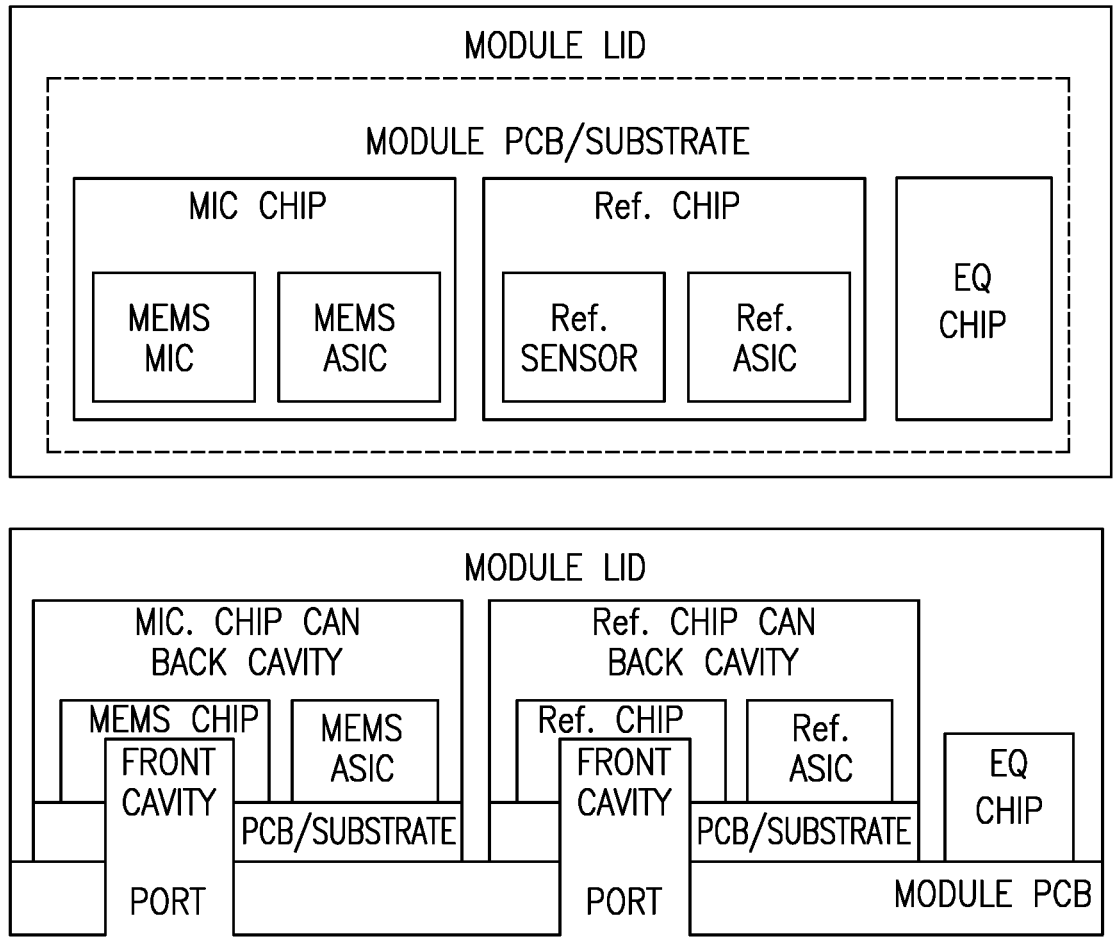
FIG. 17 illustrates a plan view and cross-sectional view of an example of a co-packaged MEMS microphone and reference sensor configured as a system-in-package (SiP) module.
Figure 18:
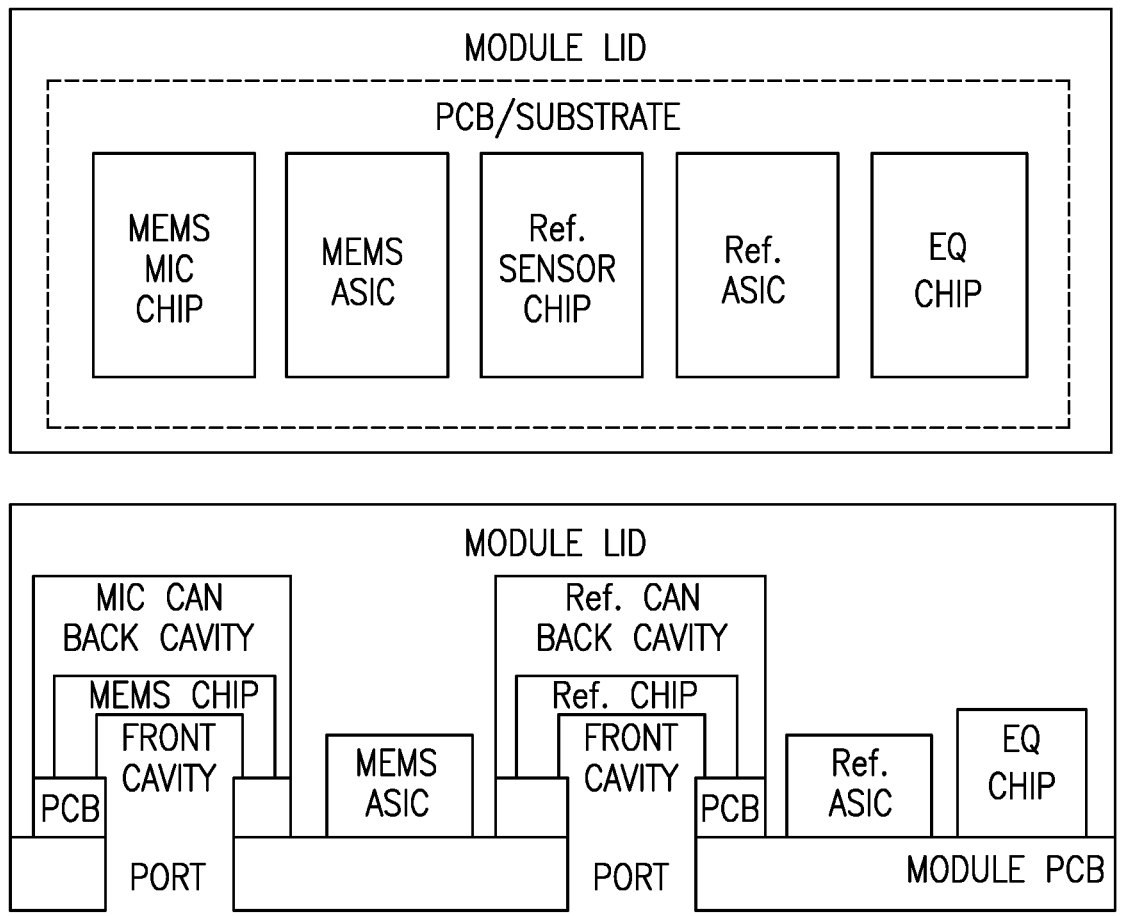
FIG. 18 illustrates a plan view and cross-sectional view of another example of a co-packaged MEMS microphone and reference sensor configured as a SiP module.
Figure 19:
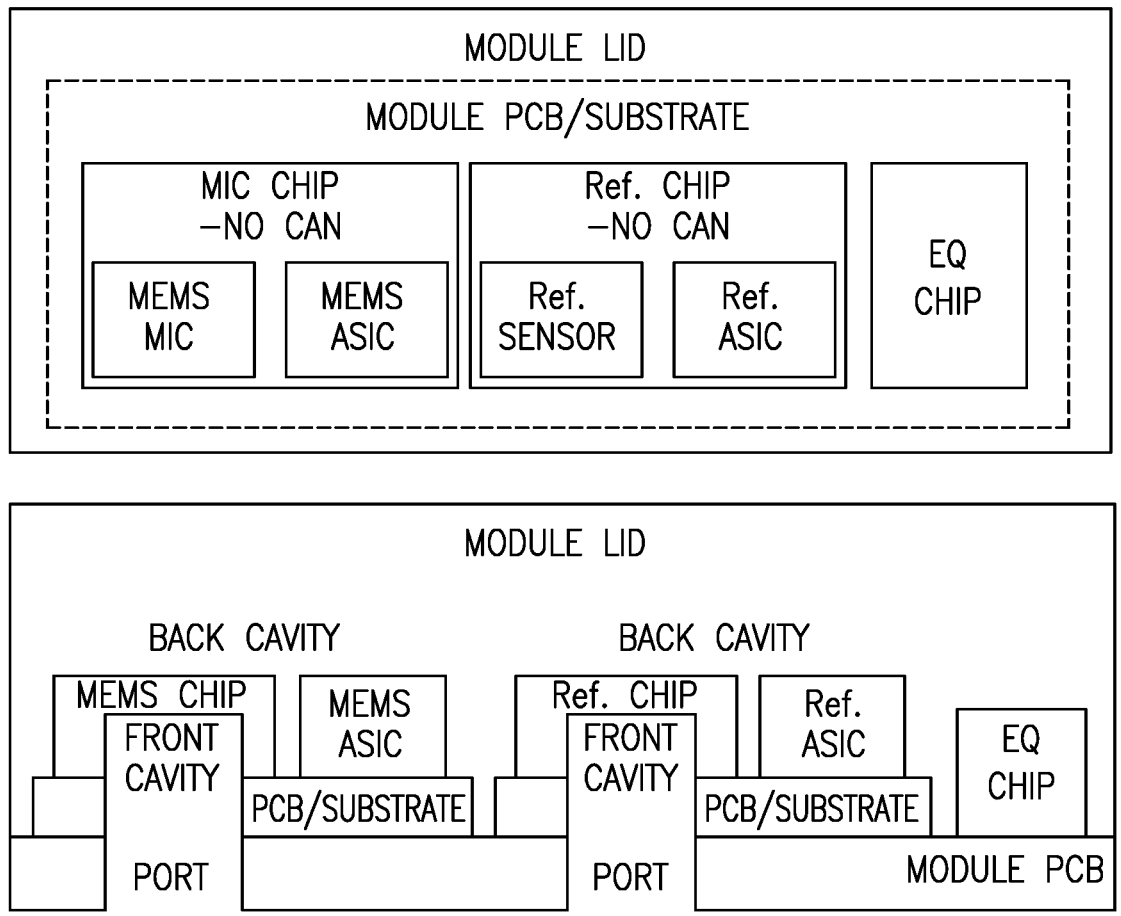
FIG. 19 illustrates a plan view and cross-sectional view of another example of a co-packaged MEMS microphone and reference sensor configured as a SiP module.

Embodiments of a MEMS microphone and reference sensor system may be provided as system-in-package (SiP) modules. One example of a SiP module including a MEMS microphone and reference sensor may include the MEMS microphone and reference sensor formed on two different die or microchips along with their respective ASICs and mounted on a module PCB with an equalizer microchip. The MEMS microphone and associated ASIC are mounted within one can defining the back side volume for the MEMS microphone and the reference sensor and associated ASIC are mounted within a second can that defines the back-side volume for the reference sensor. A module lid covers both the first and second cans. This example is illustrated in plan view and in cross-sectional view in FIG. 17. Another example of a SiP module including a MEMS microphone and reference sensor, illustrated in plan view and cross-sectional view in FIG. 18 is similar to that of FIG. 17, but the ASICs for the MEMS microphone and reference sensor are disposed on the module PCB outside of the cans covering the MEMS microphone and reference sensor rather than on the same chips as the MEMS microphone and reference sensor, respectively. In another example of a SiP module including a MEMS microphone and reference sensor, illustrated in plan view and cross-sectional view in FIG. 19 the MEMS microphone and reference sensor are each formed on different chips along with their associated ASICs and are disposed on the module PCB. The module lid defines a shared back side volume for both the MEMS microphone and reference sensor.

Figure 20:
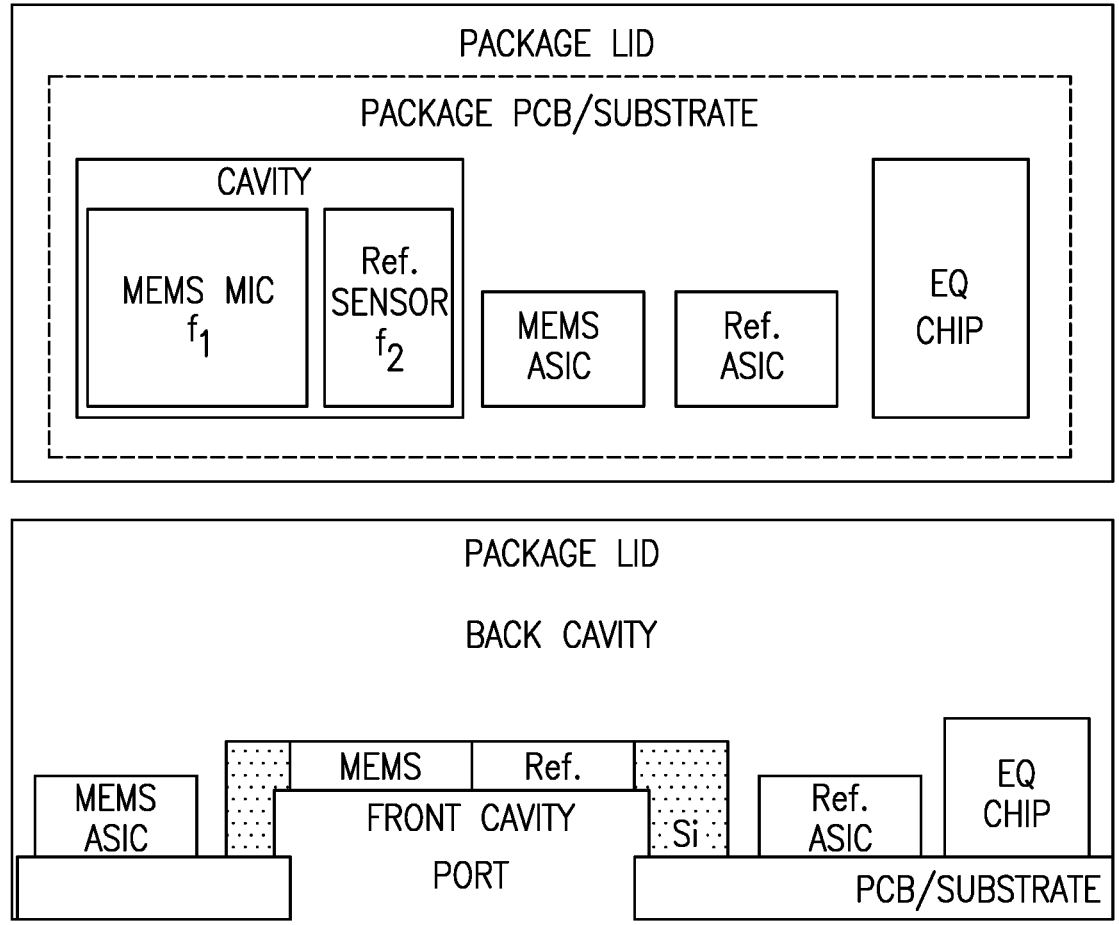
FIG. 20 illustrates a plan view and cross-sectional view of an example of a co-packaged MEMS microphone and reference sensor configured as a system-on-chip (SoC) module.
Figure 21:
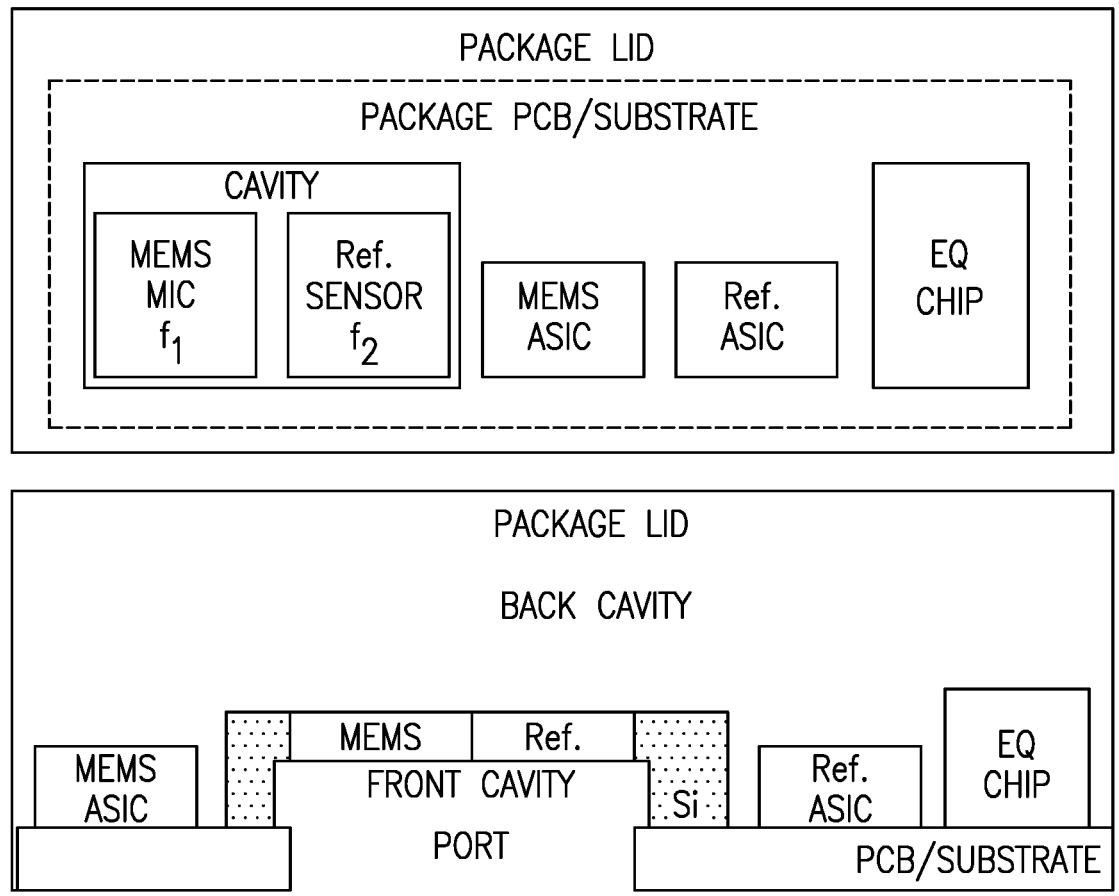
FIG. 21 illustrates a plan view and cross-sectional view of another example of a co-packaged MEMS microphone and reference sensor configured as a SoC module.
Figure 22:
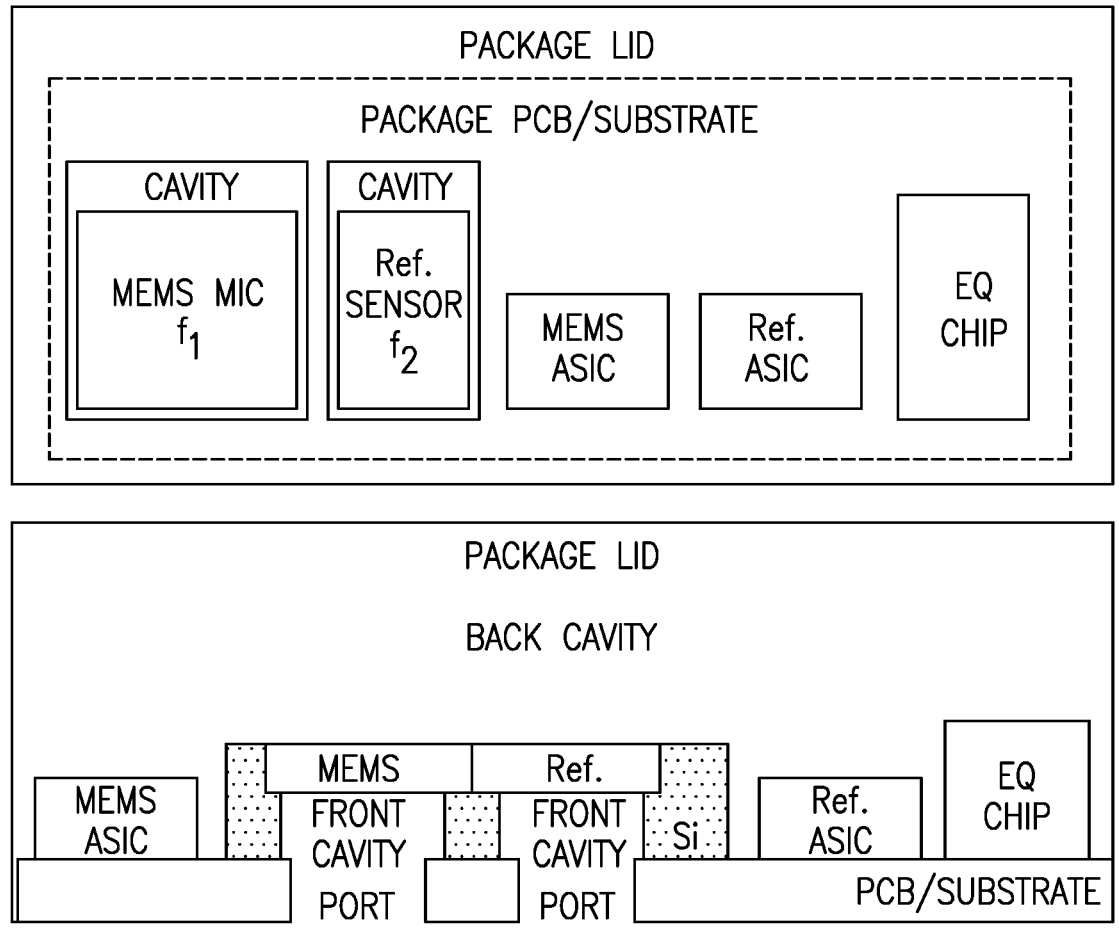
FIG. 22 illustrates a plan view and cross-sectional view of another example of a co-packaged MEMS microphone and reference sensor configured as a SoC module.

Embodiments of a MEMS microphone and reference sensor system may be provided as system-on-chip (SoC) modules. One example of a SoC module including a MEMS microphone and reference sensor may include a MEMS microphone and reference sensor formed on the same chip via the same process and mask set to define a single structure including both the MEMS microphone and reference sensor, although the MEMS microphone and reference sensor may have different sizes. The MEMS microphone and reference sensor may share a single front cavity and single back cavity defined by a package lid covering a PCB or substrate upon which the MEMS microphone and reference sensor, associated ASICs, and equalizer chip are disposed. This example is illustrated in plan view and in cross-sectional view in FIG. 20. Another example of a SoC module including a MEMS microphone and reference sensor, illustrated in plan view and cross-sectional view in FIG. 21 is similar to that of FIG. 20, but the MEMS microphone and reference sensor are the same size, but may have been formed utilizing process and mask set variations. Another example of a SoC module including a MEMS microphone and reference sensor, illustrated in plan view and cross-sectional view in FIG. 22 is similar to that of FIG. 20, but the MEMS microphone and reference sensor each have their own separate front cavities.

Figure 23:
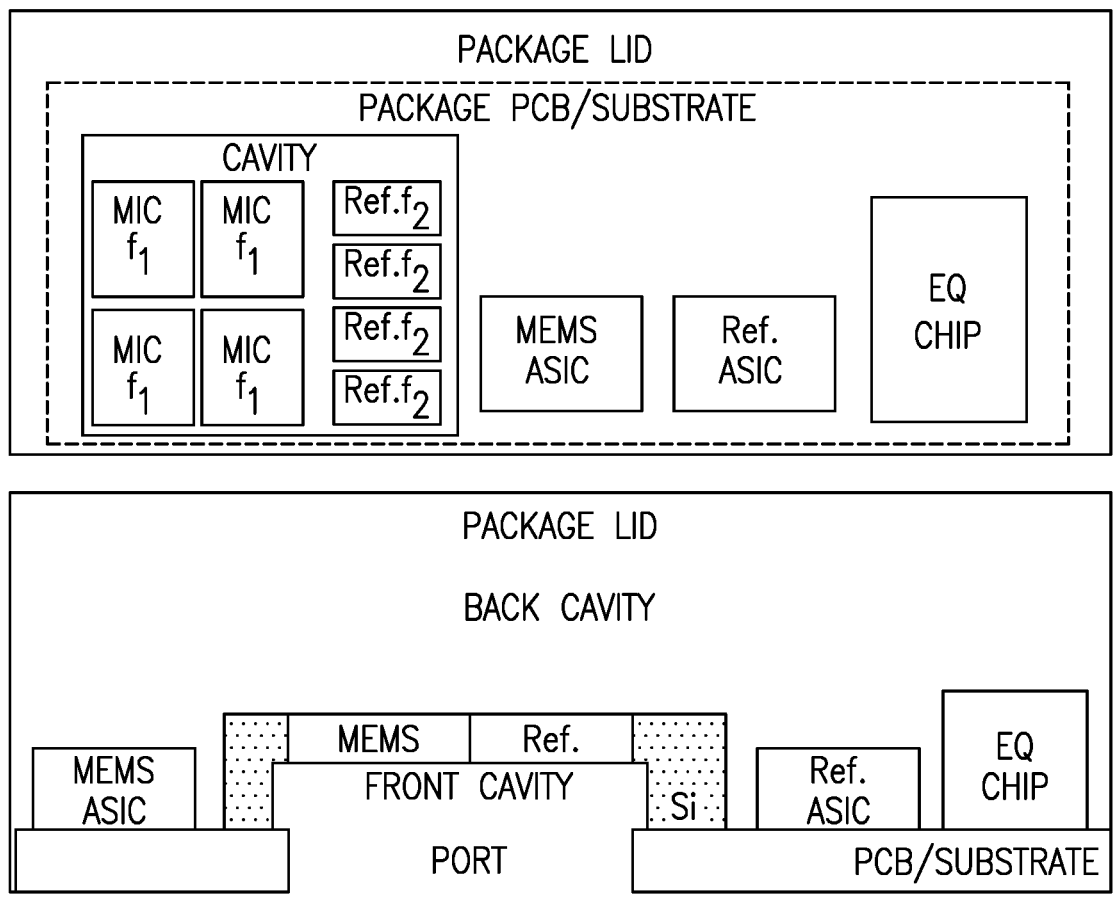
FIG. 23 illustrates a plan view and cross-sectional view of an example of a co-packaged MEMS microphone and reference sensor SoC module including cascaded MEMS microphones and reference sensors.
Figure 24:
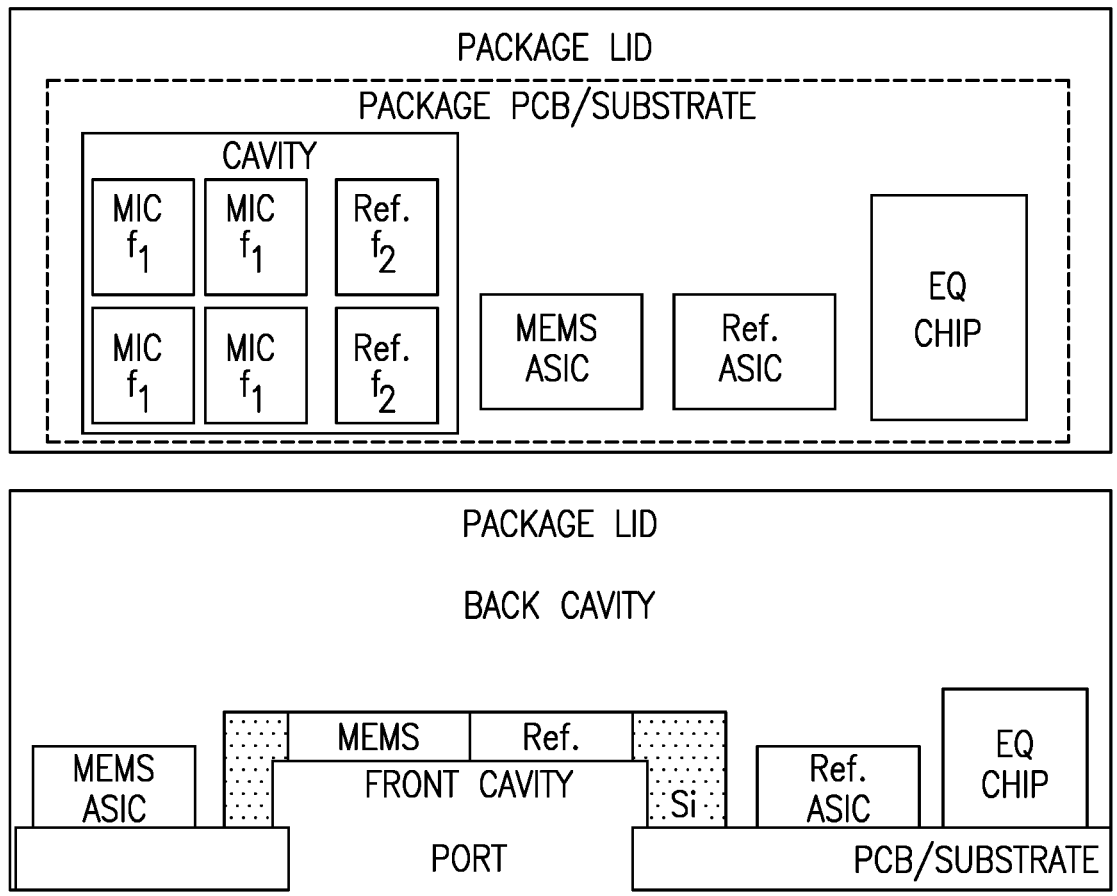
FIG. 24 illustrates a plan view and cross-sectional view of another example of a co-packaged MEMS microphone and reference sensor SoC module including cascaded MEMS microphones and reference sensors.

Embodiments of a MEMS microphone and reference sensor system provided as SoC modules may include cascaded devices—an array of multiple MEMS microphones and/or reference microphones electrically connected in series and/or parallel. One example of a SoC module including cascaded MEMS microphones and reference sensors, in which the MEMS microphones and reference sensors were formed in the same process with the same mask set, but with different sizes, and wherein the cascaded MEMS microphones and reference sensors share a single front cavity and single back cavity defined by a package lid covering a PCB or substrate upon which the cascaded MEMS microphones and reference sensors as well as associated ASICs and equalizer chip are disposed is illustrated in plan view and in cross-sectional view in FIG. 23. Another example of a SoC module including cascaded MEMS microphones and reference sensors, illustrated in plan view and cross-sectional view in FIG. 24 is similar to that of FIG. 23, but the MEMS microphones and reference sensors are the same size, but may have been formed utilizing process and mask set variations. Another example of a SoC module including cascaded MEMS microphones and reference sensors, illustrated in plan view and cross-sectional view in FIG. 25 is similar to that of FIG. 23, but the MEMS microphones have one front cavity and reference sensors have a separate second front cavity.

Figure 26:
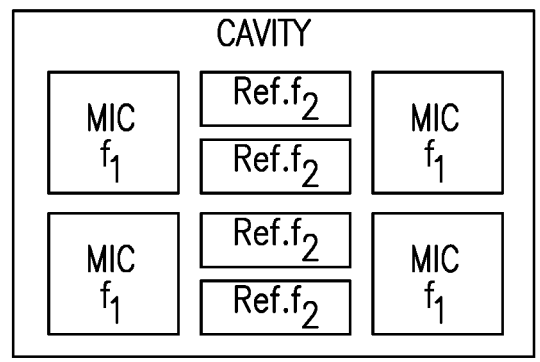
FIG. 26 illustrates an example of an arrangement of MEMS microphones and reference sensors for a co-packaged MEMS microphone and reference sensor module including cascaded MEMS microphones and reference sensors.
Figure 27:
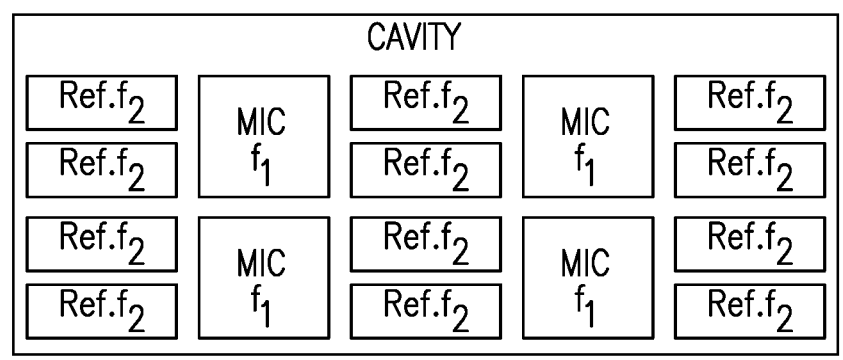
FIGS. 27-35 illustrate other examples of arrangements of MEMS microphones and reference sensors for a co-packaged MEMS microphone and reference sensor module including cascaded MEMS microphones and reference sensors.
Figure 28:
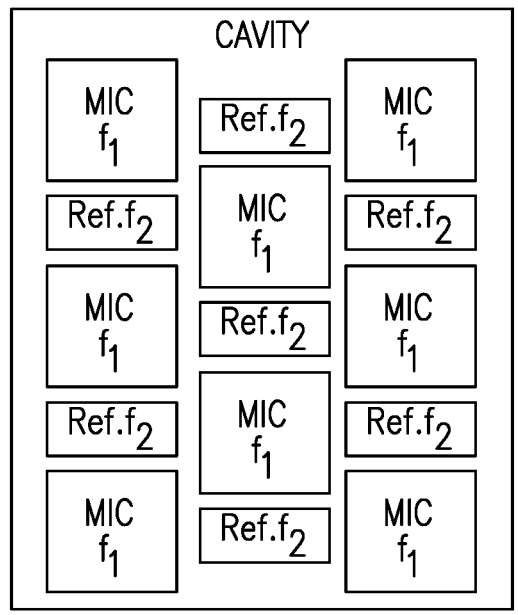
Figure 29:
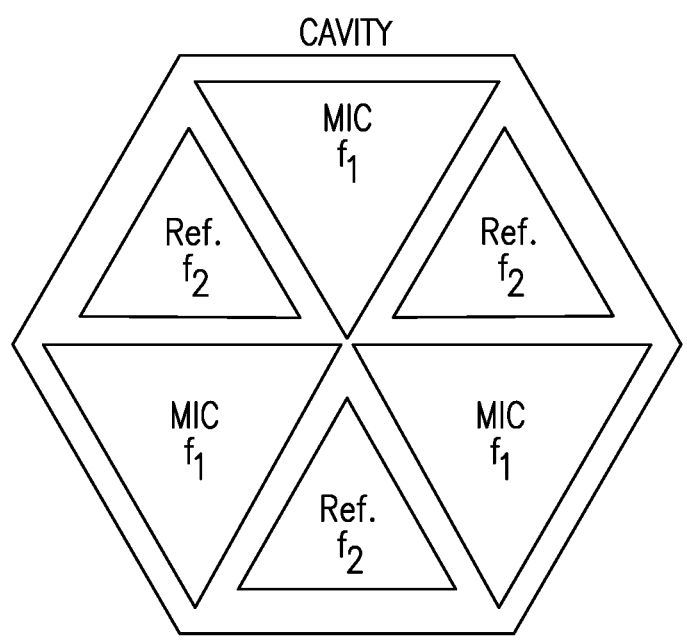
Figure 30:
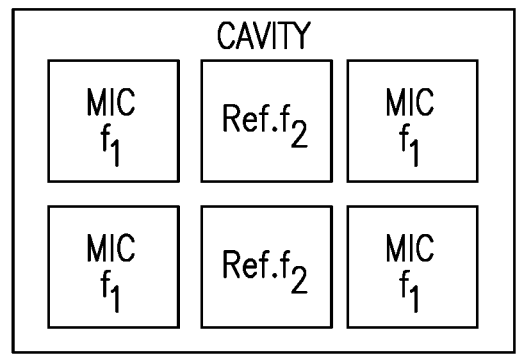
Figure 31:
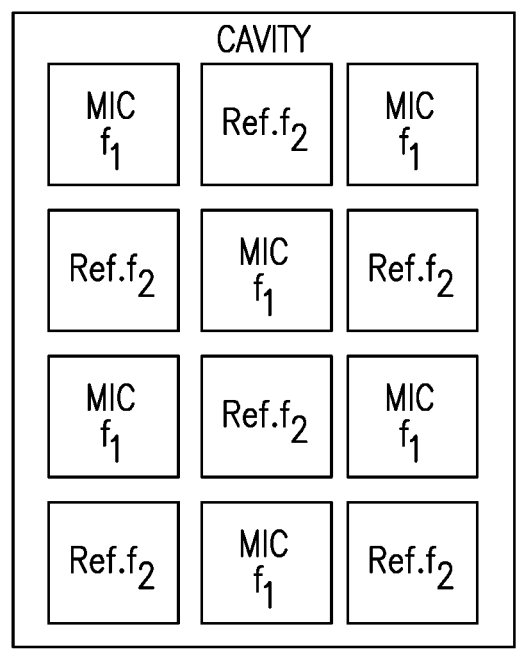
Figure 32:
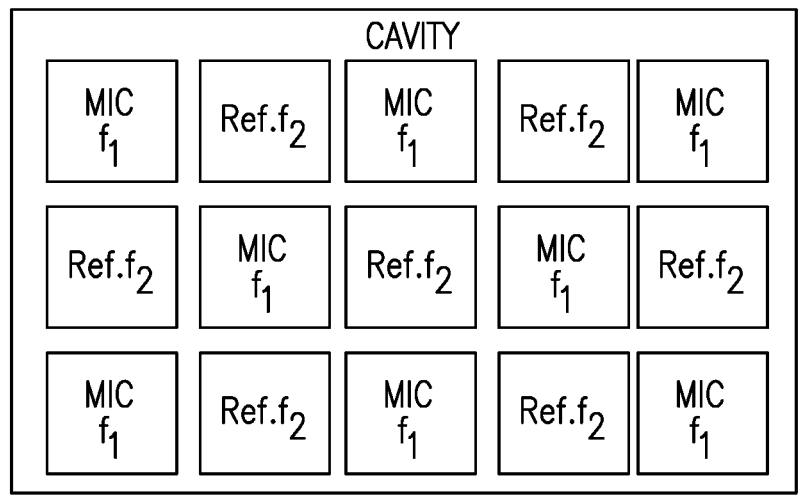

Various embodiments of MEMS microphone and reference sensor systems including cascaded MEMS microphones and/or reference sensors may have a concentric or symmetric arrangement of MEMS microphones and reference sensors with one or two axes of symmetry. The number of MEMS microphones may be different or the same as the number of reference sensors. The reference sensors may be larger or smaller than the MEMS microphones in area. In some embodiments, groups of MEMS microphones may surround groups of reference sensors, for example, as illustrated in FIG. 26 or groups of reference sensors may surround one or more groups of MEMS microphones, for example, as illustrated in FIG. 27. In other embodiments, the reference sensors and MEMS microphones may be disposed in a regular and symmetric tiled arrangement, for example as illustrated in FIG. 28. In further embodiments, for example, as illustrated in FIG. 29, the reference sensors and MEMS microphones may be arranged in an alternating concentric pattern. As illustrated in FIGS. 26-29, the reference sensors and MEMS microphones may have the same shapes, but different sizes. The embodiments of FIGS. 30-33 are similar to those of FIGS. 26, 28, and 29, but the reference sensors and MEMS microphones have the same sizes and shapes.

Figure 33:
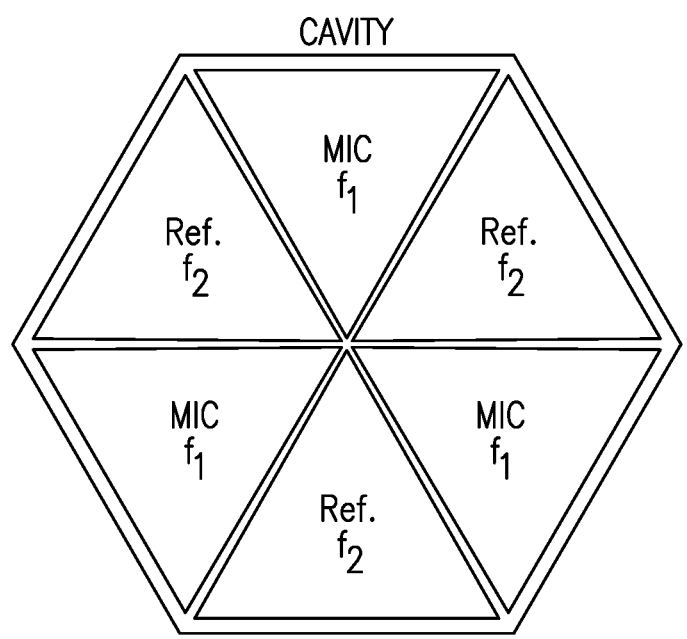
Figure 34:
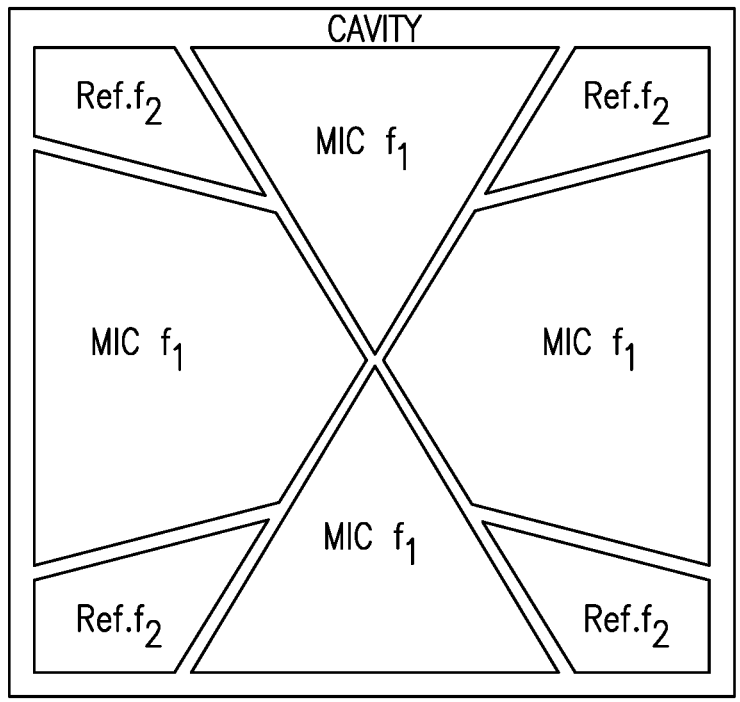
Figure 35:
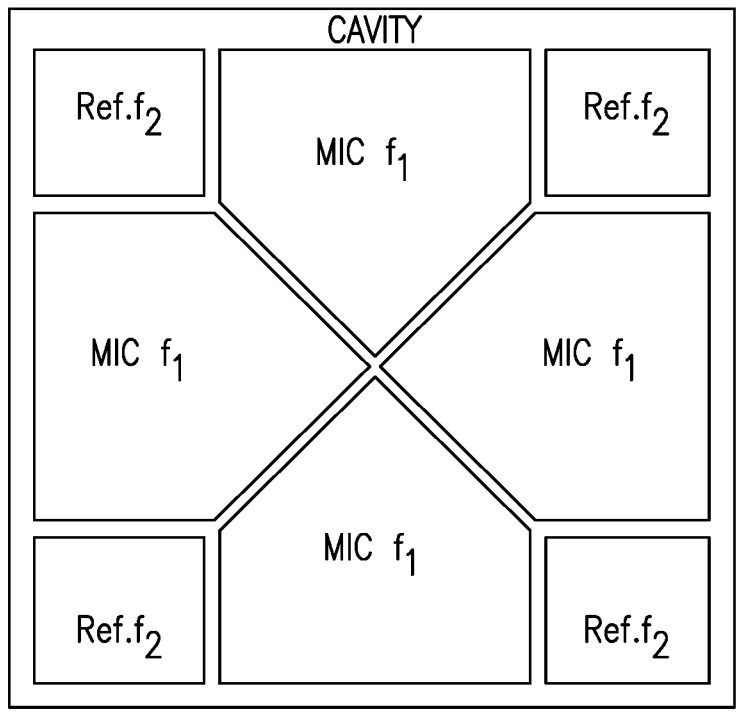

In further examples, the MEMS microphones and reference sensors in a cascaded array may have different shapes and sizes and/or different MEMS microphones may have different shapes or sizes from one another and/or different reference sensors may have different sizes or shapes from one another while still maintaining two axes of symmetry as illustrated in FIGS. 34 and 35. In some examples, for example, as illustrated in FIGS. 29 and 33 above, the cascaded arrays or MEMS microphones and reference sensors may have more than two axes of symmetry.

Figure 36A:
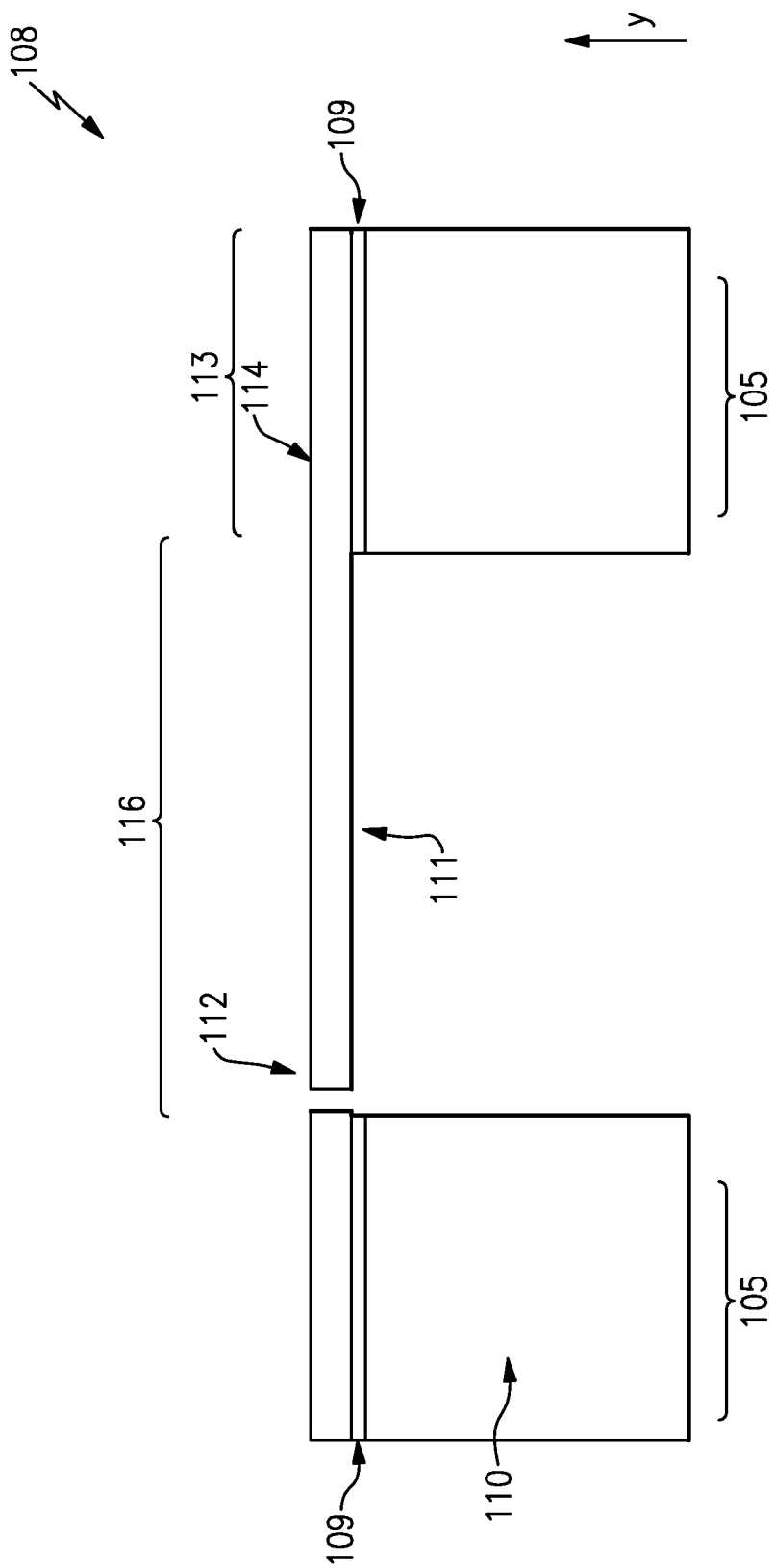
FIG. 36A is a cross-sectional view of a microelectromechanical systems microphone with a flat cantilevered beam according to another embodiment.

FIG. 36A shows a cross-sectional view of one implementation of a piezoelectric microelectromechanical systems (MEMS) microphone 108. The microphone 108 is a piezoelectric MEMS cantilever microphone usable in any of the electronic acoustic devices described herein. The microphone 108 comprises a substrate 110. The substrate 110 is optionally made of silicon. The substrate 110 has two side walls 105, arranged such that they extend perpendicular to the length of the cantilever. Two further end walls (not shown) complete the cavity on opposite sides, such that they meet the side walls at right angles, and a further structure, described in relation to FIG. 36B later, may be on the underside of the cavity. The walls are preferably around 108-500 micrometers thick. A piezoelectric film layer 111 forms a cantilevered beam 116 over the cavity. At least one of the side walls 105 defines an anchor region 113. The anchor region is preferably around 108-500 micrometers thick. The anchor region 113 is the area where a piezoelectric film layer 111 is coupled to and supported by one of the side walls. The microphone 108 optionally comprises an insulation layer 109 disposed on a surface of the substrate 110. The insulation layer is optionally silicon dioxide. The piezoelectric film layer 111 is supported by the substrate 110 at the anchor region 113, such that the piezoelectric film layer 111 is cantilevered and extends between a fixed end 114 and a free end 112. At least one electrode (not shown) is arranged over the piezoelectric film layer. Preferably, the arrangement comprises multiple electrodes arranged over and under the piezoelectric film layer and, in some arrangements, between such layers. Together the piezoelectric film layer(s) and electrode(s) form a cantilevered beam 116. It will be appreciated that although the beam is illustrated as having a rectangular shape, other shapes may be used. The microphone 108 comprises at least one electrode which may be disposed over the piezoelectric film layer 111, such that the electrode is located on the cavity side of the piezoelectric layer, or such that the electrode is located on the other side of the piezoelectric layer away from the cavity. The electrode is optionally positioned adjacent the anchor region 113. The insulation layer 109 provides insulation between an electrode, disposed on the cavity side of the piezoelectric film layer, and the silicon substrate 110.

Figure 36B:
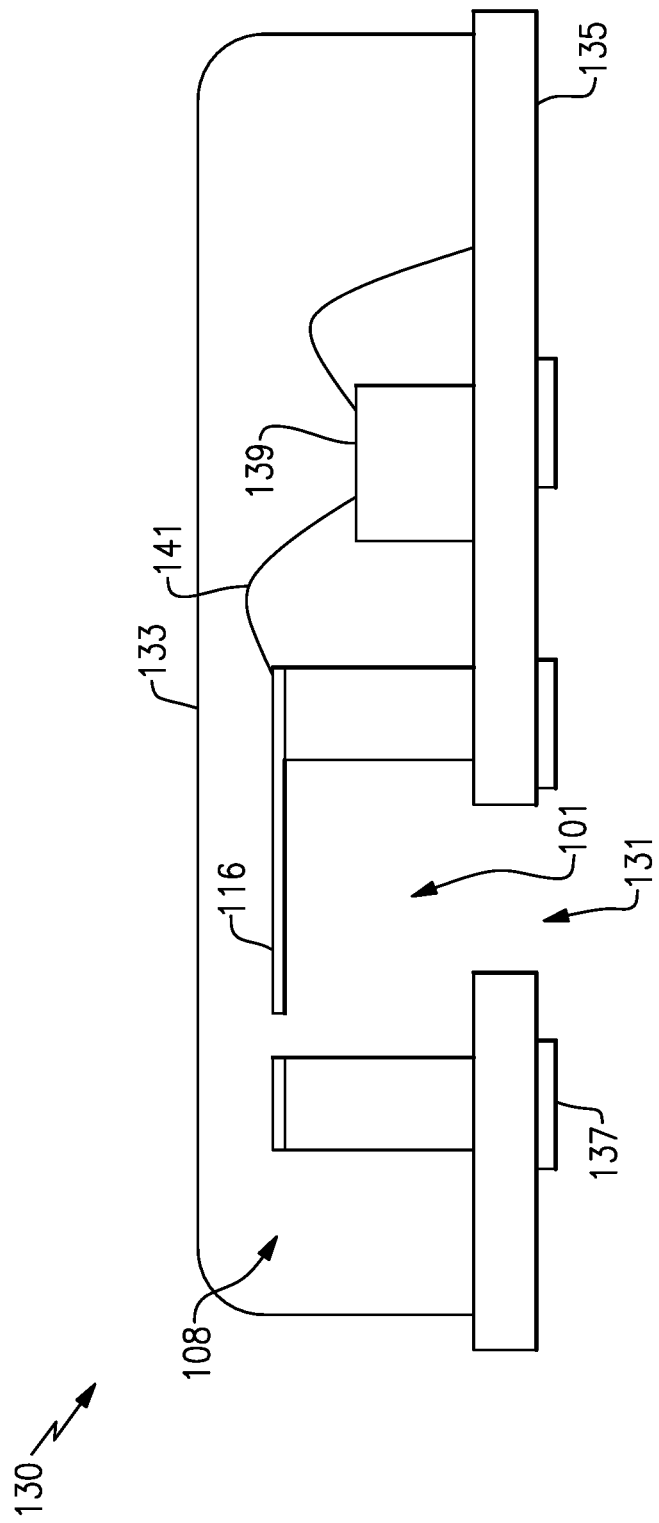
FIG. 36B is a cross-sectional view of a microelectromechanical systems microphone arrangement according to another embodiment.

FIG. 36B illustrates a cross-sectional view of another microphone arrangement 130. It will be appreciated that this is an example embodiment for illustrative purposes, and the microphone can be included in a variety of different arrangements. As illustrated, the microphone 108 of FIG. 36A is located within a cap 133. The cap may be flexible or rigid, and may be any suitable material such as a metallic material. The cap creates a seal with a substrate 135 (for example a printed circuit board), such that air only flows into and out of the arrangement via a sound inlet 131. The substrate 135 may be any suitable material. The cap 133 also mitigates electromagnetic interference. Sound waves enter the arrangement, causing the cantilevered beam 116 to bend and produce voltage due to the piezoelectric effect, as described herein. The arrangement 130 comprises at least one solder pad 137 such that the microphone arrangement may be soldered to external devices, not shown here. The microphone arrangement further comprises an application specific integrated circuit chip/die ("ASIC") 139. The MEMS microphone is electrically connected by wire bonding 141. Although not shown, it will be appreciated that the wire bonding may be connected to the one or more electrodes of the microphone, as described herein.

It will be noted that FIG. 36B is a cross-sectional view of the arrangement 130, such that the one or more solder pads 137, substrate 135, MEMS microphone 108, ASIC 139, and cap 133 extend into the page such that they are three-dimensional, as described in relation to other embodiments disclosed herein.

Figure 37:
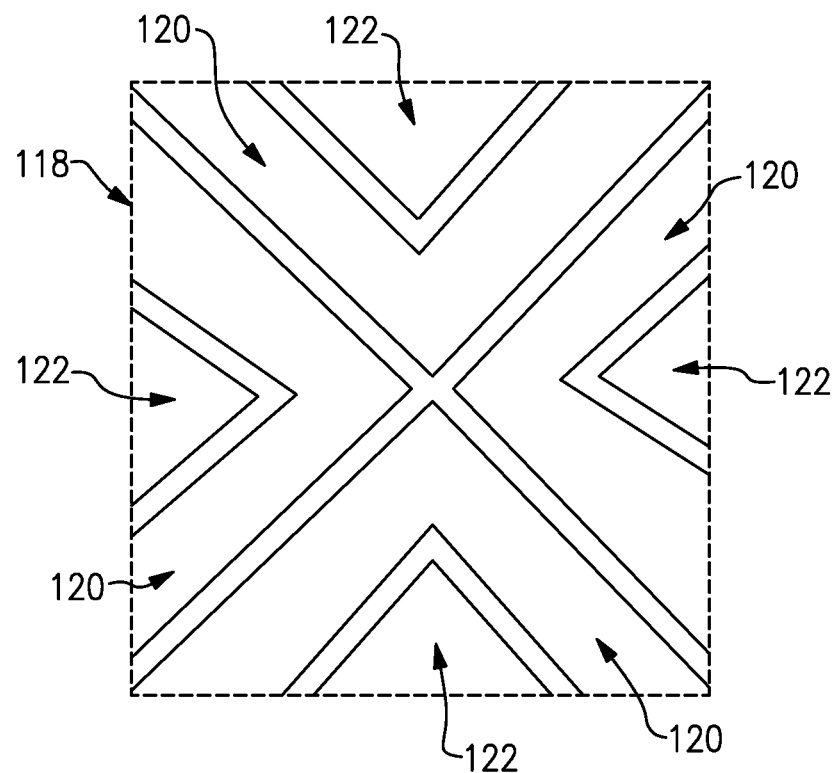
FIG. 37 is a layout of a section of a cantilever beam piezoelectric microphone according to another embodiment.

FIG. 37 shows a layout of a section 118 of a cantilever beam piezoelectric microphone including a first set of cantilever beams 120 and a second set of cantilever beams 122. The first set of beams 120 may correspond to a primary microphone (e.g., the primary microphone 58) and the second set of beams 122 may correspond to a reference microphone (e.g., the reference microphone 62). Each of the triangular tabs formed by the beams 120, 122 and the material therebetween is a piezoelectric material. When the piezoelectric material moves or flexes due to sound waves encountering the material, a voltage is modified corresponding to the amount of movement or flexing. More specifically, the triangular portions contain metal layers that create charges, which are picked up by electrodes. In some examples, all four triangular portions of the first set of beams 120 are tied (i.e., electrically connected) together to act as one microphone and similarly, all four triangular portions of the second set of beams 122 are tied together to act as one microphone. In other examples, one or more individual triangular portions is separately coupled to an equalization module to act as distinct microphones, thereby including more than two microphones according to certain embodiments. For example, an electronic acoustic device may include three microphones, with two of the three microphones made from at least two of the first set of beams 120. The length and/or size of each cantilever beam may be modified to produce a different desired resonant frequency. In an example, the length of a beam is increased to lower its resonant frequency.

Figure 38:
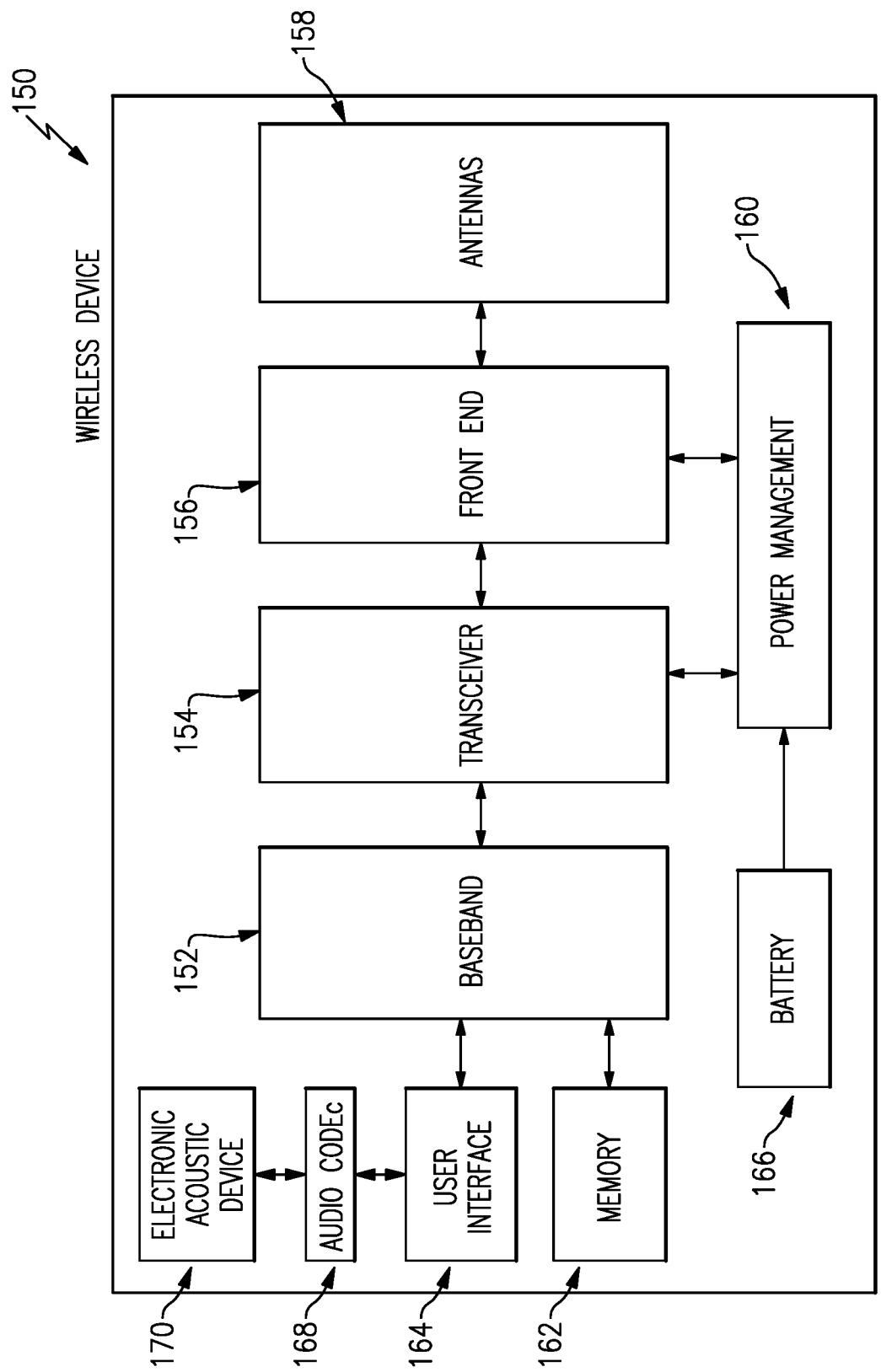
FIG. 38 is a schematic diagram of a wireless device comprising a piezoelectric microelectromechanical systems microphone according to another embodiment.

FIG. 38 is a schematic diagram of one embodiment of a wireless device 150. The wireless device 150 can be, for example but not limited to, a portable telecommunication device such as, a mobile cellular-type telephone. The wireless device 150 includes an electronic acoustic device 170 as described herein, and may include one or more of a baseband system 152, a transceiver 154, a front end system 156, one or more antennas 158, a power management system 160, a memory 162, a user interface 164, a battery 166, and an audio codec 168. The electronic acoustic device 170 may supply signals to the audio codec 168 which may encode analog audio as digital signals or decode digital signals to analog. The audio codec 168 may transmit the signals to a user interface 164. The user interface 164 transmits signals to the baseband system 152. The transceiver 154 generates RF signals for transmission and processes incoming RF signals received from the antennas.

The transceiver 154 aids in conditioning signals transmitted to and/or received from the antennas 158.

The antennas 158 can include antennas used for a wide variety of types of communications. For example, the antennas 158 can include antennas 158 for transmitting and/or receiving signals associated with a wide variety of frequencies and communications standards.

The baseband system 152 is coupled to the user interface to facilitate processing of various user input and output, such as voice and data. The baseband system 152 provides the transceiver 154 with digital representations of transmit signals, which the transceiver 154 processes to generate RF signals for transmission. The baseband system 152 also processes digital representations of received signals provided by the transceiver 154. As shown in FIG. 14, the baseband system 152 is coupled to the memory 162 to facilitate operation of the wireless device 150.

The memory 162 can be used for a wide variety of purposes, such as storing data and/or instructions to facilitate the operation of the wireless device and/or to provide storage of user information.

The power management system 160 provides a number of power management functions of the wireless device.

The power management system 160 receives a battery voltage from the battery 166. The battery 166 can be any suitable battery for use in the wireless device, including, for example, a lithium-ion battery.

Embodiments provided herein are applicable to both diaphragm and cantilever based microphones, although other geometries may be more suitable for particular applications (e.g., bridges/clamped-clamped beams). One of ordinary skill in the area would understand how to apply the principles and techniques disclosed herein to other types of microphones beyond diaphragm and cantilever microphones.

While embodiments herein are described with reference to MEMS microphones, it is understood that the principles and techniques described herein are applicable to other types of transducers. For example, embodiments herein may be adapted and used in the equalization of the frequency response of pressure sensors, force sensors, and imaging sensors (where a common excitation signal is substituted for the common acoustic wave described above. An advantage of the devices, systems and methods described herein is that the provided solution is applicable to a wide array of sensors and transducers, particularly when there is little to no control over what the incoming stimulus may be. For example, unlike pink noise generated in a lab to calibrate a MEMS microphone, MEMS microphones in the real world often fall out of calibration and/or never encounter the exact type of noise simulated in a lab. By deliberately using a reference transducer with a higher or lower frequency response than a primary transducer, the techniques provided herein enable equalization of the frequency response of the primary transducer while keeping the resonance frequency in band for the primary transducer. Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An electronic device package comprising:
    a primary microphone having a frequency response having a first resonance frequency; and
    a reference microphone having a frequency response including a second resonance frequency, the primary microphone and the reference microphone configured to substantially simultaneously receive a same acoustic signal to produce a transduced signal of the primary microphone and a transduced signal of the reference microphone, the second resonance frequency of the reference microphone being different than the first resonance frequency of the primary microphone, the package having dimensions that cause the primary microphone and reference microphone to be acoustically isolated from one another at the first resonance frequency of the primary microphone, there being less than 3 dB of acoustic coupling between the primary microphone and reference microphone at the first resonance frequency.

2. The package of claim 1 wherein the primary microphone and reference microphone share an enclosure having a volume, the package having an acoustic port with a diameter and a depth, the volume, depth, and diameter optimized to provide the less than 3 dB of acoustic coupling between the primary microphone and reference microphone at the first resonance frequency.

3. The package of claim 1 wherein the primary microphone and reference microphone share an enclosure having a first volume, the package including an acoustic port with a diameter and a depth, and a front cavity having a second volume, the second volume, first resonance frequency, and second resonance frequency optimized to provide the less than 3 dB of acoustic coupling between the primary microphone and reference microphone at the first resonance frequency.

4. The package of claim 1 wherein each of the primary microphone and the reference microphone is a micro-electromechanical system (MEMS) microphone.

5. The package of claim 1 wherein the first resonance frequency of the primary microphone is below 20 kHz.

6. The package of claim 5 wherein the second resonance frequency of the reference microphone is above 20 kHz.

7. The package of claim 1 configured as a system-in-package module.

8. The package of claim 1 configured as a system-on-chip module.

9. The package of claim 1 wherein the primary microphone and reference microphone are formed on a same die.

10. The package of claim 1 wherein the primary microphone and reference microphone share a same acoustic port and a same front cavity.

11. The package of claim 10 wherein the primary microphone and reference microphone share a same back cavity.

12. The package of claim 1 wherein the primary microphone and reference microphone have different respective acoustic ports but share a same back cavity.

13. The package of claim 1 wherein the primary microphone and reference microphone are disposed in a same plane and separated laterally from one another.

14. The package of claim 1 wherein the primary microphone and reference microphone are formed on a same substrate by a same manufacturing process.

15. The package of claim 1 further comprising a plurality of cascaded primary microphones.

16. The package of claim 15 further comprising a plurality of cascaded reference microphones.

17. The package of claim 16 wherein the plurality of cascaded primary microphones and the plurality of cascaded reference microphones share a same acoustic port and a same front cavity.

18. The package of claim 17 wherein the plurality of cascaded primary microphones and the plurality of cascaded reference microphones share a same back cavity.

19. The package of claim 16 wherein the plurality of cascaded primary microphones and the plurality of cascaded reference microphones have different respective acoustic ports but share a same back cavity.

20. The package of claim 16 wherein the plurality of cascaded primary microphones and the plurality of cascaded reference microphones are disposed in an arrangement having at least two axes of symmetry.

21. The package of claim 16 wherein the plurality of cascaded primary microphones and the plurality of cascaded reference microphones are disposed in a concentric arrangement.

22. The package of claim 16 wherein the plurality of cascaded primary microphones and the plurality of cascaded reference microphones are circumferentially arranged.

23. The package of claim 16 wherein the plurality of cascaded primary microphones are shaped differently from the plurality of cascaded reference microphones.

24. A method of fabricating a package including a primary microphone and a reference sensor, the method comprising:
    defining a first resonance frequency of the primary microphone and a second resonance frequency of the reference sensor;
    defining a volume of a front cavity of the package;
    defining a decoupling criterion;

initializing a thickness and a diameter of an acoustic port of the package;

initializing a volume of a back cavity of the package;

determining an amount of acoustic coupling between the primary microphone and the reference sensor at the first resonance frequency; and responsive to the acoustic coupling being greater than the decoupling criteria, adjusting one or more of the thickness of the acoustic port, diameter of the acoustic port, or the volume of the back cavity and iterating the adjusting until the acoustic coupling is less than the decoupling criteria.

25. A method of fabricating a package including a primary microphone and a reference sensor, the method comprising:

defining a thickness and a diameter of an acoustic port of the package;

defining a volume of a back cavity of the package;

defining a decoupling criterion;

initializing a first resonance frequency of the primary microphone and a second resonance frequency of the reference sensor;

initializing a volume of a front cavity of the package;

determining an amount of acoustic coupling between the primary microphone and the reference sensor at the first resonance frequency; and responsive to the acoustic coupling being greater than the decoupling criteria, adjusting one or more of the first resonance frequency, the second resonance frequency, or the volume of the front cavity and iterating the adjusting until the acoustic coupling is less than the decoupling criteria.

* * * * *